(12) United States Patent
Alden

(10) Patent No.: US 11,728,596 B2
(45) Date of Patent: Aug. 15, 2023

(54) ILLUMINATED CHARGING CONNECTOR OR DEVICE AND ELECTRONIC DEVICE OR SYSTEM OPERABLE BASED ON PACKAGING STATUS

(71) Applicant: PROJECT X51 LIMITED, Riverhead (NZ)

(72) Inventor: Robin Nathyn Henry Alden, Riverhead (NZ)

(73) Assignee: PROJECT X51 LIMITED, Auckland (NZ)

( * ) Notice: Subject to any disclaimer, the term of this patent is extended or adjusted under 35 U.S.C. 154(b) by 0 days.

(21) Appl. No.: 17/956,121

(22) Filed: Sep. 29, 2022

(65) Prior Publication Data

US 2023/0019500 A1    Jan. 19, 2023

Related U.S. Application Data

(63) Continuation of application No. 17/438,163, filed as application No. PCT/NZ2020/050022 on Mar. 10, 2020, now Pat. No. 11,482,818.

(30) Foreign Application Priority Data

Mar. 11, 2019 (NZ) ........................................ 751523

(51) Int. Cl.
*H01R 13/66* (2006.01)
*H05B 47/10* (2020.01)
(Continued)

(52) U.S. Cl.
CPC ..... *H01R 13/7175* (2013.01); *H01R 13/6683* (2013.01); *H05B 47/11* (2020.01)

(58) Field of Classification Search
CPC ...... H05B 45/10; H05B 47/10; H05B 47/105; H05B 47/11; H01R 13/175; H01R 13/6683
See application file for complete search history.

(56) References Cited

U.S. PATENT DOCUMENTS

| 10,278,251 B1 | 4/2019 | Fledderman et al. |
| 2005/0237217 A1* | 10/2005 | Rudolph ............ F24C 7/085 340/815.45 |

(Continued)

FOREIGN PATENT DOCUMENTS

| CN | 107255260 A | 10/2017 |
| CN | 108718022 A | 10/2018 |
| WO | 2018148794 A1 | 8/2018 |

*Primary Examiner* — Jimmy T Vu
(74) *Attorney, Agent, or Firm* — Jacob M. Ward; Ward Law Office LLC

(57) ABSTRACT

An illuminable electronic connector for facilitating connection with an electronic device has an illumination circuit with at least one illumination source, and an on-board power source for supplying power to the illumination source in at least some modes of operation. The connector may be configured to adjust brightness of the illumination source based on ambient light conditions using an on-board light sensor. A touch sensing input may also be provided to operate the illumination source. The connector may be further operable to enter a sleep mode when it enters a shipping phase of a supply chain and then to automatically activate the illumination source when it is unpackaged at the end of the shipping phase. An electronic device including an electronic visual interface, such as a mobile phone, may be also operated in a similar manner based on the phase of the device within a supply chain.

20 Claims, 13 Drawing Sheets

(51) Int. Cl.
  *H01R 13/717* (2006.01)
  *H05B 47/11* (2020.01)

(56) References Cited

U.S. PATENT DOCUMENTS

| | | |
|---|---|---|
| 2010/0039792 A1 | 2/2010 | Meyers et al. |
| 2011/0133649 A1 | 6/2011 | Kreiner et al. |
| 2015/0155730 A1 | 6/2015 | Miller et al. |
| 2018/0274776 A1* | 9/2018 | Chien .................... A63H 3/003 |
| 2019/0041016 A1 | 2/2019 | Glennerster |

* cited by examiner

ILLUMINATED CHARGING CONNECTOR OR DEVICE AND ELECTRONIC DEVICE OR SYSTEM OPERABLE BASED ON PACKAGING STATUS

CROSS-REFERENCE TO RELATED APPLICATIONS

This application is a continuation of U.S. application Ser. No. 17/438,163, filed on Sep. 10, 2021, which claims the benefit of PCT/NZ2020/050022, filed Mar. 10, 2020, which claims the benefit of New Zealand Application No. 751523, filed Mar. 11, 2019. The entire disclosures of the above applications are incorporated herein by reference.

FIELD

The present invention relates to an illuminated connector or device and related circuits, to a method of illuminating a connector or other device for facilitating connection with an associated electronic device, and to a connector or other electronic device operable based on a packaging status.

INTRODUCTION

Connectable electronic devices such as desktop computers, laptop computers, tablet computers, smart phones, e-readers, speakers and the like, are typically capable of connection to other electronic devices or power sources via connectors such as cable connectors. For example, portable electronic devices having rechargeable batteries are typically charged by connecting the battery to an external power source via a charging connector. In a wired configuration, the charging connector needs to be physically coupled to the electronic device and to the power source. Physical coupling between the connector and the electronic device or the power source is normally achieved by connecting a connection element/interface of the connector to a corresponding port of the electronic device or power source. Existing interface types for connectors include, for example: Universal Serial Bus (USB), High-Definition Multimedia Interface (HDMI), DisplayPort, Ethernet, Apple™ Lightning, Thunderbolt, Firewire, Serial AT Attachment (SATA) and eSATA, and HDBaseT.

Electronic connectors, such as charging or other cable connectors can be difficult to locate in low light or dark environments. Furthermore, achieving physical connection between the device connection element and the corresponding port of the electronic device can be a cumbersome task in such conditions. Many connection types are "keyed" which exacerbates this difficulty by requiring a specific orientation between the device connection element and the electronic device. Such difficulties present a need for an illuminated connector that can be located and that facilitates connection with the electronic device in low light conditions.

This need has prompted the development of illuminated charging connectors and cables, for example that include an illumination source configured to facilitate location and/or connection with an electronic device. The illumination source is usually powered by an external power source when the connector is connected to the same. Such connectors typically suffer from their own shortcomings, however. For example, an illuminated connector in a dark environment can be uncomfortable to some users, particularly when the level of illumination is too high. Also, requiring connection with an external power source can limit the usability of the illumination feature to certain locations. Conversely, when a cable is not plugged into a power source it will provide no illumination making it difficult to find in the dark.

It would be beneficial to improve the functionality of illuminated connectors and/or associated electronic devices to enhance usability or user satisfaction.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an illuminated connector, or to provide circuits, devices, systems and/or methods that alleviates some of the shortcomings of existing connectors or electronic devices mentioned herein, or to at least provide the public with a useful choice.

SUMMARY

Summary of Electronic Connectors and Illumination Circuits

The following statements summarise various illuminated connector or illumination circuit related aspects of the invention and associated embodiments. Where appropriate, any one of the preferred, alternative or optional features or embodiments mentioned in relation to any one or more of the following connector or circuit related aspects, may be combined with any one or more other aspects summarised in the Summary of Invention section of this specification. For example, the features or embodiments of a connector or circuit related aspect herein described may be combined with another connector or circuit related aspect, or implemented in a related method, system or medium summarised in this section.

In one aspect, the invention may broadly be said to consist of an electronic connector for connecting with an electronic device, the electronic connector comprising:
 a device connection element for electronically and physically connecting to a corresponding port of the electronic device;
 an electronic, illumination circuit comprising:
 an illumination source;
 a light sensing device configured to output ambient light signals indicative of ambient light brightness surrounding the connector; and
 a controller configured to control a brightness of the illumination source based on the ambient light signals of the light sensing device, such that the controller reduces the brightness of the illumination source when the ambient light signals of the light sensing device indicate a reduced ambient light brightness.

In the preferred embodiment, the controller is further configured to increase the brightness of the illumination source when the ambient light signals of the light sensing device indicate an increased ambient light brightness.

In some embodiments, the controller is configured to control the brightness by adjusting a maximum intensity of light emanating from the illumination source. Alternatively, or in addition the controller is configured to control the brightness by adjusting an average intensity of light emanating from the illumination source over a period of time.

In the preferred embodiment, the controller is configured to control the illumination source by generating an illumination signal.

In the preferred embodiment, the illumination signal has a time-varying waveform.

Preferably, the controller is configured to control the brightness of the illumination source by controlling any one or more of the following parameters of the time-varying waveform: waveform frequency, waveform amplitude, waveform shape, waveform gradient(s) and/or waveform duty cycle.

In the preferred embodiment, the controller is configured to control the brightness of the illumination source by controlling a gain applied to the illumination signal.

Preferably the controller is configured to control the brightness of the illumination source by controlling a voltage gain and/or a current gain of the illumination signal.

In the preferred embodiment, the controller is configured to control the brightness of the illumination source using a pulse width modulated illumination signal.

Preferably, the controller is configured to control a duty cycle of the pulse width modulated illumination signal and wherein the duty cycle corresponds to a desired brightness of the illumination source.

Alternatively, or in addition, the controller is configured to control the gain of the illumination signal, and wherein the gain corresponds to a desired brightness of the illumination source.

Preferably the controller is configured to control the gain of the illumination source by controlling a voltage gain and/or a current gain of the illumination signal.

Preferably, the controller is configured to control the illumination signal based on ambient light signals of the light sensing device indicative of ambient light brightness sensed during some or all of the off-periods of the pulse width modulated illumination signal.

In some embodiment the controller may be further configured to control a time-varying brightness waveform of the illumination source.

The brightness waveform may be controlled based on the ambient light signals of the light sensing device.

In some embodiments the controller may be configured to control a colour output of the illumination source.

In the preferred embodiment, the controller is configured to control the brightness of the illumination source based on one or more alternative input signals.

Preferably, the controller is configured to adjust the brightness of the illumination source based on the one or more alternative input signal(s).

Alternatively, or in addition, the controller may be configured to adjust a colour of the illumination source based on the alternative input signal(s).

In the preferred embodiment, at least one of the alternative input signals is a user-activated input signal.

The user-activated input signal may be derived from any one or more of tactile, motion, proximity, audio and/or visual sensors of the illumination circuit, for example.

Preferably, the illumination circuit comprises a touch sensor and the user-activated input signal is indicative of a user touching the connector on or in the vicinity of the touch sensor. The touch sensor may be a resistive or capacitive sensor, or it may be a force or pressure sensor, or any other suitable sensor capable of identifying or generating a signal indicative of presence, duration, number or intensity of touch or any combination thereof. The controller may be configured to identify a predetermined touch pattern from the output of the touch sensor, wherein the touch pattern is defined by a combination of one or more of presence of touch, duration of touch, intensity of touch and/or number of consecutive touches.

Preferably, the controller is configured to activate the illumination source based on the user-activated input signal. The controller may be configured to activate the illumination source depending on the touch pattern.

Preferably, the controller is configured to increase the brightness of the illumination source when the user-activated input signal is detected.

In some embodiments, the user activated input signal is indicative of a duration of touch and the controller is configured to control the brightness in accordance with the duration of touch. The brightness may be controlled substantially proportionally to the duration of touch, for example.

In some embodiments the user activated input signal is indicative of an intensity of touch and the controller is configured to control the brightness in accordance with the intensity of touch. The brightness may be controlled substantially proportionally to the intensity of touch, for example. In some embodiments the user activated input signal is indicative of a touch pattern consisting of any combination of one or more of duration of touch, intensity of touch, and/or number of consecutive touches, and the controller is configured to control the brightness in accordance with the touch pattern. The brightness may be controlled based on a predetermined brightness profile associate with the determined touch pattern.

Preferably the illumination circuit comprises a proximity sensor configured to output a proximity signal indicative of a user's proximity to the connector, and wherein the controller is configured to control the brightness of the illumination signal in accordance with the proximity signal. For example, the controller may be configured to control the brightness proportionally to the detected user proximity In some embodiments, the one or more alternative input signals may include input signals received from one or more devices external to the connector. For example, the input signals may be received from one or more of: an external audio source, an external computing device, such as a gaming console, or an external peripheral device, such as a controller a gaming console.

In some embodiments, the one or more alternative input signals may include input signals received from one or more devices or elements internal to the connector. For example, the input signals may be received from one or more of: a voltage sensor, a current sensor, a temperature sensor, an audio sensor and/or a motion sensor.

In some embodiments, the connector may comprise a tactile generator configured to generate tactile output/feedback in response to one or more of the received alternative input signal(s). The tactile generator may be a vibrator, for example.

In some embodiments, the connector may comprise a sound output device such as a speaker and wherein the controller is configured to operate the speaker to generating audio feedback activated in response to one or more of the received alternative input signal(s).

In some embodiments, the controller may be configured to operate an illumination source to generate visual feedback in response to one or more of the received alternative input signal(s).

In the preferred embodiment, the connector is configured to connect to an external power source, and the controller is further configured to control the illumination circuit based on a connection status of the connector with the external power source.

Preferably the connector further comprises a power source connection element configured to connect to an external power source outlet.

Preferably a cable extends between the device connection element and the power source connection element for the transmission of current there between.

Preferably, the connector further comprises an on-board power source, separate to the external power source, for delivering power to the illumination circuit in at least one mode of operation.

The on-board power source forms part of the connector and is preferably internal to a housing of the connector (preferably substantially fully internal to the housing but alternatively partially internal to the housing). Alternatively the on-board power source is coupled external to the housing.

Preferably, the on-board power source is an energy storage device.

Preferably the energy storage device is rechargeable.

Preferably, the on-board power source is connected to a charging circuit within the connector and is rechargeable via supply of current from an external power source.

Alternatively, or in addition the on-board power source comprises an energy harvesting device or circuit for recharging the energy storage device. For example, the energy harvesting device or circuit may comprise any combination of one or more of: solar, kinetic, thermal, or wireless radio frequency (RF) based harvesting.

Preferably, the controller is operable in an externally powered mode of operation when the connector is connected to the external power source, and an internally-powered mode of operation when the connector is not connected to the external power source.

Preferably, in the internally-powered mode of operation, the illumination circuit is configured to draw an average current from the on-board power source that maintains operation of illumination circuit for a period of at least approximately 30 days, more preferably at least approximately 180 days, even more preferably at least approximately 360 days without recharge of the on-board power source and most preferably indefinitely.

Preferably, in the internally-powered mode of operation, the illumination circuit maintains an average current usage of approximately less than 10 uA, more preferably less than 1 uA.

Preferably in the internally powered mode of operation in the case where energy harvesting is used as part of the on-board power source the average current drawn should be less than or equal to the average current harvested.

Preferably, in the internally-powered mode of operation, the controller is configured to control the illumination source via a fading illumination signal having a current profile that oscillates between a maximum current value and a minimum current value over time.

Preferably, the controller is configured to control the brightness of the illumination source by controlling the amplitude or gain of the fading, illumination signal.

Preferably, the fading, illumination signal consists of recursive cycles having an up-cycle component in which the signal rises toward the maximum current value and a down-cycle component in which the signal declines toward the minimum current value.

Preferably a period of the up-cycle component differs to a period of the down-cycle component.

Preferably, the controller comprises an amplifier circuit operatively connected to the illumination source, and in the internally-powered mode of operation the controller is configured to generate the fading, illumination signal by controlling one or more input(s) of the amplifier circuit.

Preferably, the amplifier circuit comprises one or more analogue amplifiers. For example, the amplifier circuit may comprise one or more resistor-capacitor (RC) circuits coupled to one or more transistors or similar components such as a field effect transistor (FET or MOSFET).

Preferably, the controller is configured to recursively switch input(s) of the analogue amplifier circuit between an on-state, in which current is drawn through the output of the amplifier circuit to increase toward the maximum current value, and an off-state wherein the amplifier circuit's output current decreases toward the minimum current value.

Preferably, the controller comprises a timer having a predetermined, up-cycle trigger period and a predetermined, down-cycle trigger period, and wherein the controller is configured to control the amplifier circuit input(s) using the up-cycle trigger period and down-cycle trigger period.

In some embodiments, the controller further comprises a sampler for sampling value(s) of the illumination signal and wherein the controller is configured to switch state(s) of the input(s) of the amplifier circuit when consecutive value(s) of the illumination signal are substantially constant and/or vary within a predetermined threshold amount or percentage, and/or when the consecutive value(s) are within a predetermined threshold of the predetermined maximum or minimum values.

In some embodiments, the illumination circuit further comprises one or more comparators operatively connected to a load side of the amplifier circuit and wherein the controller is configured to utilise the comparator(s) to determine an up-cycle trigger condition, a down-cycle trigger condition, or both. The up-cycle trigger condition may be when an operating parameter, such as a voltage, at the load side of the amplifier circuit meets a predetermined up-cycle trigger criterion or criteria, such as a reference minimum voltage of the illumination signal. The down-cycle trigger condition may be when an operating parameter, such as a voltage, at the load side of the amplifier circuit meets a predetermined down-cycle trigger criterion or criteria, such as a reference maximum voltage of the illumination signal.

In some embodiments, the controller further comprises a memory circuit configured to maintain a signal indicative of a recent value of the illumination signal for a predetermined period, and wherein the controller is configured to operate the sampler and fade direction according to said recent value.

Preferably, the controller further comprises a digital processing unit operatively coupled to the amplifier circuit, the timer, and the sampler, for coordinating functions of the aforementioned to generate the fading, illumination signal.

Alternatively, the controller is comprised of analogue circuit(s) which may use discrete components and/or be implemented in an application specific integrated circuit (ASIC).

Preferably, in the externally-powered mode of operation, the controller is configured to control the illumination source via a pulse width modulated illumination signal.

Preferably, the controller is configured to control the brightness of the illumination source by controlling the duty cycle of the pulse width modulated illumination signal and/or the gain of the pulse width modulated signal.

In some embodiments, the controller is configured to control a gain of the illumination signal to adjust the brightness of the illumination source.

Preferably the connector further comprises a charging circuit configured to receive charging current from an external power source and deliver charging current to an on-board, rechargeable power source within the connector.

In some embodiments the connector is configured to deliver current to the electronic device when the connector is connected to the external power source and the device connection element is connected to the port of the electronic device.

The illumination source comprises one or more light emitting elements.

One or more light emitting elements may be a light emitting diode. Preferably each light emitting element is a light emitting diode (LED). The LED may be an Organic LED.

Preferably, one or more light emitting elements are configured to illuminate the connection element.

Preferably the illumination source is located at or adjacent to the device connection element.

In the preferred embodiment the light sensing device comprises one or more light sensing elements. For example, the light sensing element may be a photodiode.

Preferably each light sensing element further comprises one or more amplifiers associated with each light sensing element.

Preferably a gain of each amplifier is adjustable.

Preferably the controller is configured to adjust the gain based on an output of the associated light sensing element.

Preferably the controller is configured to increase the gain when the output of the associated light sensing element indicates a reduced ambient light brightness of the surrounding environment.

Preferably the controller is configured to decrease the gain when the output of the associated light sensing element indicates an increased ambient light brightness of the surrounding environment.

Preferably the controller further comprises one or more optical noise cancellation modules configured to filter noise components from the output of each light sensing element. The modules may be implemented digitally and/or in an analogue circuit.

In some embodiments, the controller is configured to determine a frequency response of ambient light based on the output signals of the light sensing device.

In some embodiments, the controller is configured to control the brightness of the illumination source based on the frequency response and/or amplitude of the sensed ambient light.

In some embodiments, the controller is configured to determine the ambient light brightness using any one or more of the following parameters determined from the output signals: a maximum intensity of light, an averaged intensity of light over a period of time, a waveform shape of light with a time-varying amplitude, and/or a frequency of a periodic and time-varying brightness waveform.

In some embodiments, the controller is configured to determine a frequency response of ambient light and to control the brightness of the illumination source based on the frequency response. For example, a brightness intensity of the illumination source(s) may be increased when certain light frequencies are dominant in the environment over others, such as blue light vs. yellow light. In some embodiments, the controller may be configured adjust a frequency response of light emitted from the illumination source based on the frequency response of ambient light. For example, the controller may be configured adjust a frequency response of lighted emitted from the illumination source to complement a frequency response of ambient light to improve visibility of emitted light in the ambient environment, such as emitting blue light in a red light environment.

In the preferred embodiment, the connector further comprises a voltage regulator operatively coupled to the illumination circuit.

In the preferred embodiment, the connection element is configured to deliver current and data signals to the electronic device.

Preferably the connection element is a Universal Serial Bus (USB) connection element.

In some embodiments, the connection element is an HDMI connection element

In some embodiments, the connection element is a Display port connection element.

In some embodiments, the connection element is an Ethernet connection element.

In some embodiments, the connection element is an Apple™ Lightning connection element.

In some embodiments, the connection element is a Thunderbolt connection element.

In some embodiments, the connection element is a firewire connection element.

In some embodiments, the connection element is an eSATA connection element.

In some embodiments, the connection element is an HDBaseT connection element.

In the preferred embodiment, the controller is configured to alter the brightness of the illumination sources upon receiving a signal indicative of a connection of the device connection element with the electronic device. For example, the controller may increase the brightness and/or adjust the colour and/or adjust the brightness waveform to indicate a connection with the electronic device.

In the preferred embodiment, the controller is configured to deactivate the illumination source upon receiving ambient light signals indicative the brightness of ambient light that exceeds a predetermined brightness threshold.

In the preferred embodiment, the controller is configured to maintain a minimum gain of the illumination signal when the ambient light signals indicate an ambient light brightness that is below a predetermined darkness threshold.

Preferably, the controller is configured to control the illumination source based on ambient light signals indicative of ambient light brightness sensed during periods of deactivation of the illumination source.

In some embodiments, the light sensing device is configured to receive light from regions that are substantially non-overlapping with a region of light generated by the illumination source.

In some embodiments the controller is configured to control the illumination source by:

acquiring from a look-up table stored in an associated electronic memory, data indicative of a desired illumination signal based on the received ambient light signals; and controlling the illumination source using the desired illumination signal.

The electronic memory component may comprise at least one computer readable medium.

The electronic memory component is preferably on-board the connector but may alternatively be remote and accessible via a communication system of the connector.

The look up table is preferably predetermined and pre-stored in the electronic memory.

In some embodiments, the controller is configured to control the illumination source by:
applying an algorithm or algorithms on the ambient light signals to determine a desired illumination signal; and
controlling the illumination source using the desired illumination signal.

In some embodiments, the controller may utilise an algorithm and a look-up table to control the illumination source based on the ambient light signals.

In some embodiments, the controller may utilise an algorithm and/or look-up table associated with multiple input parameters, including the ambient light signals and one or more other parameters. Other parameters may include values derived from one or more alternative input signals.

In some embodiments, the connector may include a microcontroller used to communicate directly with the electronic device via a standard or custom protocol.

In some embodiments the connector further comprises a power source connection element configured to connect the connector to an external power source outlet.

Preferably the power source connection element is at an end of the connector opposing the device connection element.

In some embodiments the connector further comprises a speaker configured to generate sound originating from within the vicinity of the power source connection element.

In some embodiments the connector further comprises a haptic feedback device configured to generate haptic feedback from the connector.

In some embodiments the controller is further configured to operate the illumination source and/or the speaker and/or the haptic feedback device in accordance with one or more received input signal(s).

The received input signals may include input signals received from one or more devices external to the connector. For example, the input signals may be received from one or more of: an external audio source, an external computing device or the like.

Alternatively, or in addition, the received input signals may include input signals received from one or more devices or elements internal to or on-board the connector. For example, the input signals may be received from one or more of: a voltage sensor, a current sensor, a temperature sensor, an audio sensor, a touch sensor, a tactile sensor, a proximity sensor, a motion sensor or the like.

In some embodiments the controller is further configured to operate the illumination source the speaker and/or the haptic feedback device in accordance with a predetermined sequence of touch events. A touch event may be classified in accordance with one or more touch-related parameters such as presence, duration, number and/or intensity of touch.

In some embodiments, the connector comprises a power connection element configured to connect to a power source.

The power source connection element may be configured to connect to a power source only.

The power source may be an AC power source, such as a mains connection in a dwelling.

The power source may alternatively be a DC power source, such as a power bank connection.

In the preferred embodiment the illumination circuit comprises a plurality of illumination sources and the controller is configured to control one or more of the illumination sources in accordance with any one of the embodiments or features described herein in relation to the illumination source. One or more illumination sources of the illumination circuit may be controlled synchronously and/or one or more illumination sources may be controlled independently. One or more illumination sources are preferably configured to illuminate a region surrounding or in the vicinity of the device connection element. One or more illumination sources may be configured to illuminate a region surrounding or in the vicinity of the power connection element.

In some embodiments the illumination circuit may comprise two or more illumination sources configured to propagate light in varying directions from the connector. For example, the illumination circuit may comprise at least one illumination source configured to propagate light from a first side of the connector and at least one other illumination source configured to propagate light from a second side of the connector. The first side of the connector may oppose the second side of the connector such that light propagates in opposing directions from the respective illumination sources. The first and second sides may be at the same end of the connector, for example at, or adjacent to the device connection element.

In the preferred embodiment the illumination circuit comprises a plurality of light sensing devices and the controller may be configured to control one or more of the light sensing devices in accordance with any of the embodiments or features herein described in relation to the light sensing device.

In some embodiments, the illumination circuit comprises a plurality of light sensing devices configured to determine ambient light brightness adjacent to, two or more varying regions or sides of the connector. For example, the illumination circuit may comprise at least one light sensing device configured to determine ambient light brightness adjacent to a first side of the connector and at least one other light sensing device configured to determine ambient light brightness adjacent to a second side of the connector. The first and second sides may be at the same end of the connector, for example adjacent to the device connection element. The first side of the connector may oppose the second side of the connector such that light is sensed from opposing sides of the connector.

The illumination circuit may be configured to determine an average light brightness from two or more light sensing devices and to control one or more illumination sources based on the averaged light brightness. Alternatively, or in addition, the illumination circuit may be configured to independently control one or more illumination sources corresponding to each light sensing device based on the output of the light sensing device. For example, the illumination circuit may be configured to control an illumination source based on the output of an associated light sensing device on the same or similar side of the connector as the illumination source.

In some embodiments, the controller is configured to operate the illumination circuit in one of a plurality of predefined modes of operation, comprising a standard mode of operation in which the illumination source may be activated for at least a period of time during the standard mode of operation, and a sleep mode in which illumination source is substantially deactivated until at least one predetermined trigger condition is detected by the controller.

In some embodiments, the illumination circuit is configured to draw power from the on-board power source during the sleep mode.

In some embodiments, the controller is configured to automatically activate the illumination source upon detection of the predetermined trigger condition.

In some embodiments, the predetermined trigger condition is indicative of termination of a shipping phase of the connector within a supply chain.

In some embodiments, the predetermined trigger condition is indicative of removal of packaging associated with the connector. The predetermined trigger condition may be indicative of removal of packaging adjacent at least a predefined region of the connector. The predetermined trigger condition may be indicative of removal of a part of the packaging. The part of the packaging may be located at or adjacent to a detection element of the connector configured to output data indicative of removal of the part of the packaging.

In some embodiments, the controller is further configured to automatically operate the connector in the sleep mode when a predetermined sleep-mode trigger condition is detected. The sleep mode trigger condition may be indicative of the connector being packaged. The predetermined sleep-mode trigger condition may be indicative of a user locating part of the packaging at or adjacent a detection element of the connector.

In some embodiments, in the sleep mode the controller is substantially intermittently operated during one or more time intervals to enable detection of the predetermined trigger condition, and is otherwise deactivated for a remaining period of the sleep mode to conserve energy of the on-board power source.

In some embodiments, the illumination source(s) may be activated based on one or more input parameters or operational parameters observable by the controller. The input parameters may include one or more of: a light-sensing related parameter, a touch-sensing related parameter, a data-signal related parameter.

In some embodiments, the predetermined trigger condition is based on at least one input or operational parameter observable by the controller. The input or operational parameter(s) may comprise at least one light sensing related parameter and the predetermined trigger condition may include a minimum threshold value of the light sensing parameter, indicative of exposure of the device to light. The light sensing device may be located in a region of the connector that is configured to be uncovered by the removal of at least a part of the packaging after the shipping phase of the supply chain. The at least one predetermined trigger condition may comprise a light sensing input that is indicative of the packaging being removed from a location that is adjacent the light sensing device. For example, the illumination source(s) may be triggered into the standard mode when the light sensing parameter indicates an ambient light brightness that is above a predetermined darkness threshold.

In some embodiments, at least one predetermined trigger condition is associated with an input parameter indicative of a presence of packaging surrounding the connector. The input parameter may comprise a light sensing input. Alternatively, or in addition, the input parameter may comprise a packaging input indicative of a location of packaging relative to the connector. The trigger condition may be when the packaging is located at or beyond a predetermined distance relative to the connector. For example, an output from a magnetic sensor, such as a hall-effect sensor, may be receivable by the controller of the electronic device to indicate location of the sensor relative to a corresponding magnetic element based on the strength of the magnetic field detected. A magnetic field strength below a predetermined threshold may indicate the removal of packaging from the connector. The magnetic sensor may be located on the connector or on the packaging, and the corresponding magnetic element may be placed on the other of the packaging or the connector respectively.

In some embodiments, the connector is triggered into the sleep mode when at least one predetermined sleep mode trigger condition is detected by the controller.

In some embodiments, at least one predetermined sleep-mode trigger condition is based on at least one input or operational parameter observable by the controller. The input or operational parameter(s) may comprise any combination of one or more of: at least one timer related parameter; or at least one light sensing related parameter, or both. At least one predetermined threshold criterion may be associated with each parameter for satisfying the trigger condition. For example, the illumination circuit may be triggered into the sleep mode when one or more of the following trigger conditions are detected by the controller:

a light sensing parameter value indicative of an ambient light brightness is at or below a predetermined darkness threshold;

a first timer value relating to first timer parameter is at or above a predetermined first timer threshold period; and/or a second timer value relating to a second timer parameter is at or above a predetermined second timer threshold period.

The first timer may be initiated by the controller after a preceding operational mode has concluded, such as a pre-sleep mode.

The second timer may be initiated by the controller after receiving a light sensing parameter value indicative of an ambient light brightness that is at or below a predetermined darkness threshold.

In some embodiments, at least one predetermined sleep-mode trigger condition is based on at least one light sensing input parameter observable by the controller. The input sensing light parameter may be indicative of light surrounding a light sensing device of the connector. The light sensing device may be located in a region of the connector that is configured to be covered by packaging during the shipping phase of the supply chain. The at least one predetermined sleep-mode trigger condition may comprise a light sensing input that is indicative of the connector being packaged for shipping, such as a light sensing input that is at or below a predetermined darkness threshold.

In some embodiments, at least one predetermined sleep-mode trigger condition is associated with an input parameter indicative of a presence of packaging surrounding the connector. The input parameter may comprise a light sensing input. Alternatively, or in addition, the input parameter may comprise a packaging input indicative of a location of packaging relative to the connector. For example, an output from a magnetic sensor, such as a hall-effect sensor, may be receivable by the controller of the connector to indicate location of the sensor relative to a corresponding magnetic element based on the strength of the magnetic field detected. A magnetic field strength above a predetermined threshold may indicate packaging of the connector. The magnetic sensor may be located on the connector or on the packaging, and the corresponding magnetic element may be placed on the other of the packaging or the connector respectively.

In some embodiment the connector further comprises non-volatile electronic memory or extremely low power memory accessible by the controller for writing a new mode of operation of the device thereto and reading a current mode of operation therefrom. In some embodiments, the controller may be configured to trigger a new mode of operation based on a mode of operation written into the memory. For example, the controller may be configured to write operational-mode data into memory indicative of the sleep-mode when triggered into the sleep-mode, and may subsequently only trigger the device into the standard mode of operation when the predetermined standard mode trigger condition is observed and when the operational-mode data stored in memory is indicative of the sleep mode.

In another aspect, the invention may broadly be said to consist of an electronic connector for connecting with an electronic device, the electronic connector comprising:
- a device connection element for electronically and physically connecting to a corresponding port of the electronic device;
- a power source connection element for electronically connecting to an external power source; and
- an electronic, illumination circuit having:
- an illumination source; and
- a controller configured to operate the illumination source based on a connection status of
- the power source connection element with the external power source.

In the preferred embodiment, the connector is further configured to receive power from a second power source, separate to the external power source.

Preferably the second power source is an on-board power source and wherein the illumination circuit is configured to receive input power from the on-board power source in at least one mode of operation.

Preferably the on-board power source is an energy storage device. The energy storage device is preferably rechargeable.

The rechargeable energy storage device may be charged via the external power source when the power source connection element is connected to the external power source. Preferably the connector comprises a charging circuit for recharging the energy storage device via the external power source.

Alternatively, or in addition the on-board power source may comprise an energy harvesting device or circuit for recharging the energy storage device. For example, the energy harvesting device or circuit may comprise any combination of one or more of: solar, kinetic, thermal, or wireless radio frequency (RF) based harvesting.

In the preferred embodiment, the illumination circuit is configured to operate the illumination source in accordance with an externally-powered mode of operation when the power source connection element is connected to the external power source.

Preferably, the connector is configured to operate the illumination source via the on-board power source in accordance with an internally-powered mode of operation when the power source connection element is not connected to the external power source.

Preferably, in the internally-powered mode of operation, the illumination circuit is configured to draw an average current from the on-board power source that maintains operation of illumination circuit for a period of at least approximately 30 days, more preferably at least approximately 180 days, even more preferably at least approximately 360 days without recharge of the on-board power source and most preferably indefinitely.

Preferably, in the internally-powered mode of operation, the illumination circuit maintains an average current usage of approximately less than 10 uA, more preferably less than 1 uA.

Preferably in the internally powered mode of operation in the case where energy harvesting is used as part of the on-board power source the average current drawn should be less than or equal to the average current harvested.

Preferably, in the internally-powered mode of operation, the controller is configured to control the illumination source via a fading, illumination signal having a current profile that oscillates between a maximum current value and a minimum current value.

Preferably, the controller is configured to control a brightness of the illumination source by controlling the amplitude and/or gain of the fading, illumination signal.

Preferably, in the externally-powered mode of operation, the controller is configured to control the illumination source via a pulse width modulated illumination signal.

Preferably, the controller is configured to control the brightness of the illumination source by controlling the duty cycle of the pulse width modulated illumination signal and/or the gain of the pulse width modulated signal.

In some embodiments, the controller is configured to control a gain of the illumination signal to adjust a brightness of the illumination source.

Preferably, the illumination circuit is configured to draw relatively less power in the internally-powered mode of operation relative to power drawn in the externally-powered mode of operation. For example, the illumination circuit may draw less than approximately 10% power in the internally-powered mode of operation, relative to the externally-powered mode of operation. More preferably power drawn in the internally-powered mode of operation is less than approximately 1% of power drawn in the externally-powered mode of operation. Even more preferably power drawn in the internally-powered mode of operation is less than approximately 0.1% of power drawn in the externally-powered mode of operation. Most preferably power drawn in the internally-powered mode of operation is less than approximately 0.01% of power drawn in the externally-powered mode of operation.

Preferably a cable extends between the device connection element and the power source connection element for the transmission of current therebetween.

In the preferred embodiment, the illumination circuit further comprises:
- a light sensing device configured to generate ambient light signals indicative of a brightness of ambient light surrounding the light sensing device; and
- a controller configured to control a brightness of the illumination source based on the ambient light signals of the light sensing device.

Preferably, the controller is configured to reduce a brightness of the illumination source when the ambient light signals indicate a reduced ambient light brightness.

Preferably, the controller is configured to increase a brightness of the illumination source when the ambient light signals indicate an increased ambient light brightness.

Alternatively, the controller is configured to reduce a brightness of the illumination source when the ambient light signals indicate an increased ambient light brightness and/or increase a brightness of the illumination source when the ambient light signals indicate a reduced ambient light brightness.

In the preferred embodiment, the controller is configured to reduce the brightness or deactivate the illumination source upon receiving a signal indicative of a connection of the device connection element with the electronic device.

In some embodiments, the controller is configured to operate or control the brightness of the illumination source based on one or more alternative input signals. In some embodiments, at least one of the alternative input signals is a user-activated input signal. The user-activated input signal may be derived from any one or more of tactile, motion, proximity, audio and/or visual sensors of the illumination circuit, for example. Preferably, the illumination circuit comprises a touch sensor and the user-activated input signal is indicative of a user touching the connector on or in the vicinity of the touch sensor.

In some embodiments, the controller is configured to operate the illumination circuit in one of a plurality of predefined modes of operation, comprising a standard mode of operation in which the illumination source may be activated for at least a period of time during the standard mode of operation, and a sleep mode in which illumination source is substantially deactivated until at least one predetermined trigger condition is detected by the controller.

In some embodiments, the illumination circuit is configured to draw power from the on-board power source during the sleep mode.

In some embodiments, the controller is configured to automatically activate the illumination source upon detection of the predetermined trigger condition.

In some embodiments, the predetermined trigger condition is indicative of termination of a shipping phase of the connector within a supply chain.

In some embodiments, the connector comprises at least illumination source. In some embodiments, the connector comprises a plurality of illumination sources.

In another aspect the invention may broadly be said to consist of an electronic connector for connecting with an electronic device, the electronic connector comprising:
  a device connection element for electronically and physically connecting to a corresponding port of the electronic device;
  an illumination circuit having at least one illumination source; and
  an on-board power source for supplying power to the illumination source.

In some embodiments, the connector further comprises a cable extending from the device connection element for electrically connecting the device connection element to another device or power source.

In some embodiments, the connector comprises a second connection element at an opposing end of the cable to the device connection element, for electrically connecting to another device or to an external power source.

In some embodiments the illumination circuit further comprises a controller configured to operate the illumination source based on a connection status of the second connection element with the external power source.

In some embodiments the controller is configured to operate at least one of the illumination source(s) in accordance with an externally-powered mode of operation when the second connection element is connected to the external power source.

In some embodiments the controller is configured to operate the at least one illumination source(s) to output a substantially constant brightness in the externally-powered mode of operation.

In some embodiments the controller is configured to increase a brightness of at least one of the illumination source(s) when the second connection element is connected to the external power source.

In some embodiments the controller is configured to operate at least one of the illumination source(s) via the on-board power source in accordance with an internally-powered mode of operation when the second connection element is not connected to the external power source.

In some embodiments in the internally-powered mode of operation, the illumination circuit is configured to draw an average current from the on-board power source that is substantially lower than the average current drawn in the externally powered mode of operation.

In some embodiments in the internally-powered mode of operation, the controller is configured to control at least one of the illumination source(s) via a fading, illumination signal having a current profile that oscillates between a maximum current value and a minimum current value.

In some embodiments each of the illumination source(s) is operable to illuminate the device connection element when activated.

In some embodiments the on-board power source is an energy storage device.

In some embodiments the energy storage device is rechargeable.

In some embodiments the illumination circuit comprises a controller configured to control operation of the illumination source(s).

In some embodiments the illumination circuit further comprises at least one light sensing device configured to output ambient light signals indicative of ambient light brightness surrounding the connector, and the controller is configured to control a brightness of at least one of the illumination source(s) based on the ambient light signals of at least one of the light sensing device(s).

In some embodiments the controller is configured to reduce the brightness of at least one of the illumination source(s) when the ambient light signals of the corresponding light sensing device(s) indicate a reduced ambient light brightness.

In some embodiments the controller is configured to increase the brightness of at least one of the illumination source(s) when the ambient light signals of the corresponding light sensing device(s) indicate an increased ambient light brightness.

In some embodiments the controller is configured to control at least one of the illumination source(s) based on ambient light signals indicative of ambient light brightness sensed during periods of deactivation of the illumination source.

In some embodiments at least one of the light sensing device(s) is configured to receive light from regions that are substantially non-overlapping with a region of light generated by the illumination source(s).

In some embodiments the controller is configured to determine the ambient light brightness using any one or more of the following parameters determined from an output of at least one of the light sensing device(s): a maximum intensity of light, an averaged intensity of light over a period of time, a waveform shape of light with a time-varying amplitude, and/or a frequency of a periodic and time-varying brightness waveform.

In some embodiments the controller is configured to activate at least one of the illumination source(s) based on one or more user-activated input signals.

In some embodiments the controller is configured to alter a brightness of at least one of the illumination source(s) based on one or more user-activated input signals.

In some embodiments the connector further comprises a touch sensor and the user-activated input signal is indicative of a user touching the connector on or in the vicinity of the touch sensor.

In some embodiments the controller is configured to increase a brightness of at least one of the illumination source(s) upon receiving an input signal indicative of a user touching the connector on or in the vicinity of the touch sensor.

In some embodiments the controller is configured to gradually increase brightness of at least one of the illumination source(s) upon receiving an input signal indicative of a user touching the connector on or in the vicinity of the touch sensor.

In some embodiments the controller is configured to decrease a brightness of at least one of the illumination source(s) upon receiving a signal indicative of a user no longer touching the connector on or in the vicinity of the touch sensor.

In some embodiments the controller is configured to gradually decrease brightness of at least one of the illumination source(s) upon receiving a signal indicative of a user no longer touching the connector on or in the vicinity of the touch sensor.

In some embodiments the controller is further configured to operate each of the illumination source(s) responsive to the user-activation signals as per the operation of the illumination source(s) as claimed in any one or more of claim 15 to claim 18.

In some embodiments the controller is configured to operate the illumination circuit in one of a plurality of predefined modes of operation, comprising a standard mode of operation in which the illumination source(s) may be activated for at least a period of time during the standard mode of operation, and a sleep mode in which the illumination source(s) is(are) substantially deactivated until at least one predetermined trigger condition is detected by the controller.

In some embodiments the illumination circuit is configured to draw power from the on-board power source during the sleep mode.

In some embodiments the controller is configured to trigger the illumination circuit into the standard mode and automatically activate at least one of the illumination source(s) upon detection of the predetermined trigger condition.

In some embodiments the predetermined trigger condition is indicative of removal of packaging associated with the connector.

In some embodiments the connector further comprises a packaging detection element configured to output data indicative of a presence or absence of packaging located at or adjacent to the packaging detection element, and wherein the predetermined trigger condition is determined by the controller from the output of the packaging detection element.

In some embodiments the packaging detection element is a light sensing device configured to output data indicative of a surrounding ambient light brightness.

In some embodiments the predetermined trigger condition is an ambient light brightness that is at or above a predetermined brightness threshold.

In some embodiments wherein the light sensing device is located at or adjacent to at least one the illumination source(s) activated when the predetermined trigger condition is detected.

In some embodiments the controller is further configured to automatically operate the connector in the sleep mode when a predetermined sleep-mode trigger condition is detected.

In some embodiments the sleep mode trigger condition is indicative of the connector being packaged.

In some embodiments in the sleep mode the controller is substantially intermittently operated during one or more time intervals to enable detection of the predetermined trigger condition, and is otherwise deactivated for a remaining period of the sleep mode to conserve energy of the on-board power source.

In some embodiments the connector comprises a packaging detection element configured to output data indicative of presence or absence of packaging located at or adjacent to the packaging detection element, and wherein the predetermined sleep trigger condition is determined by the controller from the output of the packaging detection element.

In some embodiments the packaging detection element is a light sensing device configured to output data indicative of a surrounding ambient light brightness.

In some embodiments the predetermined sleep trigger condition is an ambient light brightness that is at or below a predetermined darkness threshold.

In some embodiments the light sensing device is located at or adjacent to the illumination source(s) activated when the predetermined trigger condition is detected.

In some embodiments the predetermined sleep mode trigger condition comprises any combination of one or more of:
- an ambient light brightness that is at or below a predetermined darkness threshold;
- a first timer value that is at or above a predetermined first timer threshold period; and/or
- a second timer value that is at or above a predetermined second timer threshold period.

In some embodiments the controller further comprises non-volatile electronic memory or extremely low power memory accessible by the controller for writing a new mode of operation of the device thereto and reading a current mode of operation therefrom.

In some embodiments controller may be configured to trigger a new mode of operation based on a mode of operation written into the memory.

In some embodiments at least one of the illumination source(s) is configured to illuminate the device connection element.

In some embodiments the on-board power source and at least one of the illumination source(s) are located at the same connection end of the connector.

In some embodiments the at least one illumination source comprises a single illumination source.

In some embodiments the at least one illumination source comprises a plurality of illumination sources.

In another aspect, the invention may broadly be said to consist of an electronic connector for connecting with an electronic device, the electronic connector comprising:
a device connection element for electronically and physically connecting to a corresponding port of the electronic device;
an electronic, illumination circuit comprising:
an illumination source; and
a controller configured to control a brightness of the illumination source by generating an illumination signal, the controller having:
a fading sub-circuit configured to fade the illumination signal between a maximum amplitude and a minimum amplitude; and
a pulse width modulator (PWM) sub-circuit configured to apply pulse width modulation to the illumination signal.

In the preferred embodiment, the controller further comprises a maximum brightness adjustment sub-circuit configured to enable adjustment of the maximum amplitude of and/or gain applied to the illumination signal.

In the preferred embodiment, the connector is configured to connect to an external power source, and the controller is further configured to control the illumination circuit based on a connection status of the connector with the external power source.

Preferably the connector further comprises a power source connection element configured to connect to an external power source outlet.

Preferably a cable extends between the device connection element and the power source connection element for the transmission of current there between.

Preferably, the connector further comprises an on-board power source, separate to the external power source, for delivering power to the illumination circuit in at least one mode of operation.

Preferably, the on-board power source is an on-board energy storage device. The on-board storage device is preferably rechargeable.

In the preferred embodiment, the fading sub-circuit is configured to operate in at least one mode of operation and the pulse width modulator sub-circuit is configured to operate in at least one other mode of operation.

In the preferred embodiment, the controller further comprises a processing component and a memory component, and wherein the processing component is configured to execute instructions stored in the memory component to identify a mode of operation and control the illumination source via the fading sub-circuit or pulse width modulator circuit accordingly.

In the preferred embodiment, the connector is configured to operatively couple an external power source for the supply of power to the illumination circuit.

Preferably, an externally-powered mode of operation corresponds to a connected status of an external power to the connector and an internally-powered mode of operation corresponds to a disconnected status of the external power source to the illumination circuit.

Preferably, the connector further comprises an on-board power source and the illumination circuit is operative in the internally-powered mode of operation using the on-board power source.

Preferably, in the externally-powered mode of operation the controller utilises the PWM sub-circuit to control the illumination signal and in the internally-powered mode of operation the controller utilises the fading sub-circuit to control the illumination signal.

In the preferred embodiment, the fading sub-circuit is configured to control the brightness of the illumination source by controlling the amplitude or gain of the fading, illumination signal.

Preferably the PWM sub-circuit is configured to control a duty cycle of the pulse width modulated illumination signal and wherein the duty cycle corresponds to a desired brightness of the illumination source.

Alternatively, or in addition, the PWM sub-circuit is configured to control the gain of the illumination signal, and wherein the gain corresponds to a desired brightness of the illumination source.

In the preferred embodiment, the controller further comprises a light sensing sub-circuit configured to output ambient light signals indicative of ambient light conditions surrounding the light sensing sub-circuit.

Preferably, the controller is configured to adjust the brightness of the illumination source based on the ambient light signals.

Preferably, the controller further comprises a processing component and a memory component, and wherein the processing component is configured to execute instructions stored in the memory component to:
  receive the ambient light signals; and
  operate the fading sub-circuit or pulse width modulation sub-circuit according to the mode of operation, to adjust a brightness of the illumination source according to the ambient light signals.

In some embodiments, the controller is configured to operate or control the brightness of the illumination source based on one or more alternative input signals. In some embodiments, at least one of the alternative input signals is a user-activated input signal. The user-activated input signal may be derived from any one or more of tactile, motion, proximity, audio and/or visual sensors of the illumination circuit, for example. Preferably, the illumination circuit comprises a touch sensor and the user-activated input signal is indicative of a user touching the connector on or in the vicinity of the touch sensor.

In some embodiments, the controller is configured to operate the illumination circuit in one of a plurality of predefined modes of operation, comprising a standard mode of operation in which the illumination source may be activated for at least a period of time during the standard mode of operation, and a sleep mode in which illumination source is substantially deactivated until at least one predetermined trigger condition is detected by the controller.

In some embodiments, the illumination circuit is configured to draw power from the on-board power source during the sleep mode.

In some embodiments, the controller is configured to automatically activate the illumination source upon detection of the predetermined trigger condition.

In some embodiments, the predetermined trigger condition is indicative of termination of a shipping phase of the connector within a supply chain.

In some embodiments, the connector comprises at least illumination source. In some embodiments, the connector comprises a plurality of illumination sources.

In another aspect, the invention may broadly be said to consist of an electronic connector for connecting with an electronic device, the electronic connector comprising:
  a device connection element for electronically and physically connecting to a corresponding port of the electronic device;
  an electronic, illumination circuit having:
  an illumination source; and
  a controller configured to operate the illumination circuit in one of a plurality of predefined modes of operation, comprising a standard mode of operation in which the illumination source may be activated for at least a period of time during the standard mode of operation, and a sleep mode in which illumination source is substantially deactivated until at least one predetermined trigger condition is detected by the controller.

In some embodiments, the connector further comprises an on-board power source configured to supply power to the illumination circuit during one or more modes of operation.

In some embodiments, the illumination circuit is configured to draw power from the on-board power source during the sleep mode.

In some embodiments, the connector further comprises a power-source connection element configured to connect the illumination circuit to an external power source for operating the illumination circuit. The illumination circuit may be configured to draw power from the on-board power source of the external power source during the standard mode of operation depending on a connection status of the power-source connection element.

In some embodiment, in the sleep mode the controller is substantially intermittently operated during one or more time intervals to enable detection of the predetermined trigger condition, and is otherwise deactivated for a remaining period of the sleep mode to conserve energy, for example of the on-board power source or of another power source supplying power to the connector in the sleep mode. The controller may be operated intermittently for a period of time sufficient to observe one or more trigger parameters relating to the predetermined trigger condition, and to deactivate substantially immediately thereafter if the trigger condition is not met. The controller may be activated substantially periodically to monitor for the predetermined trigger condition in the sleep mode.

In some embodiments, in the standard mode of operation the illumination source may be activated based on one or more input parameters or operational parameters observable by the controller. The input parameters may include one or more of: a light-sensing related parameter, a touch-sensing related parameter, a data-signal related parameter.

In some embodiments, at least one predetermined trigger condition is based on at least one input or operational parameter observable by the controller. The input or operational parameter(s) may comprise at least one light sensing related parameter and the predetermined trigger condition may include a minimum threshold value of the light sensing parameter. For example, the illumination circuit may be triggered into the standard mode when the light sensing parameter indicates an ambient light brightness that is above a predetermined darkness threshold.

In some embodiments, the illumination circuit is triggered into the sleep mode when at least one predetermined sleep mode trigger condition is detected by the controller.

In some embodiments, at least one predetermined sleep-mode trigger condition is based on at least one input or operational parameter observable by the controller. The input or operational parameter(s) may comprise any combination of one or more of: at least one timer related parameter; or at least one light sensing related parameter, or both. At least one predetermined threshold criterion may be associated with each parameter for satisfying the trigger condition. For example, the illumination circuit may be triggered into the sleep mode when one or more of the following trigger conditions are detected by the controller:
  a light sensing parameter value indicative of an ambient light brightness is at or below a predetermined darkness threshold;
  a first timer value relating to first timer parameter is at or above a predetermined first timer threshold period; and/or
  a second timer value relating to a second timer parameter is at or above a predetermined second timer threshold period.

The first timer may be initiated by the controller after a preceding operational mode has concluded, such as a pre-sleep mode.

The second timer may be initiated by the controller after receiving a light sensing parameter value indicative of an ambient light brightness that is at or below a predetermined darkness threshold.

In some embodiments the illumination circuit is further configured to operate in a pre-sleep mode in which the controller is configured to monitor for the at least one predetermined sleep mode trigger condition.

In some embodiments the illumination circuit may be configured to trigger into the pre-sleep mode when the controller detects one or more predetermined pre-sleep trigger conditions. The pre-sleep mode trigger conditions may comprise any combination of one or more of a light sensing related trigger, a touch sensing related trigger, a power-source related trigger and/or a data signal related trigger. For example, the pre-sleep trigger condition may comprise a predetermined light sensing input signal indicative of a predetermined brightness threshold, frequency threshold, frequency response and/or a flicker sequence. In another example, the pre-sleep trigger condition may (alternatively or additionally) comprise disconnection of an external power source from the connector.

In some embodiments the illumination circuit may be configured to operate in a testing mode prior to the pre-sleep mode in which the illumination circuit is operated in accordance with one or more testing methods. The testing mode may require a connection of the connector to an external power source. The pre-sleep trigger condition may be indicative of completion of one or more of the testing methods.

In some embodiment the illumination circuit further comprises non-volatile electronic memory or extremely low power memory accessible by the controller for writing a new mode of operation of the illumination circuit thereto, and reading a current mode of operation therefrom. In some embodiments, the controller may be configured to trigger a new mode of operation based on a mode of operation written into the memory. For example, the controller may be configured to write operational-mode data into memory indicative of the sleep-mode when triggered into the sleep-mode, and may subsequently only trigger the illumination circuit into the standard mode of operation when the predetermined standard mode trigger condition is observed and when the operational-mode data stored in memory is indicative of the sleep mode.

In another aspect, the invention may broadly be said to consist of an electronic, illumination circuit comprising:
  an illumination source; and
  a controller configured to control a brightness of the illumination source by generating an illumination signal, the controller having:
    a fading sub-circuit configured to fade the illumination signal between a maximum amplitude and a minimum amplitude; and
    a pulse width modulator (PWM) sub-circuit configured to apply pulse width modulation to the illumination signal.

The electronic, illumination circuit may comprise any one or more of the features of the illumination circuit of any one of the other aspects summarised in the Summary of Invention section of this specification.

Summary of Methods of Operating an Electronic Connector

The following statements summarise various aspects relating to methods for operating an illuminated connector or illumination circuit, and associated embodiments. Where appropriate, any one of the preferred, alternative or optional features or embodiments mentioned in relation to any one or more of the following method related aspects, may be combined with any one or more other aspects summarised in the Summary of Invention section of this specification. For example, the features or embodiments of a method related aspect herein described may be combined with another method related aspect, or implemented in a related device, circuit, system or medium summarised in this section.

In another aspect, the invention may broadly be said to consist of a method for facilitating connection of an electronic connector with an electronic device, the method comprising the steps of:
- activating an illumination source of the connector to illuminate a region surrounding the connector and improve visibility of the connector;
- receiving ambient light signals indicative of ambient light brightness surrounding the electronic connector; and
- controlling a brightness of the illumination source based on the ambient light signals, to reduce the brightness of the illumination source when the ambient light signals indicate a reduced ambient light brightness.

In the preferred embodiment, the method further comprises controlling the brightness of the illumination source when the ambient light signals indicate an increased ambient light brightness.

In some embodiments, the method comprises controlling the brightness by adjusting a maximum intensity of light emanating from the illumination source. Alternatively, or in addition the method comprises controlling the brightness by adjusting an average intensity of light emanating from the illumination source over a period of time.

In the preferred embodiment, the method comprises controlling the illumination source by generating an illumination signal.

In the preferred embodiment, the illumination signal has a time-varying waveform.

Preferably, the method comprises controlling the brightness of the illumination source by controlling any one or more of the following parameters of the time-varying waveform: waveform frequency, waveform amplitude, waveform shape, waveform gradient(s) and/or waveform duty cycle.

In the preferred embodiment, the method comprises controlling the brightness of the illumination source by controlling a gain applied to the illumination signal.

Preferably the method comprises controlling the brightness of the illumination source by controlling a voltage gain and/or a current gain of the illumination signal.

In the preferred embodiment, the step of controlling the brightness of the illumination source comprises controlling the brightness of the illumination source using a pulse width modulated illumination signal.

Preferably, the step of controlling the brightness of the illumination source comprises controlling a duty cycle of the pulse width modulated illumination signal and wherein the duty cycle corresponds to a desired brightness of the illumination source.

Alternatively, or in addition, the step of controlling the brightness of the illumination source comprises controlling a gain of the illumination signal, and wherein the gain corresponds to a desired brightness of the illumination source.

Preferably, the step of controlling the brightness of the illumination source comprises controlling the illumination source based on received ambient light signals indicative of ambient light brightness sensed during off-periods of the pulse width modulated illumination signal.

In some embodiment the method may further comprise the step of controlling a time-varying brightness waveform of the illumination source.

The brightness waveform may be controlled based on the received ambient light signals.

In some embodiments the method further comprises controlling a colour output of the illumination source.

In the preferred embodiment, the method further comprises the steps of receiving one or more alternative input signals and controlling the brightness of the illumination source based on the one or more alternative input signals.

In some embodiments the method comprises adjusting a colour output of the illumination source based on the alternative input signal(s).

In the preferred embodiment, at least one of the alternative input signals is a user-activated input signal.

The user-activated input signal may be derived from any one or more of tactile, motion, proximity, audio and/or visual sensors, for example.

Preferably, the user-activated input signal derived from a touch sensor and is indicative of a user touching the connector on or in the vicinity of the touch sensor. The touch sensor may be a resistive or capacitive sensor, or it may be a force or pressure sensor, or any other suitable sensor capable of identifying or generating a signal indicative of presence, duration, number or intensity of touch or any combination thereof. The controller may be configured to identify a predetermined touch pattern from the output of the touch sensor, wherein the touch pattern is defined by a combination of one or more of presence of touch, duration of touch, intensity of touch and/or number of consecutive touches.

Preferably, the method comprises activating the illumination source based on the user-activated input signal, such as based on a touch pattern.

Preferably, method comprises increasing the brightness of the illumination source when the user-activated input signal is detected.

In some embodiments, the user activated input signal is indicative of a duration of touch and the method comprises controlling the brightness in accordance with the duration of touch. The brightness may be controlled substantially proportionally to the duration of touch, for example.

In some embodiments the user activated input signal is indicative of an intensity of touch and the method comprises controlling the brightness in accordance with the intensity of touch. The brightness may be controlled substantially proportionally to the intensity of touch, for example. In some embodiments the user activated input signal is indicative of a touch pattern consisting of any combination of one or more of duration of touch, intensity of touch, and/or number of consecutive touches, and the method comprises controlling the brightness in accordance with the touch pattern. The brightness may be controlled based on a predetermined brightness profile associate with the determined touch pattern.

Preferably the method comprises receiving a proximity signal indicative of a user's proximity to the connector and controlling the brightness of the illumination signal in accordance with the proximity signal. For example, the brightness may be controlled substantially proportionally to the detected user proximity In some embodiments, the one or more alternative input signals may include input signals received from one or more devices external to the connector. For example, the input signals may be received from one or more of: an external audio source, an external computing device, such as a gaming console, or an external peripheral device, such as a controller a gaming console.

In some embodiments, the one or more alternative input signals may include input signals received from one or more devices or elements internal to the connector. For example, the input signals may be received from one or more of: a voltage sensor, a current sensor, a temperature sensor, an audio sensor and/or a motion sensor.

In some embodiments, the method further comprises generating a tactile output signal in response to one or more of the received alternative input signal(s). The tactile output signal may be used to activate a tactile generator such as a vibrator, for example.

In some embodiments, the method further comprises generating an audio signal for driving a sound output device such as a speaker to generate audio feedback activated in response to one or more of the received alternative input signal(s).

In some embodiments, the method comprises operating an illumination source to generate visual feedback in response to one or more of the received alternative input signal(s).

In the preferred embodiment, the method comprises receiving power source signals or data indicative of the connection status of the connector with an external power source and wherein the step of controlling the illumination source comprises controlling the illumination source in one of multiple mode of operation based on the received power source signals or data.

Preferably, the step of controlling the illumination source comprises controlling the illumination source in a externally-powered mode of operation when the received power source signals or data are indicative of connection of the connector with the external power source, and in a internally-powered mode of operation when the received power source signals or data are indicative of no connection between the connector and the external power source.

Preferably, in the internally-powered mode of operation the method comprises supplying power to the illumination circuit via a power source internal to the connector. For example, the on-board power source may be an energy storage device, such as a battery or a supercapacitor.

Preferably, in the internally-powered mode of operation, the step of controlling the illumination source draws an average current that maintains operation of illumination source for a period of at least approximately 30 days, more preferably at least approximately 180 days, even more preferably at least approximately 360 days without recharge of the on-board power source and most preferably indefinitely.

Preferably, in the internally-powered mode of operation, the step of controlling the illumination source comprises controlling the illumination source to maintain an average current usage in the connector of approximately less than 10 uA, more preferably less than 1 uA.

Preferably in the internally powered mode of operation in the case where energy harvesting is used as part of the on-board power source the average current drawn should be less than or equal to the average current harvested.

Preferably, in the internally-powered mode of operation, the step of controlling the illumination source comprises controlling the illumination source via a fading, illumination signal having a current profile that oscillates between a maximum current value and a minimum current value over time.

Preferably, the step of controlling the illumination source comprises controlling the brightness of the illumination source by controlling the amplitude or gain of the fading, illumination signal.

Preferably, the fading, illumination signal consists of recursive cycles having an up-cycle component in which the signal rises toward the maximum current value and a down-cycle component in which the signal declines toward the minimum current value.

Preferably, a period of the up-cycle component differs to a period of the down-cycle component.

Preferably, the step of controlling the illumination source comprises controlling one or more inputs of an amplifier circuit operatively connected to the illumination source.

Preferably, the amplifier circuit comprises one or more analogue amplifiers. For example, the amplifier circuit may comprise one or more resistor-capacitor (RC) coupled amplifier(s), or one or more similar components such as a field effect transistor (FET or MOSFET)

Preferably, the step of controlling the illumination source comprises recursively switching input(s) of the analogue amplifier circuit between an on-state, in which current drawn through the amplifier increases toward the maximum current value, and an off-state, in which current drawn through the amplifier circuit decreases toward the minimum current value.

In some embodiments, the step of controlling the illumination source further comprises activating a timer having a predetermined, up-cycle trigger period and/or a predetermined, down-cycle trigger period, and controlling the amplifier circuit input(s) using the up-cycle trigger period and down-cycle trigger period.

In some embodiments, the step of controlling the illumination source further comprises sampling value(s) of the illumination signal and switching state(s) of the input(s) of the amplifier circuit when consecutive sampled value(s) of the illumination signal are substantially constant and/or vary within a predetermined threshold amount or percentage, and/or when the consecutive sampled value(s) are within a predetermined threshold of the predetermined maximum or minimum values.

In some embodiments, the step of controlling the illumination source further comprises comparing an operating parameter at a load side of the amplifier circuit to a predetermined up-cycle trigger condition, or a down-cycle trigger condition, or both. The up-cycle trigger condition may be when an operating parameter, such as a voltage, at the load side of the amplifier circuit meets a predetermined up-cycle trigger criterion or criteria, such as a reference minimum voltage of the illumination signal. The down-cycle trigger condition may be when an operating parameter, such as a voltage, at the load side of the amplifier circuit meets a predetermined down-cycle trigger criterion or criteria, such as a reference maximum voltage of the illumination signal.

In some embodiments the step of controlling the illumination source further comprises the step of receiving a signal indicative of a recent value of the illumination signal, and wherein the sampling and fade direction of the illumination signal are controlled based on the received recent value signal.

Preferably, the step of controlling the illumination source in the externally-powered mode of operation, comprises controlling the illumination source via a pulse width modulated illumination signal.

Preferably, the step of controlling the illumination source in the externally-powered mode of operation comprises controlling the brightness of the illumination source by controlling the duty cycle of the pulse width modulated illumination signal and/or the gain of the pulse width modulated signal.

In some embodiments, the step of controlling the illumination source comprises controlling a gain of the illumination signal to adjust a brightness of the illumination source.

The step of controlling the illumination source may comprise controlling one or more light emitting elements of the connector.

One or more light emitting elements may be a light emitting diode. Preferably each light emitting element is a light emitting diode. The LED may be an Organic LED.

Preferably, one or more light emitting elements are configured to illuminate a connection element of the connector.

Preferably the illumination source is located at or adjacent to the device connection element.

In the preferred embodiment the step of receiving ambient light signals comprises operating one or more light sensing elements and receiving ambient light signals from the one or more light sensing elements. For example, the light sensing element may be a photodiode.

Preferably each light sensing element further comprises one or more amplifiers associated with each light sensing element.

Preferably a gain of each amplifier is adjustable.

Preferably the step of operating the one or more light sensing elements comprises adjusting the gain based on an output of the associated light sensing element.

Preferably the step of operating the one or more light sensing elements comprises increasing the gain when the output of the associated light sensing element indicates a reduced ambient light brightness of the surrounding environment.

Preferably the step of operating the one or more light sensing elements comprises decreasing the gain when the output of the associated light sensing element indicates an increased ambient light brightness of the surrounding environment.

Preferably the step of receiving ambient light signals further comprise filtering noise components from the output of each light sensing device using one or more optical noise cancellation modules or circuits.

In some embodiments, the step of receiving ambient light signals further comprises determining a frequency response of ambient light based on the output signals of the light sensing device.

In some embodiments, the step of controlling a brightness of the illumination source comprises controlling the brightness of the illumination source based on the frequency response and/or amplitude of the sensed ambient light.

In the preferred embodiment the step of receiving ambient light signals comprises receiving ambient light signals from two or more light sensing devices.

In some embodiments, the step of determining the ambient light brightness utilises any one or more of the following parameters determined from the output signals of the light sensing device: a maximum intensity of light, an averaged intensity of light over a period of time, a waveform shape of light with a time-varying amplitude, and/or a frequency of a periodic and time-varying brightness waveform.

In some embodiments, the method comprises determining a frequency response of ambient light and controlling the brightness of the illumination source based on the frequency response. For example, a brightness intensity of the illumination source(s) may be increased when certain light frequencies are dominant in the environment over others, such as blue light vs. yellow light. In some embodiments, the method comprises adjusting a frequency response of light emitted from the illumination source based on the frequency response of ambient light. For example, the controller may be configured adjust a frequency response of lighted emitted from the illumination source to complement a frequency response of ambient light to improve visibility of emitted light in the ambient environment, such as emitting blue light in a red light environment.

In the preferred embodiment, the method further comprises controlling the illumination source to alter the brightness of the illumination source(s) upon receiving a signal indicative of a connection of the connector with an electronic device. For example, the controller may increase brightness and/or adjust the colour and/or adjust the brightness waveform to indicate a connection with the electronic device.

In the preferred embodiment, the method further comprises controlling the illumination source to deactivate the illumination source upon receiving ambient light signals indicative of a brightness of ambient light that exceeds a predetermined brightness threshold.

In the preferred embodiment, the method further comprises controlling the illumination source to maintain a minimum brightness of the illumination source when the ambient light signals indicate ambient light brightness that are below a predetermined darkness threshold.

Preferably, the method further comprises controlling the illumination source based on ambient light signals indicative of ambient light brightness sensed during periods of deactivation of the illumination source.

In some embodiments the step of controlling the illumination source comprises:
acquiring from a look-up table stored in an associated electronic memory, data indicative of a desired brightness based on the received ambient light signals; and
controlling the illumination source to output the desired brightness accordingly.

The electronic memory component may comprise at least one computer readable medium associated with the connector.

The electronic memory component is preferably on-board the connector but may alternatively be remote and accessible via a communication system of the connector.

The look up table is preferably predetermined and pre-stored in the electronic memory.

In some embodiments, the step of controlling the illumination source comprises:
applying an algorithm or algorithms on the ambient light signals to determine a desired brightness; and
controlling the illumination source to output the desired brightness accordingly.

In some embodiments, the step of controlling the illumination source comprises utilizing an algorithm and a look-up table to control the illumination source based on the ambient light signals.

In some embodiments, the step of controlling the illumination source may comprise utilizing an algorithm and/or look-up table associated with multiple input parameters, including the ambient light signals and one or more other parameters. Other parameters may include values derived from one or more alternative input signals.

In some embodiments, the method may utilize a microcontroller used to communicate directly with the electronic device via a standard or custom protocol.

In some embodiments the method further comprises determining or receiving a connection status of the connector with an external power source outlet.

In some embodiments the method further comprises operating a speaker of the connector to generate sound originating from within the vicinity of a power source connection element of the connector.

In some embodiments the method further comprises operating a haptic feedback device of the connector to generate haptic feedback.

In some embodiments the method further comprises operating the illumination source, the speaker and/or the haptic feedback device in accordance with one or more received input signal(s).

The received input signals may include input signals received from one or more devices external to the connector. For example, the input signals may be received from one or more of: an external audio source, an external computing device or the like.

Alternatively, or in addition, the received input signals may include input signals received from one or more devices or elements internal to or on-board the connector. For example, the input signals may be received from one or more of: a voltage sensor, a current sensor, a temperature sensor, an audio sensor, a touch sensor, a tactile sensor, a proximity sensor, a motion sensor or the like.

In some embodiments the method comprises operating the illumination source, the speaker and/or the haptic feedback device in accordance with a predetermined sequence of touch events. A touch event may be classified in accordance with one or more touch-related parameters such as presence, number, duration and/or intensity of touch.

In the preferred embodiment the illumination circuit comprises a plurality of illumination sources and the method comprises controlling one or more of the illumination sources in accordance with any one of the embodiments or features described herein in relation to the illumination source. One or more illumination sources of the illumination circuit may be controlled synchronously and/or one or more illumination sources may be controlled independently. One or more illumination sources are preferably configured to illuminate a region surrounding or in the vicinity of the device connection element. One or more illumination sources may be configured to illuminate a region surrounding or in the vicinity of the power connection element.

In some embodiments the illumination circuit may comprise two or more illumination sources configured to propagate light in varying directions from the connector. For example, the illumination circuit may comprise at least one illumination source configured to propagate light from a first side of the connector and at least one other illumination source configured to propagate light from a second side of the connector. The first side of the connector may oppose the second side of the connector such that light propagates in opposing directions from the respective illumination sources. The first and second sides may be at the same end of the connector, for example at, or adjacent to the device connection element.

In the preferred embodiment the illumination circuit comprises a plurality of light sensing devices and the method may comprise controlling one or more of the light sensing devices in accordance with any of the embodiments or features herein described in relation to the light sensing device.

In some embodiments, the method comprises utilising a plurality of light sensing devices to determine ambient light brightness adjacent to, two or more varying regions or sides of the connector.

The method may comprise determining an average light brightness from two or more light sensing devices and controlling one or more illumination sources based on the averaged light brightness. Alternatively, or in addition, the method may comprise independently controlling one or more illumination sources corresponding to each light sensing device based on the output of the light sensing device. For example, the method may be configured to control an illumination source based on the output of an associated light sensing device on the same or similar side of the connector as the illumination source.

In some embodiments, the method comprises operating the illumination circuit in one of a plurality of predefined modes of operation, comprising a standard mode of operation in which the illumination source may be activated for at least a period of time during the standard mode of operation, and a sleep mode in which illumination source is substantially deactivated until at least one predetermined trigger condition is detected by the controller.

In some embodiments, the method comprises drawing power from the on-board power source during the sleep mode.

In some embodiments, the method comprises automatically activating the illumination source upon detection of the predetermined trigger condition.

In some embodiments, the predetermined trigger condition is indicative of termination of a shipping phase of the connector within a supply chain.

In some embodiments, the predetermined trigger condition is indicative of removal of packaging associated with the connector. The predetermined trigger condition may be indicative of removal of packaging adjacent at least a predefined region of the connector. The predetermined trigger condition may be indicative of removal of a part of the packaging. The part of the packaging may be located at or adjacent to a detection element of the connector configured to output data indicative of removal of the part of the packaging.

In some embodiments, the method comprises automatically operating the connector in the sleep mode when a predetermined sleep-mode trigger condition is detected. The sleep mode trigger condition may be indicative of the connector being packaged. The predetermined sleep-mode trigger condition may be indicative of a user locating part of the packaging at or adjacent a detection element of the connector.

In some embodiments, the method comprises activating the illumination source(s) based on one or more input parameters or operational parameters. The input parameters may include one or more of: a light-sensing related parameter, a touch-sensing related parameter, a data-signal related parameter.

In some embodiments, the predetermined trigger condition is based on at least one input or operational parameter. The input or operational parameter(s) may comprise at least one light sensing related parameter and the predetermined trigger condition may include a minimum threshold value of the light sensing parameter, indicative of exposure of the device to light. The light sensing device may be located in a region of the connector that is configured to be uncovered by the removal of at least a part of the packaging after the shipping phase of the supply chain. The at least one predetermined trigger condition may comprise a light sensing input that is indicative of the packaging being removed from a location that is adjacent the light sensing device. For example, the electronic visual interface may be triggered into the standard mode when the light sensing parameter indicates an ambient light brightness that is above a predetermined darkness threshold.

In some embodiments, at least one predetermined trigger condition is associated with an input parameter indicative of a presence of packaging surrounding the connector. The input parameter may comprise a light sensing input. Alternatively, or in addition, the input parameter may comprise a packaging input indicative of a location of packaging relative to the connector. The trigger condition may be when the packaging is located at or beyond a predetermined distance relative to the connector. For example, an output from a magnetic sensor, such as a hall-effect sensor, may be receivable by the controller of the electronic device to indicate location of the sensor relative to a corresponding magnetic element based on the strength of the magnetic field detected. A magnetic field strength below a predetermined threshold may indicate the removal of packaging from the connector. The magnetic sensor may be located on the connector or on the packaging, and the corresponding magnetic element may be placed on the other of the packaging or the connector respectively.

In some embodiments, the method comprises triggering the connector into the sleep mode when at least one predetermined sleep mode trigger condition is.

In some embodiments, at least one predetermined sleep-mode trigger condition is based on at least one input or operational parameter. The input or operational parameter(s) may comprise any combination of one or more of: at least one timer related parameter; or at least one light sensing related parameter, or both. At least one predetermined threshold criterion may be associated with each parameter for satisfying the trigger condition. For example, the illumination circuit may be triggered into the sleep mode when one or more of the following trigger conditions are detected:
  a light sensing parameter value indicative of an ambient light brightness is at or below a predetermined darkness threshold;
  a first timer value relating to first timer parameter is at or above a predetermined first timer threshold period; and/or
  a second timer value relating to a second timer parameter is at or above a predetermined second timer threshold period.

The first timer may be initiated after a preceding operational mode has concluded, such as a pre-sleep mode.

The second timer may be initiated after receiving a light sensing parameter value indicative of an ambient light brightness that is at or below a predetermined darkness threshold.

In some embodiments, at least one predetermined sleep-mode trigger condition is based on at least one light sensing input parameter. The input sensing light parameter may be indicative of light surrounding a light sensing device of the connector. The light sensing device may be located in a region of the connector that is configured to be covered by packaging during the shipping phase of the supply chain. The at least one predetermined sleep-mode trigger condition may comprise a light sensing input that is indicative of the connector being packaged for shipping, such as a light sensing input that is at or below a predetermined darkness threshold.

In some embodiments, at least one predetermined sleep-mode trigger condition is associated with an input parameter indicative of a presence of packaging surrounding the connector. The input parameter may comprise a light sensing input. Alternatively, or in addition, the input parameter may comprise a packaging input indicative of a location of packaging relative to the connector. For example, an output from a magnetic sensor, such as a hall-effect sensor, may be receivable by the controller of the connector to indicate location of the sensor relative to a corresponding magnetic element based on the strength of the magnetic field detected. A magnetic field strength above a predetermined threshold may indicate packaging of the connector. The magnetic sensor may be located on the connector or on the packaging, and the corresponding magnetic element may be placed on the other of the packaging or the connector respectively.

In some embodiment the method comprises writing into or reading from non-volatile electronic memory or extremely low power memory associated with the connector a new mode of operation or a current mode of operation respectively. In some embodiments, the method comprises triggering a new mode of operation based on a current mode of operation written into the memory.

In another aspect, the invention may broadly be said to consist of a method for facilitating connection of an electronic connector with an electronic device, the method comprising the steps of:
  activating an illumination source of the connector to illuminate a region surrounding the connector and improve visibility of the connector; and
  controlling the illumination source based on a connection status between the connector and an external power source.

In the preferred embodiment, the step of controlling the illumination source comprises controlling the illumination source in one of multiple modes of operation based on the connection status.

Preferably, the step of controlling the illumination source comprises controlling the illumination source in an externally-powered mode of operation when the connection status is indicative of connection of the connector with the external power source, and in an internally-powered mode of operation when the connection status is indicative of no connection between the connector and the external power source.

Preferably, in the internally-powered mode of operation the method comprises supplying power to the illumination circuit via a power source internal to the connector. For example, the on-board power source may be an on-board energy storage device, such as a battery or a supercapacitor.

Preferably, in the internally-powered mode of operation, step of controlling the illumination source draws an average current that maintains operation of illumination source for a period of at least approximately 30 days, more preferably at least approximately 180 days, even more preferably at least approximately 360 days without recharge of the on-board power source and most preferably indefinitely.

Preferably, in the internally-powered mode of operation, the step of controlling the illumination source comprises controlling the illumination source to maintain an average current usage in the connector of approximately less than 10 uA, more preferably less than 1 uA.

Preferably in the internally powered mode of operation in the case where energy harvesting is used as part of the on-board power source the average current drawn should be less than or equal to the average current harvested.

Preferably, in the internally-powered mode of operation, the step of controlling the illumination source comprises controlling the illumination source via a fading, illumination signal having a current profile that oscillates between a maximum current value and a minimum current value.

Preferably, the step of controlling the illumination source comprises controlling the brightness of the illumination source by controlling the amplitude or gain of the fading, illumination signal.

Preferably, the step of controlling the illumination source in the externally-powered mode of operation, comprises controlling the illumination source via a pulse width modulated illumination signal.

Preferably, the step of controlling the illumination source in the externally-powered mode of operation comprises controlling the brightness of the illumination source by controlling the duty cycle of the pulse width modulated illumination signal and/or the gain of the pulse width modulated signal.

In the preferred embodiment the method further comprises:
receiving ambient light signals indicative of ambient light brightness surrounding the electronic connector; and
controlling a brightness of the illumination source based on the ambient light signals.

In some embodiments, the method comprises controlling the brightness by adjusting a maximum intensity of light emanating from the illumination source. Alternatively, or in addition the method comprises controlling the brightness by adjusting an average intensity of light emanating from the illumination source over a period of time.

Preferably, the step of controlling a brightness comprises reducing a brightness of the illumination source when the ambient light signals indicate a reduced ambient light brightness.

Preferably, the step of controlling a brightness comprises increasing a brightness of the illumination source when the ambient light signals indicate an increased ambient light brightness.

In the preferred embodiment, the method further comprises the steps of receiving one or more alternative input signals and controlling a brightness of the illumination source based on the one or more alternative input signals.

In the preferred embodiment, at least one of the alternative input signals is a user-activated input signal.

The user-activated input signal may be derived from any one or more of tactile, motion, proximity, audio and/or visual sensors, for example.

Preferably, the user-activated input signal derived from a touch sensor and is indicative of a user touching the connector on or in the vicinity of the touch sensor.

In some embodiments, the method comprises operating the illumination circuit in one of a plurality of predefined modes of operation, comprising a standard mode of operation in which the illumination source may be activated for at least a period of time during the standard mode of operation, and a sleep mode in which illumination source is substantially deactivated until at least one predetermined trigger condition is detected by the controller.

In some embodiments, the method comprises drawing power from the on-board power source during the sleep mode.

In some embodiments, the method comprises automatically activating the illumination source upon detection of the predetermined trigger condition.

In some embodiments, the predetermined trigger condition is indicative of termination of a shipping phase of the connector within a supply chain.

In another aspect, the invention may broadly be said to consist of a method for operating an electronic connector within various phases of a supply chain, the electronic connector comprising an illumination circuit having at least one illumination source and a controller configured to control the illumination circuit, and the method comprising the steps of:
triggering the illumination circuit into a sleep mode in which each illumination source is substantially deactivated when a shipping phase of the supply chain is detected by the controller, and
triggering the illumination circuit in a standard mode of operation in which at least one illumination source is capable of being activated by the controller during at least a period of time of the standard mode, when at least one predetermined trigger condition is detected by the controller indicative of the connector entering a retail or consumer phase of the supply chain.

In some embodiment, in the sleep mode the controller is substantially intermittently operated during one or more time intervals to enable detection of the predetermined trigger condition, and is otherwise deactivated for a remaining period of the sleep mode to conserve energy, for example of an on-board power source or of another power source supplying power to the connector in the sleep mode. The controller may be operated intermittently for a period of time sufficient to observe one or more trigger parameters relating to the predetermined trigger condition, and to deactivate substantially immediately thereafter if the trigger condition is not met. The controller may be activated substantially periodically to monitor for the predetermined trigger condition in the sleep mode.

In some embodiments, in the standard mode of operation the illumination source may be activated based on one or more input parameters or operational parameters observable by the controller. The input parameters may include one or more of: a light-sensing related parameter, a touch-sensing related parameter, a data-signal related parameter.

In some embodiments, at least one predetermined trigger condition is based on at least one input or operational parameter observable by the controller. The input or operational parameter(s) may comprise at least one light sensing related parameter and the predetermined trigger condition may include a minimum threshold value of the light sensing parameter. For example, the method may comprise triggering the illumination circuit into the standard mode when the light sensing parameter indicates an ambient light brightness that is above a predetermined darkness threshold.

In some embodiments, the method may comprise triggering the illumination circuit into the sleep mode when at least one predetermined sleep mode trigger condition is detected by the controller.

In some embodiments, at least one predetermined sleep-mode trigger condition is based on at least one input or operational parameter observable by the controller. The input or operational parameter(s) may comprise any combination of one or more of: at least one timer related parameter; or at least one light sensing related parameter, or both. At least one predetermined threshold criterion may be associated with each parameter for satisfying the trigger condition. For example, the method may comprise triggering the illumination circuit into the sleep mode when one or more of the following trigger conditions are detected by the controller:
a light sensing parameter value indicative of an ambient light brightness is at or below a predetermined darkness threshold;
a first timer value relating to first timer parameter is at or above a predetermined first timer threshold period; and/or
a second timer value relating to a second timer parameter is at or above a predetermined second timer threshold period.

The first timer may be initiated by the controller after a preceding operational mode has concluded, such as a pre-sleep mode.

The second timer may be initiated by the controller after receiving a light sensing parameter value indicative of an ambient light brightness that is at or below a predetermined darkness threshold.

In some embodiments the method further comprises operating the illumination circuit in a pre-sleep mode in which the controller is configured to monitor for the at least one predetermined sleep mode trigger condition.

In some embodiments the method comprises triggering the illumination circuit into the pre-sleep mode when the controller detects one or more predetermined pre-sleep trigger conditions. The pre-sleep mode trigger conditions may comprise any combination of one or more of a light sensing related trigger, a touch sensing related trigger, a power-source related trigger and/or a data signal related trigger. For example, the pre-sleep trigger condition may comprise a predetermined light sensing input signal indicative of a predetermined brightness threshold, frequency threshold, frequency response and/or a flicker sequence. In another example, the pre-sleep trigger condition may (alternatively or additionally) comprise disconnection of an external power source from the connector.

In some embodiments the method comprises operating the illumination circuit in a testing mode prior to the pre-sleep mode in which the illumination circuit is operated in accordance with one or more testing methods. The testing mode may require a connection of the connector to an external power source. The pre-sleep trigger condition may be indicative of completion of one or more of the testing methods.

In some embodiment the method further comprises writing a new mode of operation of the illumination circuit into non-volatile electronic memory or extremely low-power memory when the illumination circuit is triggered into the new mode of operation. In some embodiment the method further comprises reading a current mode of operation of the illumination circuit from the non-volatile electronic memory or extremely low-power memory before triggering the illumination circuit into a new mode of operation. In some embodiments, the method comprises triggering a new mode of operation based on a mode of operation written into the memory. For example, the illumination circuit may be configured to write operational-mode data into memory indicative of the sleep-mode when triggered into the sleep-mode, and may subsequently only trigger the illumination circuit into the standard mode of operation when the predetermined standard mode trigger condition is observed and when the operational-mode data stored in memory is indicative of the sleep mode.

In another aspect, the invention may broadly be said to consist of a method for operating an electronic connector within various phases of a supply chain, the electronic connector comprising an illumination circuit having an illumination source, and the method comprising the steps of:
  detecting a predetermined trigger condition indicative of removal of packaging associated with the connector; and
  activating the illumination source when the predetermined trigger condition is detected.

Summary of Electronic Devices

The following statements summarize various electronic device or system related aspects of the invention and associated embodiments. Where appropriate, any one of the preferred, alternative or optional features or embodiments mentioned in relation to any one or more of the following device or system related aspects, may be combined with any one or more other aspects summarized in the Summary of Invention section of this specification. For example, the features or embodiments of a device or system related aspect herein described may be combined with another device or system related aspect, or implemented in a related method or medium summarized in this section.

In another aspect, the invention may broadly be said to consist of an electronic device comprising:
  an electronic visual interface;
  an on-board power source configured to supply power to the electronic visual interface; and
  a controller configured to automatically activate the electronic visual interface upon detection of a predetermined trigger condition indicative of termination of a shipping phase of the electronic device within a supply chain.

In another aspect, the invention may broadly be said to consist of an electronic device comprising:
  an electronic visual interface;
  an on-board power source configured to supply power to the electronic visual interface; and
  a controller configured to automatically activate the electronic visual interface upon detection of a predetermined trigger condition indicative of removal of packaging associated with the electronic device.

In some embodiments, the may be controller configured to automatically activate the electronic visual interface upon detection of a predetermined trigger condition indicative of removal of packaging adjacent at least a predefined region of the electronic device.

In another aspect, the invention may broadly be said to consist of an electronic system comprising:
  an electronic device having:
    an electronic visual interface,
    an on-board power source configured to supply power to the electronic visual interface, and
    a controller configured to automatically activate the electronic visual interface upon detection of a predetermined trigger condition;
  packaging for housing the electronic device; and
  wherein the predetermined trigger condition is indicative of un-packaging of the electronic device from the package.

The predetermined trigger condition may be indicative of removal of a part of the packaging. The part of the packaging may be located at or adjacent to a detection element of the electronic device configured to output data indicative of removal of the part of the packaging.

In some embodiments, the controller is further configured to automatically operate the electronic device in a sleep mode when a predetermined sleep-mode trigger condition is detected indicative of the electronic device being packaged.

The predetermined sleep-mode trigger condition may be indicative of a user locating part of the packaging at or adjacent to the electronic device.

The following embodiments apply to any one of the above three aspects.

In some embodiments, the controller may be configured to operate the electronic device in one of a plurality of predefined modes of operation, comprising a sleep mode in which the electronic visual interface is substantially deactivated until the trigger condition is detected by the controller.

In some embodiments, in the sleep mode the controller is substantially intermittently operated during one or more time intervals to enable detection of the predetermined trigger condition, and is otherwise deactivated for a remaining period of the sleep mode to conserve energy of the on-board power source. The controller may be operated intermittently for a period of time sufficient to observe one or more trigger parameters relating to the predetermined trigger condition, and to deactivate substantially immediately thereafter if the trigger condition is not met. The controller may be activated substantially periodically to monitor for the predetermined trigger condition in the sleep mode.

In some embodiments, the electronic visual interface may be activated based on one or more input parameters or operational parameters observable by the controller. The input parameters may include one or more of: a light-sensing related parameter, a touch-sensing related parameter, a data-signal related parameter.

In some embodiments, the predetermined trigger condition is based on at least one input or operational parameter observable by the controller. The input or operational parameter(s) may comprise at least one light sensing related parameter and the predetermined trigger condition may include a minimum threshold value of the light sensing parameter, indicative of exposure of the device to light. The light sensing device may be located in a region of the electronic device that is configured to be uncovered by the removal of at least a part of the packaging after the shipping phase of the supply chain. The at least one predetermined trigger condition may comprise a light sensing input that is indicative of the packaging being removed from a location that is adjacent the light sensing device.

For example, the electronic visual interface may be triggered into the standard mode when the light sensing parameter indicates an ambient light brightness that is above a predetermined darkness threshold.

In some embodiments, at least one predetermined trigger condition is associated with an input parameter indicative of a presence of packaging surrounding the electronic device. The input parameter may comprise a light sensing input. Alternatively, or in addition, the input parameter may comprise a packaging input indicative of a location of packaging relative to the electronic device. The trigger condition may be when the packaging is located at or beyond a predetermined distance relative to the electronic device. For example, an output from a magnetic sensor, such as a hall-effect sensor, may be receivable by the controller of the electronic device to indicate location of the sensor relative to a corresponding magnetic element based on the strength of the magnetic field detected. A magnetic field strength below a predetermined threshold may indicate the removal of packaging from the electronic device. The magnetic sensor may be located on the electronic device or on the packaging, and the corresponding magnetic element may be placed on the other of the packaging or the electronic device respectively.

In some embodiments, the electronic device is triggered into the sleep mode when at least one predetermined sleep mode trigger condition is detected by the controller.

In some embodiments, at least one predetermined sleep-mode trigger condition is based on at least one input or operational parameter observable by the controller. The input or operational parameter(s) may comprise any combination of one or more of: at least one timer related parameter; or at least one light sensing related parameter, or both. At least one predetermined threshold criterion may be associated with each parameter for satisfying the trigger condition. For example, the illumination circuit may be triggered into the sleep mode when one or more of the following trigger conditions are detected by the controller:

a light sensing parameter value indicative of an ambient light brightness is at or below a predetermined darkness threshold;

a first timer value relating to first timer parameter is at or above a predetermined first timer threshold period; and/or a second timer value relating to a second timer parameter is at or above a predetermined second timer threshold period.

The first timer may be initiated by the controller after a preceding operational mode has concluded, such as a pre-sleep mode.

The second timer may be initiated by the controller after receiving a light sensing parameter value indicative of an ambient light brightness that is at or below a predetermined darkness threshold.

In some embodiments, at least one predetermined sleep-mode trigger condition is based on at least one light sensing input parameter observable by the controller. The input sensing light parameter may be indicative of light surrounding a light sensing device of the electronic device. The light sensing device may be located in a region of the electronic device that is configured to be covered by packaging during the shipping phase of the supply chain. The at least one predetermined sleep-mode trigger condition may comprise a light sensing input that is indicative of the electronic device being packaged for shipping, such as a light sensing input that is at or below a predetermined darkness threshold.

In some embodiments, at least one predetermined sleep-mode trigger condition is associated with an input parameter indicative of a presence of packaging surrounding the electronic device. The input parameter may comprise a light sensing input. Alternatively, or in addition, the input parameter may comprise a packaging input indicative of a location of packaging relative to the electronic device. For example, an output from a magnetic sensor, such as a hall-effect sensor, may be receivable by the controller of the electronic device to indicate location of the sensor relative to a corresponding magnetic element based on the strength of the magnetic field detected. A magnetic field strength above a predetermined threshold may indicate packaging of the electronic device. The magnetic sensor may be located on the electronic device or on the packaging, and the corresponding magnetic element may be placed on the other of the packaging or the electronic device respectively.

In some embodiment the electronic device further comprises non-volatile electronic memory or extremely low power memory accessible by the controller for writing a new mode of operation of the device thereto, and reading a current mode of operation therefrom. In some embodiments, the controller may be configured to trigger a new mode of operation based on a mode of operation written into the memory. For example, the controller may be configured to write operational-mode data into memory indicative of the sleep-mode when triggered into the sleep-mode, and may subsequently only trigger the device into the standard mode of operation when the predetermined standard mode trigger condition is observed and when the operational-mode data stored in memory is indicative of the sleep mode.

In another aspect, the invention may broadly be said to consist of an electronic device comprising:

a connection port or element for electronically and physically connecting to a corresponding element or port of a connector or other electronic device;

an electronic, illumination circuit comprising:

an illumination source;

a light sensing device configured to output ambient light signals indicative of ambient light brightness surrounding the device; and a controller configured to control a brightness of the illumination source based on the ambient light signals of the light sensing device, such that the controller reduces the brightness of the illumination source when the ambient light signals of the light sensing device indicate a reduced ambient light brightness.

In another aspect, the invention may broadly be said to consist of an electronic device for connecting with an electronic connector or other device, the electronic device comprising:

a device connection port or element for electronically and physically connecting to a corresponding element or port of the electronic connector or other device;

a power source connection element or port for electronically connecting to an external power source; and an electronic, illumination circuit having:

an illumination source; and a controller configured to operate the illumination source based on a connection status of the power source connection element or port with the external power source.

Summary of Method of Operating Electronic Devices

The following statements summarize various aspects relating to methods for operating electronic devices or systems, and associated embodiments. Where appropriate, any one of the preferred, alternative or optional features or embodiments mentioned in relation to any one or more of the following method related aspects, may be combined with any one or more other aspects summarized in the Summary of Invention section of this specification. For example, the features or embodiments of a method related aspect herein described may be combined with another method related aspect, or implemented in a related device, system or medium summarized in this section.

In another aspect, the invention may broadly be said to consist of a method of operating electronic device having an electronic visual interface, the method comprising the steps of:

detecting a predetermined trigger condition indicative of termination of a shipping phase of the electronic device within a supply chain; and activating the electronic visual interface when the predetermined trigger condition is detected.

In another aspect, the invention may broadly be said to consist of a method of operating electronic device having an electronic visual interface, the method comprising the steps of:

detecting a predetermined trigger condition indicative of removal of packaging associated with the electronic device; and activating the electronic visual interface when the predetermined trigger condition is detected.

In some embodiments, the predetermined trigger condition may be indicative of removal of packaging adjacent to at least a predefined region of the electronic device.

The following embodiments apply to either one of the above two aspects.

In some embodiments, the method may further comprise operating the electronic device in one of a plurality of predefined modes of operation, comprising a sleep mode in which the electronic visual interface is substantially deactivated until the trigger condition is detected by the controller.

In some embodiments, in the sleep mode the electronic device may be operated substantially intermittently during one or more time intervals to enable detection of the predetermined trigger condition, and otherwise deactivated for a remaining period of the sleep mode to conserve energy.

The device may be operated intermittently for a period of time sufficient to observe one or more trigger parameters relating to the predetermined trigger condition, and to deactivate substantially immediately thereafter if the trigger condition is not met. The device may be activated substantially periodically to monitor for the predetermined trigger condition in the sleep mode.

In some embodiments, the method may comprise activating the electronic display or visible indicia based on one or more input parameters or operational parameters The input parameters may include one or more of: a light-sensing related parameter, a touch-sensing related parameter, a data-signal related parameter.

In some embodiments, the predetermined trigger condition is based on at least one input or operational parameter. The input or operational parameter(s) may comprise at least one light sensing related parameter and the predetermined trigger condition may include a minimum threshold value of the light sensing parameter. The light sensing device may be located in a region of the electronic device that is configured to be covered by packaging during the shipping phase of the supply chain. The at least one predetermined trigger condition may comprise a light sensing input that is indicative of the packaging being removed from a location that is adjacent the light sensing device.

For example, the electronic visual interface may be triggered into the standard mode when the light sensing parameter indicates an ambient light brightness that is above a predetermined darkness threshold.

In some embodiments, at least one predetermined trigger condition is associated with an input parameter indicative of a presence of packaging surrounding the electronic device. The input parameter may comprise a light sensing input. Alternatively, or in addition, the input parameter may comprise a packaging input indicative of a location of packaging relative to the electronic device. The trigger condition may be when the packaging is located at or beyond a predetermined distance relative to the electronic device. For example, an output from a magnetic sensor, such as a hall-effect sensor, may be receivable by the electronic device to indicate location of the sensor relative to a corresponding magnetic element based on the strength of the magnetic field detected. A magnetic field strength below a predetermined threshold may indicate the removal of packaging from the electronic device. The magnetic sensor may be located on the electronic device or on the packaging, and the corresponding magnetic element may be placed on the other of the packaging or the electronic device respectively.

In some embodiments, the method comprises triggering the electronic device into the sleep mode when at least one predetermined sleep mode trigger condition is detected by the controller.

In some embodiments, at least one predetermined sleep-mode trigger condition is based on at least one input or operational parameter. The input or operational parameter(s) may comprise any combination of one or more of: at least one timer related parameter; or at least one light sensing related parameter, or both. At least one predetermined threshold criterion may be associated with each parameter for satisfying the trigger condition. For example, the illumination circuit may be triggered into the sleep mode when one or more of the following trigger conditions are detected:

a light sensing parameter value indicative of an ambient light brightness is at or below a predetermined darkness threshold;

a first timer value relating to first timer parameter is at or above a predetermined first timer threshold period; and/or a second timer value relating to a second timer parameter is at or above a predetermined second timer threshold period.

The first timer may be initiated by the controller after a preceding operational mode has concluded, such as a pre-sleep mode.

The second timer may be initiated after receiving a light sensing parameter value indicative of an ambient light brightness that is at or below a predetermined darkness threshold.

In some embodiments, at least one predetermined sleep-mode trigger condition is based on at least one light sensing input parameter. The input sensing light parameter may be indicative of light surrounding a light sensing device of the electronic device. The light sensing device may be located in a region of the electronic device that is configured to be covered by packaging during the shipping phase of the supply chain. The at least one predetermined sleep-mode trigger condition may comprise a light sensing input that is indicative of the electronic device being packaged for shipping, such as a light sensing input that is at or below a predetermined darkness threshold.

In some embodiments, at least one predetermined sleep-mode trigger condition is associated with an input parameter indicative of a presence of packaging surrounding the electronic device. The input parameter may comprise a light sensing input. Alternatively, or in addition, the input parameter may comprise a packaging input indicative of a location of packaging relative to the electronic device. For example, an output from a magnetic sensor, such as a hall-effect sensor, may indicate location of the sensor relative to a corresponding magnetic element based on the strength of the magnetic field detected. A magnetic field strength above a predetermined threshold may indicate packaging of the electronic device. The magnetic sensor may be located on the electronic device or on the packaging, and the corresponding magnetic element may be placed on the other of the packaging or the electronic device respectively.

In some embodiment the method further comprises writing a new mode of operation of the device to non-volatile or extremely low-power electronic memory accessible by the electronic device, and reading a current mode of operation therefrom. In some embodiments, the method comprise triggering a new mode of operation based on a mode of operation written into the memory.

In another aspect, the invention may broadly be said to consist of a method for facilitating connection of an electronic device with an electronic connector or other device, the method comprising the steps of:

activating an illumination source of the electronic device to illuminate a region surrounding the device and improve visibility of the device;

receiving ambient light signals indicative of ambient light brightness surrounding the electronic device; and controlling a brightness of the illumination source based on the ambient light signals, to reduce the brightness of the illumination source when the ambient light signals indicate a reduced ambient light brightness.

In another aspect, the invention may broadly be said to consist of a method for facilitating connection of an electronic device with an electronic connector or other device, the method comprising the steps of:

activating an illumination source of the electronic device to illuminate a region surrounding the electronic device and improve visibility of the electronic device; and controlling the illumination source based on a connection status between the electronic device and an external power source.

Summary of Computer Readable Media

The following statements summarize various aspects relating to a computer readable medium having stored therein instructions for operating an electronic device. Where appropriate, any one of the preferred, alternative or optional features or embodiments mentioned in relation to any one or more of the abovementioned aspects, may be combined with any one or more other aspects summarized below.

In another aspect, the invention may broadly be said to consist of a computer readable medium having stored therein instructions executable by a processor of an electronic connector for performing the steps of:

activating an illumination source of the connector to illuminate a region surrounding the connector and improve visibility of the connector;

receiving ambient light signals indicative of ambient light brightness surrounding the electronic connector; and controlling a brightness of the illumination source based on the ambient light signals, to reduce the brightness of the illumination source when the ambient light signals indicate a reduced ambient light brightness.

In another aspect, the invention may broadly be said to consist of a computer readable medium having stored therein instructions executable by a processor of an electronic connector for performing the steps of:

activating an illumination source of the connector to illuminate a region surrounding the connector and improve visibility of the connector; and controlling the illumination source based on a connection status between the connector and an external power source.

In another aspect, the invention may broadly be said to consist of a computer readable medium having stored therein instructions executable by a processor of an electronic device for performing the steps of:

activating an illumination source of the electronic device to illuminate a region surrounding the device and improve visibility of the device;

receiving ambient light signals indicative of ambient light brightness surrounding the electronic device; and controlling a brightness of the illumination source based on the ambient light signals, to reduce the brightness of the illumination source when the ambient light signals indicate a reduced ambient light brightness.

In another aspect, the invention may broadly be said to consist of a computer readable medium having stored therein instructions executable by a processor of an electronic device for performing the steps of:

activating an illumination source of the electronic device to illuminate a region surrounding the electronic device and improve visibility of the electronic device; and controlling the illumination source based on a connection status between the electronic device and an external power source.

In another aspect, the invention may broadly be said to consist of a computer readable medium having stored therein instructions executable by a processor of an electronic device having an electronic visual interface, for performing the steps of:

detecting a predetermined trigger condition indicative of termination of a shipping phase of the electronic device within a supply chain; and
activating the electronic visual interface when the predetermined trigger condition is detected.

In another aspect, the invention may broadly be said to consist of a computer readable medium having stored therein instructions executable by a processor of an electronic device having an electronic visual interface, for performing the steps of:
detecting a predetermined trigger condition indicative of removal of packaging associated with the electronic device; and
activating the electronic visual interface when the predetermined trigger condition is detected.

In another aspect, the invention may broadly be said to consist of a computer readable medium having stored therein instructions executable by a processor of an electronic connector for performing the steps of:
triggering an illumination circuit of the connector into a sleep mode in which each illumination source of the circuit is substantially deactivated when a shipping phase of a supply chain associated with the connector is detected, and
triggering the illumination circuit in a standard mode of operation in which at least one illumination source of the illumination circuit is capable of being activated during at least a period of time of the standard mode, when at least one predetermined trigger condition is detected indicative of the connector entering a retail or consumer phase of the supply chain.

In another aspect, the invention may broadly be said to consist of a computer readable medium having stored therein instructions executable by a processor of an electronic connector having an illumination source, for performing the steps of:
detecting a predetermined trigger condition indicative of removal of packaging associated with the connector; and
activating the illumination source when the predetermined trigger condition is detected.

As mentioned, any one of the preferred, alternative or optional features or embodiments of any one or more of the abovementioned aspects, may be combined with any one or more other aspects summarized in this Summary of Invention section.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

The term "brightness" as used in this specification and claims in relation to light means the visual perception of intensity of light, which may be dependent upon one or more parameters of the light, including, but not limited to: the intensity of the light, the one or more frequency components of the light and/or the time-varying amplitude of the light.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both. When used as part of a list, the term "and/or" means any combination of one or more of the items in the list, unless stated otherwise.

As used herein "(s)" following a noun means the plural and/or singular forms of the noun.

The invention consists in the foregoing and also envisages constructions of which the following gives examples only.

DRAWINGS

Preferred embodiments of the invention will be described by way of example only and with reference to the drawings, in which.

DETAILED DESCRIPTION

Figure 1:
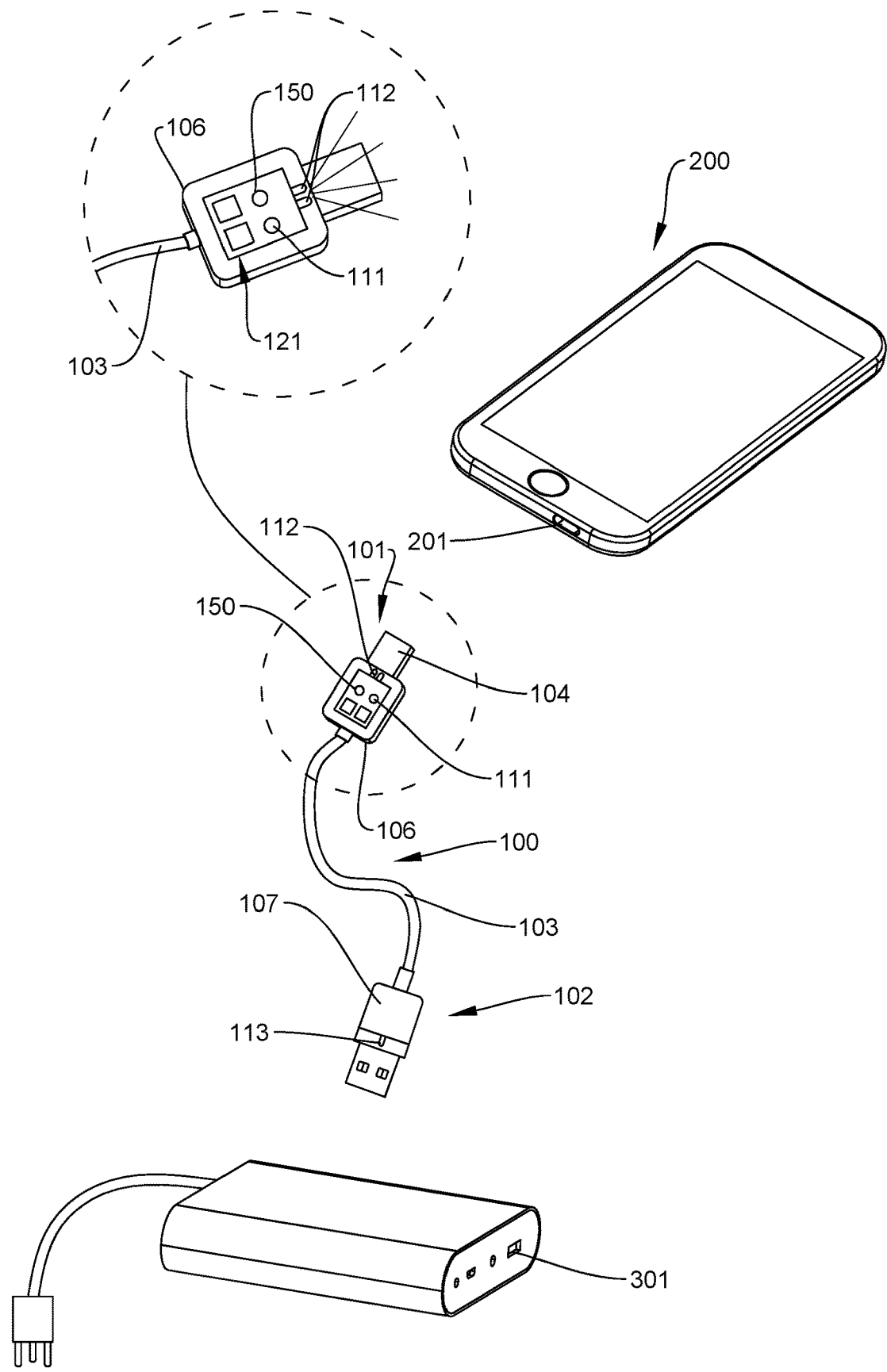
FIG. 1 shows a system of electronic devices and a preferred form connector of the invention.

Referring to FIG. 1, a preferred form connector 100 of the invention configured to electrically and physically connect with an electronic device 200 is shown. The term "electronic device" as used in this specification, includes (but is not limited to) any portable and non-portable electronic device that is capable of connecting to another electronic or electrical device or system via a wired, physical connection. Examples of such electronic devices include consumer or home electronic devices, such as: entertainment devices (televisions, video players, video game consoles, remote control cars, speakers, e-readers, etc.), communication devices (mobile phones, laptop computers, radio devices, etc.), or home/office devices (desktop computers, printers, lighting devices, appliances, electronic equipment etc.). In the case where the electronic device is portable, it normally comprises one or more rechargeable batteries and/or data communication capabilities.

The connector 100 comprises a first electronic connection end 101, a second electronic connection end 102 and a cable 103 extending therebetween for transferring current, such as charging current, or data signals, or both, between the two connection ends 101 and 102. In the preferred embodiment, the first connection end 101 is an electronic device connection end and the second connection end 102 is a power source connection end. In some embodiments, such as a USB Type-C cable implementation, each of the first and second electronic connection ends 101 and 102 may be capable of connecting to both an electronic device and an external power source. The device connection end 101 is configured to physically and electrically couple with the electronic device 200 for the transfer of current therebetween. The end 101 comprises a device connection element or interface 104 configured to couple a corresponding port 201 of the device 200, for the transfer of charging current, or data signals, or both. The power source connection end 102 comprises a power source connection element or interface 105 that is configured to enable connection of the connector with an external device or power source 300, such as: a commercial power outlet, a portable power bank, a battery or other energy storage device, an electronic device capable of supplying power such as a laptop, monitor or smart phone, and/or a device intended to be coupled to a power source such as a power adaptor. It will be appreciated that in alternative embodiments, the first connection end 101 and/or the second connection end 102 can be configured to physically couple any electronic or electrical device or system and the invention is not intended to be limited to the preferred application described herein. For example, in some embodiments, the connection end 102 may also be configured to connect to another electronic device similar to device 200. Examples of potential interfaces for either one of connection elements 104 or 105 include, for example (but without limitation): Universal Serial Bus (USB) based connections such as USB 3.1 or USB On-The-Go in micro, mini or standard sizes, USB 4, High-Definition Multimedia Interface (HDMI), DisplayPort, Ethernet, Apple™ Lightning, Thunderbolt, Firewire, Serial AT Attachment (SATA) and eSATA, HDBaseT, and mains or any other type of power connection. Many other physical interface types exist for electronics device connectors and the invention is not intended to be limited to the abovementioned examples for either connection end 101 or 102. In some embodiments, one of the connections ends, such as connection end 102, may be integral to an electronic device and non-removable/hardwired, in which case the connector 100 would comprise only one removably connectable end, such as connection end 101.

The connector 100 further comprises at least one illumination source 111-113 configured to illuminate one or more regions surrounding the connector 100 for improving the visibility of the connector in low-light conditions. Each illumination source 111-113 is operable through an illumination system 120 (not shown) of the connector 100 which will be described in further detail below. In some embodiments the illumination circuit may comprise two or more illumination sources configured to propagate light in varying directions from a connection end. For example, the illumination circuit may comprise at least one illumination source 111 configured to propagate light from a first side of the connection end 101 and at least one other illumination source 112 configured to propagate light from a second side of the connection end 101. The first side of the connector may oppose the second side of the connector such that light propagates in opposing directions from the respective illumination sources 111, 112.

In this preferred embodiment, at least one illumination source 112 is configured to illuminate the device connection element 104 of the connection end 101 to facilitate connection of the connector 100 with the electronic device 200 in low light environments. For example, the illumination source 112 may project light in a direction of the associated connection element 104 with sufficient intensity to thereby illuminate the connection element 104 and preferably also the corresponding port 201 of the electronic device 200 when the connector 100 is brought into the vicinity of the device 200. The illumination source 112 and/or the connector 100 may comprise one or more open, transparent or translucent light guides or channels for focusing or targeting light emanating from the source 112 toward a preconfigured direction or directions and/or in a preconfigured shape. However, in some embodiments this preferred feature may be mitigated and the illumination source 112 may illuminate other regions surrounding the connector 100 instead.

In the preferred embodiment, at least one illumination source 111 may project light from one or more major surfaces of the housing 106 of the connection end 101. There may be multiple illumination sources of this type (only one of which is shown in the Figures) projecting light from multiple major surfaces of the housing 106, such as one from an upper surface and one from a lower surface in an opposing direction. Each source may project light through one or more open, transparent or translucent light guides to thereby emanate light in a preconfigured direction and/or preconfigured shape. In this description, reference to the source 111 may mean one source projecting light on one face/surface of the housing 106, or one or more sources projecting light on multiple faces/surfaces of the housing 106.

It is preferred that at least one other illumination source 113 is provided to illuminate the connection element 105 or a region proximal to this element. Similarly, the illumination source 113 may project light in a direction of the associated connection element 105 with sufficient intensity to thereby illuminate the connection element 105 and preferably also the corresponding port 301 of the device or power source 300 when the connector 100 is brought into the vicinity of the device or power source 300. The illumination source 113 and/or the connector 100 may comprise one or more open, transparent or translucent light guides or channels for focusing or targeting light emanating from the source 113 toward a preconfigured direction or directions and/or in a preconfigured shape. One or more other light sources may be provided at connection end 102 in some embodiments, such as sources similar to 111.

The illumination system 120 (shown in FIG. 2) is preferably located at the device connection end 101 and in particular within a housing 106 of the device connection end 101. In some embodiments, only parts of the illumination circuit 120 are located at or near the device connection end 101 and/or the circuit 120 may be located at other regions of the connector 100, such as within housing 107 at the connection end 102. At least one of the illumination sources 111-113 may be in optical communication with an open, transparent or translucent part of the respective housing 106, 107 such as an opening or cover, and/or, as mentioned, an optical guide to aid in guiding or channeling light toward the desired region of illumination.

In the preferred embodiment, the connector 100 further comprises an on-board power source 140 internal to or otherwise forming part of the connector 100, such as an on-board energy storage device in the form of a battery or a supercapacitor. The on-board power source 140 is electrically coupled to the illumination system 120 to power the illumination system 120 in at least one state or mode of operation. It is preferred that the on-board power source 140 is a rechargeable, energy storage device. In alternative embodiments, the connector 100 may not comprise an on-board power source and the illumination system 120 is powered via external power delivered by an external power source only. Voltage regulation and other power management circuitry may be incorporated to ensure safe and predictable operation of the illumination system, via the respective power sources.

Figure 2:
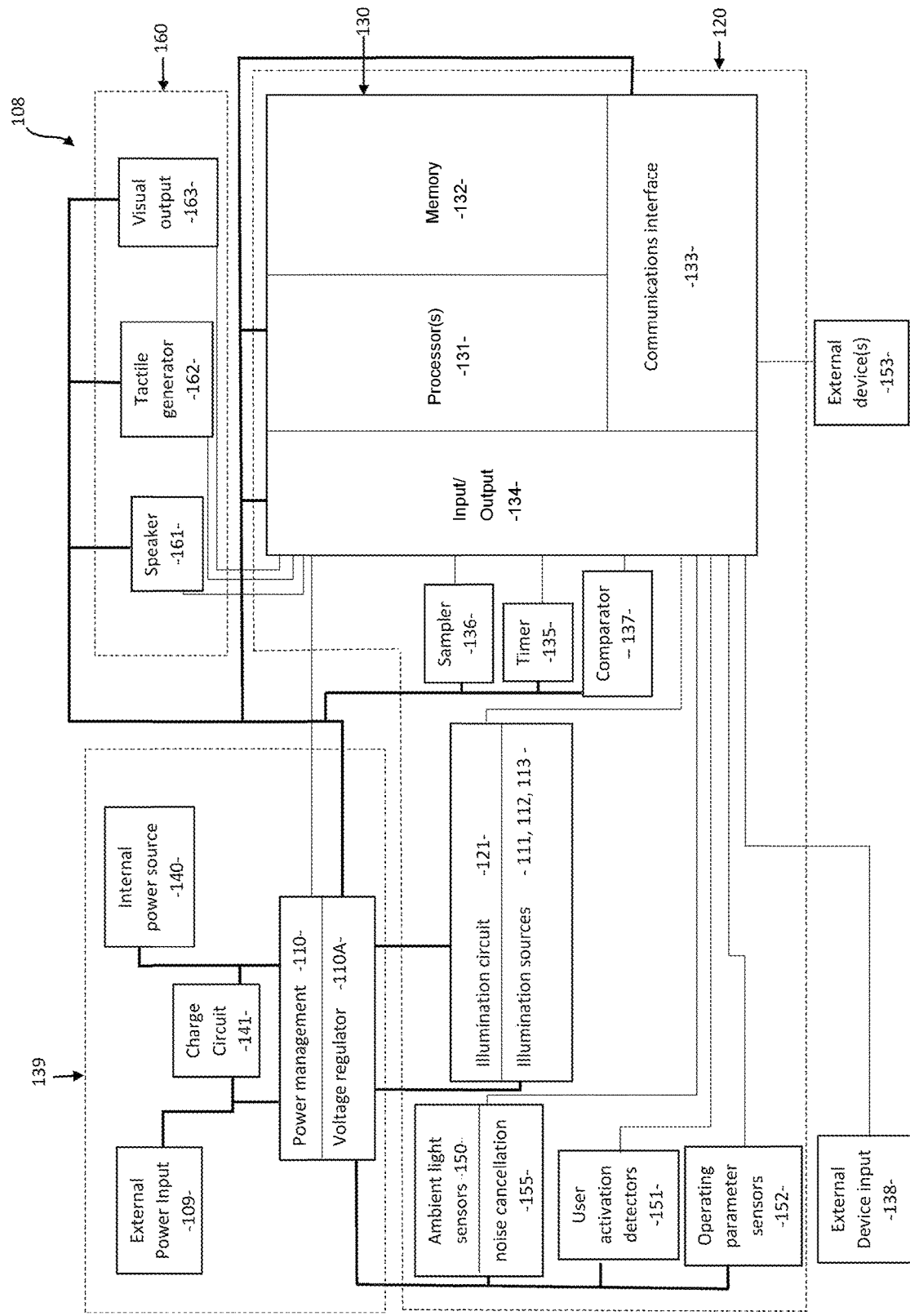
FIG. 2 is a block diagram of an electronic system of the connector of FIG. 1.

Referring to FIG. 2, a schematic of the electronic system 108 of connector 100 is shown. Details of this system 108 will now be described. In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments. Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a function of an electronic circuit or to a method, a function, a procedure, a subroutine, a subprogram, etc., of a computer program or other programmable device.

In the preferred embodiment, the system 108 comprises an illumination system 120 having a controller 130 operatively coupled to an illumination circuit 121 and one or more illumination sources 111-113. The controller 130 comprises: a processing system including one or more processor(s) 131 for executing instructions; an associated electronic memory 132 for storing information and/or instructions to be executed by the processor(s) 131; and a communications interface 133 and input/output interfaces 134 for receiving and sending signals to other devices and circuits within the system 108. The controller 130 is operatively coupled to the one or more illumination sources 111-113 of the system 108 via the illumination circuit 121. In conjunction with the illumination circuit 121, the controller 130 is configured to operate one or more of the illumination sources 111-113 in accordance with predetermined operational criteria.

The controller 130 may operate the illumination sources 111-113, independently or synchronously, by generating one or more illumination signals. In the preferred embodiment, the controller 130 is configured to operate all illumination sources 111-113 in accordance with the following predetermined operational criteria. However, it will be appreciated that in some embodiments any combination of one or more of the illumination sources 111-113 may be operated in the following manner.

It is preferred that the illumination signal(s) comprise a waveform with an amplitude that varies in the time domain (herein also referred to as "time-varying waveform") in at least one or more states of operation of the illumination circuit 121. Examples of time-varying waveforms include sinusoidal signals, fading signals, and pulse-width-modulated signals and/or other periodic or non-periodic signals. It is preferred that the time-varying waveform is periodic. The frequency of such periodic signals may be approximately at or above the flicker fusion rate in some embodiments or in some states of operations, such that the varying amplitude of light emitted from the respective illumination source 111-113 is not visually detectable by an observer. In this case, a substantially consistent brightness over time is observed, as defined by the average intensity of the time-varying illumination signal. The average intensity may be the root mean square (RMS) value of the signal, for example.

In other embodiments, or in some states of operation, the frequency of the periodic signal may be below the flicker fusion rate, such that the perceived brightness of the illumination source varies over time. This may be done by varying the amplitude of the signal and/or by varying the RMS value, such as by varying the duty cycle of a PWM signal.

In some embodiments, or in some states of operation, the time-varying waveform may be non-periodic and may flicker/oscillate between relatively high and relatively low amplitude values over time. The flicker rate of such waveforms may also be approximately at, above or below the flicker fusion rate as described above, causing the varying waveform to be non-observable or observable by a viewer, respectively.

In some embodiments, or in some states of operation, the signal may consist of a combination of two or more signal components, each component having a frequency (in the case of a periodic signal) or flicker rate (in the case of a non-periodic signal) that is approximately at, above or below the flicker fusion rate, as described above. For example, in the preferred embodiment, in one mode of operation, the illumination signal for one or more of the illumination sources 111-113 could comprise a first, periodic signal component with a frequency that is above the flicker fusion rate and a second, non-periodic signal component with a frequency that is below the flicker fusion rate. This may occur in the case where the first component of the illumination signal is in response to a first input signal (such as a light sensor input) and the second component is in response to a second input signal (such as a touch sensor), for example. In another mode of operation of the preferred embodiment, the illumination signal for controlling one or more sources 111-113 may comprise a single, periodic component with a frequency that is below the flicker fusion rate. This may occur when the connector 100 is in a low power mode, for example, and outputs a fading signal to indicate this mode.

The controller 130 may be configured to adjust the brightness of the illumination sources 111-113 by controlling one or more parameters of the time-varying waveform including, for example: waveform frequency, waveform amplitude, waveform shape/profile, waveform gradient(s) and/or waveform duty cycle. In the preferred embodiment, the controller 130 is configured to adjust the brightness of illumination sources 111-113 by controlling one or more of: waveform amplitude and/or waveform duty cycle.

The controller 130 may also be configured to adjust the brightness output by the respective illumination source 111-113 by adjusting or controlling the frequency components of light emanating from the sources 111-113, e.g. the perceived colour of light. Adjusting or controlling the frequency components of illumination source 111-113 may include operating one or more closely associated illumination devices of each source 111-113, each device configured to output light having an associated frequency or associated frequency components. For example, one or more illumination sources 111-113 may comprise red, green and blue light emitting diodes in close association, and the overall colour of light perceived by the viewer from the respective illumination source 111-113 is controlled by controlling the intensity of light output from each of the light emitting diodes independently.

In some embodiments, the controller 130 and/or illumination circuit 121 may be configured to control the illumination sources 111-113 of the illumination signals using a substantially non-time-varying waveform, in at least one or more states of operation. In this case, the brightness may be adjusted by adjusting the waveform amplitude. The controller 130 may also be configured to adjust the brightness output by the respective illumination source 111-113 by adjusting or controlling the colour component(s) of light emanating from the sources 111-113, e.g. the perceived colour of light, as per the above description.

The illumination system 120 further comprises one or more devices or detectors 150-152 operatively coupled to the controller 130 for facilitating control of the illumination sources 111-113. In this preferred embodiment, the illumination system 120 comprises one or more light sensing devices 150 configured to detect ambient light conditions surrounding the connector 100. The ambient light signals may indicate one or more parameters of the ambient light, such as: light intensity, and/or a frequency/wavelength of one or more frequency components of light. In the preferred embodiment, the ambient light signals indicate at least an intensity of light surrounding the sensing device 150 to represent brightness of ambient light. In some embodiments, the ambient light signals may indicate an ambient light source type, such as a natural or artificial light source type.

The controller 130 may be configured to determine or derive a measure of brightness from the ambient light signals output by the sensing device 150, and in particular based on the one or more detected parameters of the ambient light, such as: the light intensity, the frequency/wavelength of one or more frequency components of light, and/or the light source type. The controller 130 is preconfigured to control the output of the illumination sources 111-113 based on the signals or data received from the light sensing device(s) 150 and/or from the measure of brightness derived from these signals. For example, the controller 130 may be configured to determine or derive from the intensity of light parameter, any one or more of: an intensity of light at a point in time, a maximum intensity of light over time, an averaged intensity of light over time, a waveform shape of light, and/or a period or frequency of a periodic waveform of light. An average intensity of light may be a RMS value of the intensity of light over time. In the preferred embodiment, the controller is configured to determine an average, intensity of light to account for light signals with time-varying amplitudes, affecting the overall perceived brightness of light, particularly in cases where the frequency of the waveform is at or above the flicker fusion rate. For example, in the case of some artificial light sources, light signals have a time-varying waveform with a shape and period determined by the associated AC power supply. This shape and/or period, in conjunction with the amplitude of the signal, establishes the perceived brightness of the light. Natural light on the other hand has a substantially constant intensity and will therefore generate a higher, relative brightness for the same amplitude (and colour) as artificial light. Detecting or determining the time-varying waveform shape, period and/or averaged intensity thus enables relatively accurate detection or determination of perceived brightness surrounding the ambient light detector(s) 150.

The illumination system 120 preferably further comprises one or more user input detector(s) 151 operatively coupled to the controller 130 for detecting one or more user-activated inputs. For example, the user input detector(s) 151 may comprise touch, audio, optical, proximity and/or motion sensing devices for detecting associated user-generated inputs and providing representative signals to the controller 130 accordingly. In the preferred embodiment, the controller is preconfigured to control the output of the illumination sources 111-113 based on the output(s) of the user input detector(s) 151.

In some embodiments, the illumination system 120 may further comprise one or more operating parameter detectors or sensors 152 internal to the connector 100 and configured to sense one or more operating parameters associated with the connector 100, including for example: voltage within the system 108, current through the system 108, temperature within one or more regions of the connector 100, signals received through the connection elements 104 and/or 105, and/or other such parameters. The operating parameter detectors or sensors 152 may be operatively coupled to the controller 130 for sending signals to the controller indicative of the operating parameters. The communication interface 133 of the controller may be configured to communicate to one or more other external or peripheral devices 153, including sensing or computing devices, for example, for receiving signals from such devices indicative of their operation. Communication may be achieved via the connection elements 104 and/or 105, or may be via other means such as a wireless communication interface. In such embodiments, the controller 130 may be further configured to operate the illumination sources 111-113 in accordance with the one or more operating parameter signals and/or one or more external device signals.

In some embodiments, the system 108 may further comprise one or more sensory outputs 160 configured to alert the user of an event or activity relating to the connector 100. Sensory outputs 160 may include, for example, speakers 161, tactile generators 162, and/or visual outputs 163 such as illumination devices (including 111-113 in some embodiments) or display screens. The events and/or activity relating to the connector 100 may include any one or more of the inputs received from the detectors or devices 150-153. The controller 130 may be configured to operate one or more sensory outputs 161-163 in accordance with predetermined criteria associated with one or more inputs from detectors/devices 150-153.

The illumination system 120 is preferably powered from one or more power sources. In this embodiment, the illumination system 120 may be powered using multiple power sources. A first power source may be an external power source which may deliver power to the illumination system 120 via an external power input 109 of the system 108, operatively coupled to the power source connection 105 of the connector 100. The external power input 109 is preferably coupled to a power management module 110, which may form part of controller 130 in some embodiments, of a power delivery system 139. A second power source may be an on-board power source 140, such as an on-board energy storage device that is internal to the connector 100. For example, the energy storage device may be a battery or supercapacitor.

In some embodiments, the on-board power source 140 may comprise an energy harvesting device or functionality, such as solar, kinetic, thermal or wireless, radio frequency (RF) based harvesting. Suitable receivers and/or transducers may be incorporated in the illumination system 108 in such embodiments as would be apparent to those skilled in the art. For example, the connector may comprise a "rectenna" or other similar device including molybdenum disulfide material for converting AC electromagnetic waves into DC electricity as described in the following publication—http://news.mitedu/2019/converting-wi-fi-signals-electricity-0128. This could produce approximately 40 microwatts of power when exposed to typical levels of Wi-Fi energy.

The on-board energy storage device 140 is preferably operatively coupled to the power management module 110. The power management module 110 may include a voltage regulator 110A configured to regulate and deliver power to the illumination system 108. The power management module 110 may also be operatively coupled to the controller 130 to indicate a connection status of the external power source with the power source input 109.

In the preferred embodiment, the power delivery system 139 may further comprise an energy storage charge circuit 141 for recharging the on-board energy storage device 140. The charge circuit 141 is used to manage the charge and discharge of the energy storage device 140 and to provide safety protection for the device 140. The charge circuit 141 is configured to receive input power from the external power input terminal 109 and deliver this to the energy storage device for recharge.

Illumination System—Adjusting Brightness

Figure 3:
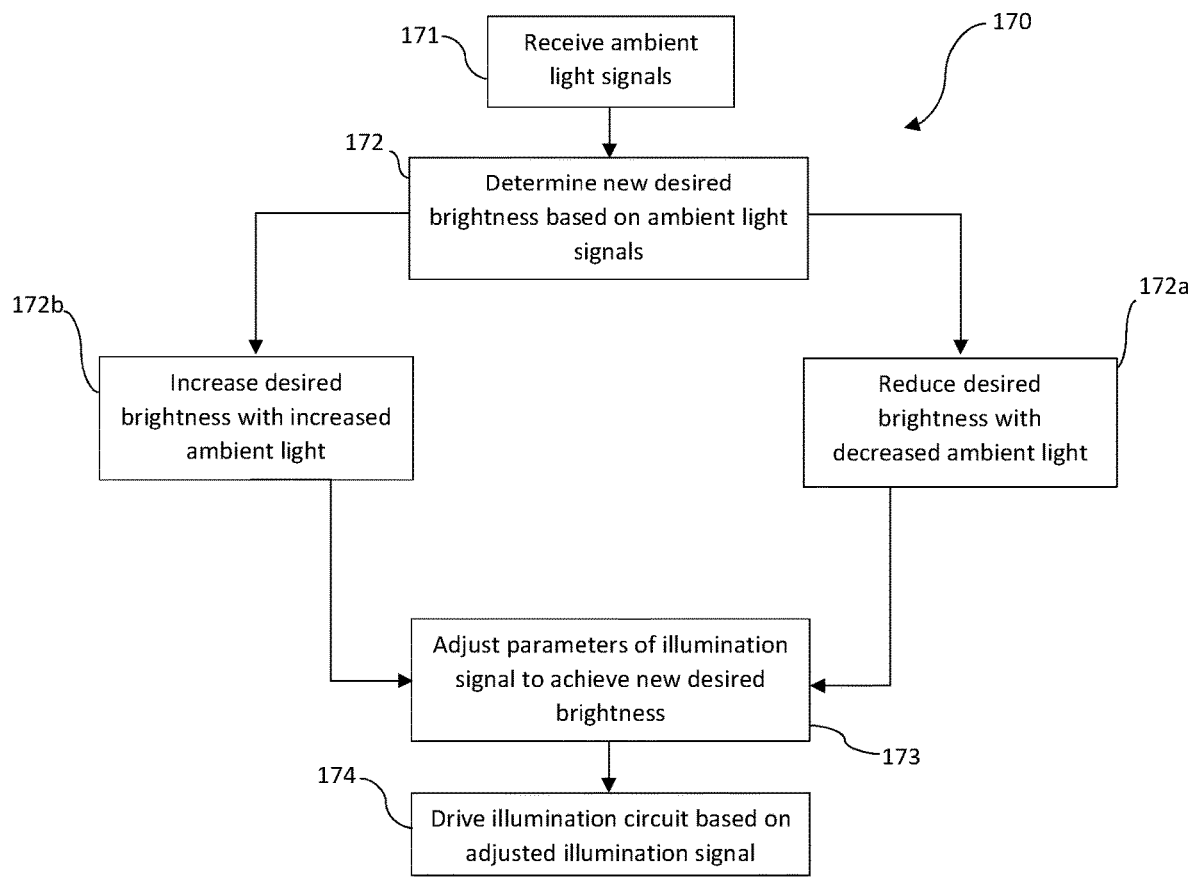
FIG. 3 is a flow diagram of a first method executable by the connector of FIG. 1.

As mentioned, the controller 130 is configured to control the output of at least one of the illumination sources 111-113 based on the conditions of ambient light, such a brightness of light surrounding the connector 100, received or determined from the ambient light signals of at least one of the light sensing device(s) 150. Referring to FIG. 3, in the preferred embodiment the controller 130 is configured to operate in accordance with a first method 170, wherein the controller 130 receives ambient light signals of at least one of the light sensing device(s) 150 (step 171), then determines from the ambient light signals a desired output brightness for one or more of the illumination sources 111-113 (step 172). The desired output brightness may comprise a desired maximum brightness, a desired average brightness, or a desired brightness profile that varies over time (i.e. time-varying brightness waveform). The brightness of one or more illumination sources 111-113 is then adjusted according to the new desired brightness by adjusting one or more parameters of the illumination signal to achieve the desired brightness (step 173) and controlling the illumination circuit accordingly (step 174). This may be achieved by adjusting one or more parameters of the illumination signal waveform, such as: waveform amplitude or gain, waveform shape, waveform gradient(s), waveform frequency or frequencies, and/or waveform duty cycle. In this specification, and unless specified otherwise, the term "gain" when used in relation to altering a signal, is intended to mean a gain (increase in amplitude) or attenuation (decrease in amplitude) of the signal. One or more of these parameters are adjusted based on the type of illumination signal being generated by the controller 130 and illumination circuit 121 for the illumination sources 111-113. For example, for a fading illumination signal, the waveform amplitude, or gain, may be adjusted based on the received ambient light signals to alter the average brightness to a new desired average level (such as a desired RMS level) and for a pulse width modulated signal, the waveform gain and/or duty cycle may be adjusted based on the received ambient light signals to alter the average brightness to a new desired average level (such as a desired RMS level).

In the preferred embodiment, at step 172, the desired brightness of the illumination sources 111-113 is selected and/or determined such that the connector 100 may approximately maintain a desired level of perceived brightness in various ambient light conditions. For example, the brightness of a light source having substantially constant light intensity, is typically perceived differently in low light conditions versus bright light conditions. In other words, a particular light intensity in bright light conditions may be perceived weaker or softer than in low light conditions, and uncomfortably bright in ever lower light/darker conditions. In the preferred embodiment, the controller 130 is configured to approximately maintain the perceived brightness at acceptably comfortable levels in various ambient light conditions by reducing the average brightness of light emanating from one or more illumination sources 111-113 when the ambient light signals of the light sensing devices 150 indicate reduced brightness of ambient light (i.e. the controller reduces brightness surrounding the connector in darker environments)—step 172a. This ensures that the brightness of the connector 100 in darker environments is comfortable to the user, while maintaining a minimum brightness to assist with the location and connection of the connector as previously described. This is preferably achieved by reducing the average light intensity and/or the maximum light intensity output by the illumination sources 111-113.

The controller 130 is further configured to increase the brightness of light emanating from one or more illumination sources 111-113 when the ambient light signals of the light sensing devices 150 indicate an increased brightness of ambient light (i.e. the controller increases brightness surrounding the connector in lighter environments)—step 172b. This ensures that the connector is sufficiently illuminated in lighter environments to be located more promptly, for example. This is preferably achieved by increasing the average light intensity and/or the maximum light intensity output by the illumination sources 111-113.

Furthermore, the controller 130 may be configured to maintain a minimum brightness of the illumination source(s) 110 irrespective of the sensed ambient light brightness. The controller 130 may also be configured to maintain a brightness of the illumination source(s) 110 below a predetermined maximum brightness threshold, irrespective of the sensed ambient light brightness.

In some embodiments, at step 172 the controller 130 may be configured to determine the desired illumination signal by acquiring from a look-up table stored in an associated electronic memory 132, data indicative of a desired illumination signal based on the received ambient light signals. The electronic memory component may comprise at least one computer readable medium. The electronic memory component is preferably on-board the connector 100 but may alternatively be remote and accessible via a communication system 133 of the controller 130. The look up table is preferably predetermined and pre-stored in the electronic memory. Alternatively, or in addition, the controller 130 at step 172 may be configured to determine the desired illumination signal by applying a predetermined algorithm or algorithms on the ambient light signals.

In some embodiments, the controller 130 may also be configured to alter one or more other parameters of the illumination signal, such as brightness, wavelength and/or waveform, for at least one illumination source 111-113 upon receiving a signal from an external device input 138 (shown in FIG. 2) indicative of a connection of the device connection element 104 with an electronic device 200. For example, the controller 130 may increase brightness of one or both illumination sources 111, 112 when the input 138 indicates a connected status between the connection element 104 and the device 200. Similarly, the controller may be configured to alter one or more other parameters of the illumination signal, such as brightness, wavelength and/or waveform, for at least one illumination source 111-113 upon receiving a signal from the input 109 (shown in FIG. 2) indicative of a connection of the connection element 105 with a power source or other device. For example, the controller 130 may increase brightness of the illumination source 113 when the input 109 indicates a connected status between the connection element 105 and the corresponding power source or device.

In some embodiments, the controller 130 may also be configured to deactivate at least one illumination source 111-113 upon receiving ambient light signals indicative of a brightness level of ambient light that exceeds a predetermined brightness threshold level.

Illumination System—Modes of Operation

As previously described, in the preferred embodiment the connector 100 comprises an on-board power source 140, such as a rechargeable battery that is configured to supply power to the illumination circuit 120 in at least one mode of operation. In this internally-powered mode of operation, the controller 130 is configured to operate the illumination circuit 121 in a manner that conserves power by maintaining a certain level of power usage to preserve stored energy/battery life. It achieves this by controlling the illumination sources 111-113 using a recursive, fading illumination signal that oscillates between a maximum amplitude and a minimum amplitude, for example. In this mode, the maximum intensity of the signal translates to a desired level of perceived brightness that is momentarily visible to the user to assist in location and/or connection. However, the fading of the signal minimises the average brightness/intensity and power usage of the illumination sources 111-113, to prolong battery life. It is preferred that the fading illumination signal is generated at least predominantly using analogue components of the illumination circuit 121 to further reduce power demand on the battery in this mode of operation.

The connector 100 is also configured to connect to an external power source 300 for the delivery of power to the on-board power source 140, in the case where it is a rechargeable energy storage device. When the external power source is connected to the connector 100, there is less concern for the illumination circuit 121 to maintain low power usage. As such, in this externally-powered mode of operation the controller 130 may be configured to operate the illumination circuit 121 using a more flexible technique that may also be optionally less power conscious. In the preferred embodiment, this technique involves the utilisation of pulse-width-modulation to control the average intensity of an otherwise substantially uniform illumination signal waveform. The average intensity translates to the desired brightness consistently perceived by the user during operation. The controller 130 may utilise predominantly digital techniques to generate and control the illumination signal in the externally-powered mode of operation. In some embodiments, the controller may be configured to control the illumination source using one or more other predetermined illumination signal waveforms, such as non-time-varying waveforms or time-varying waveform profiles with visible pulsing patterns, or based on current drawn from the external power source for example.

Figure 4:
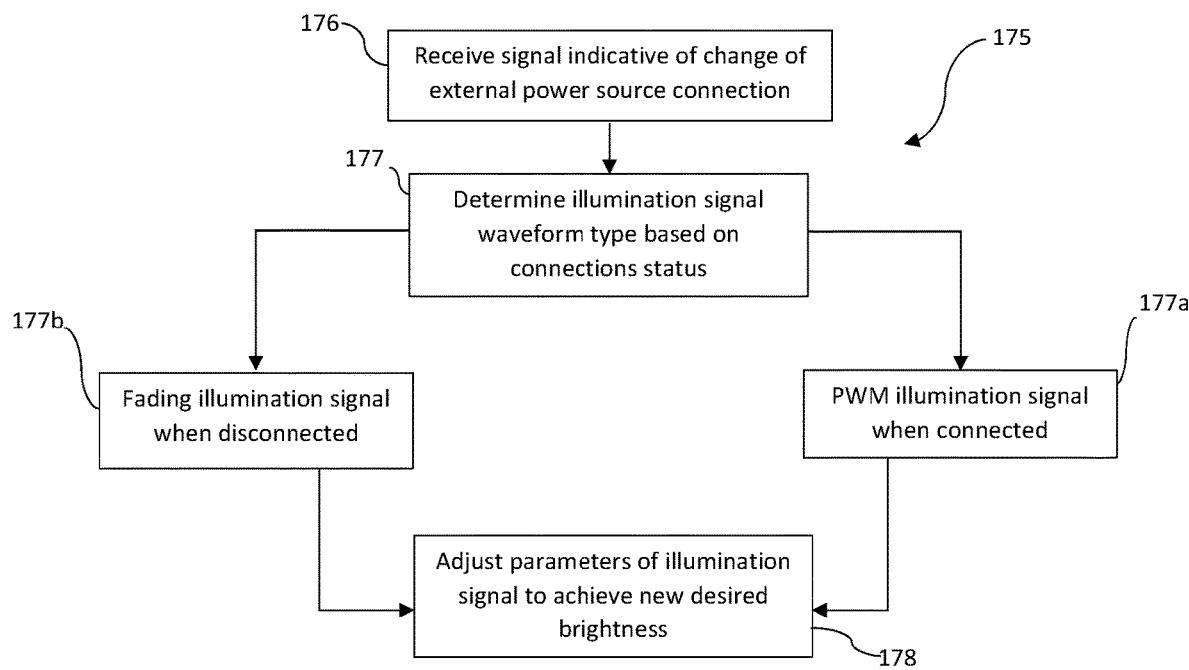
FIG. 4 is a flow diagram of a second method executable by the connector of FIG. 1.

Referring to FIG. 4, in the preferred embodiment the controller 130 is therefore configured to operate the illumination circuit 121 in accordance with a second method 175. In this method 175, the illumination circuit 121 for at least one of the illumination sources 111-113 is operated based on the connection status of the external power source and/or the type of power source delivering power to the circuit 120. At step 176 the controller 130 determines or receives data/signals indicative of a change in the connection status between the connector 100 and an external power source 300. Accordingly at step 177 the controller 130 determines an illumination signal waveform type for controlling the illumination sources 111-113, based on the connection status. The illumination circuit is then controlled based on the determined illumination signal waveform type (step 178). For example, and as previously described, in the externally-powered mode of operation, when the external power source is connected, a waveform that can be precisely digitally controlled is preferred due to its flexibility. For example, in the preferred embodiment, the waveform type of the illumination signal in the externally-powered mode of operation is a pulse width modulated signal—step 177*a*. In the internally-powered mode of operation, when the external power source is not connected and power is provided by the on-board power source 140, a second waveform type is selected that is relatively more power conscious (i.e. that draws relatively less power from the power source(s) on average, and may output a relatively similar perceived maximum brightness). In the preferred embodiment, the second waveform type is a fading illumination signal, for example—step 177*b*.

In the preferred embodiment, the illumination system 120 is configured to draw relatively less power in the internally-powered mode of operation relative to power drawn in the externally-powered mode of operation, and more preferably significantly less power, to ensure battery life is maintained for as long as possible, particularly in the case where a rechargeable power source is used. For example, the illumination system 120 may draw less than approximately 10% power in the internally-powered mode of operation, relative to the externally-powered mode of operation, but most preferably power drawn in the internally-powered mode of operation is less than approximately 0.01% of power drawn in the externally-powered mode of operation This may equate to an average current drawn in the internally-powered mode of operation that maintains operation of the key elements of the illumination system 120, such as the illumination circuit 121, the illumination sources 111-113, the light sensor(s) 150, the user activation detectors 151, the timer 135, and controller 130, for a period of approximately 30 days to 360 days, for example, without the need to recharge the on-board energy storage device 140. For example, in the preferred embodiment, controlling the illumination system 120 may maintain an average current usage of approximately less than 1 uA from a 10 mAh battery, in the internally powered mode of operation which equates to approximately 400 days of operation before the battery loses charge. In the case w here energy harvesting is included in the on-board power source, the connector 100 may operate in the internally-powered mode for even longer periods, or potentially indefinitely when the power usage of the illumination system 120 is below the power output of the energy harvesting device. For example, an energy harvesting device that is configured to produce approximately 15 microwatts can accommodate current usage of approximately 5 uA, at 3V, without depleting the energy storage device for periods that could extend well over a number of years.

Illumination Circuit Embodiment

Figure 5:
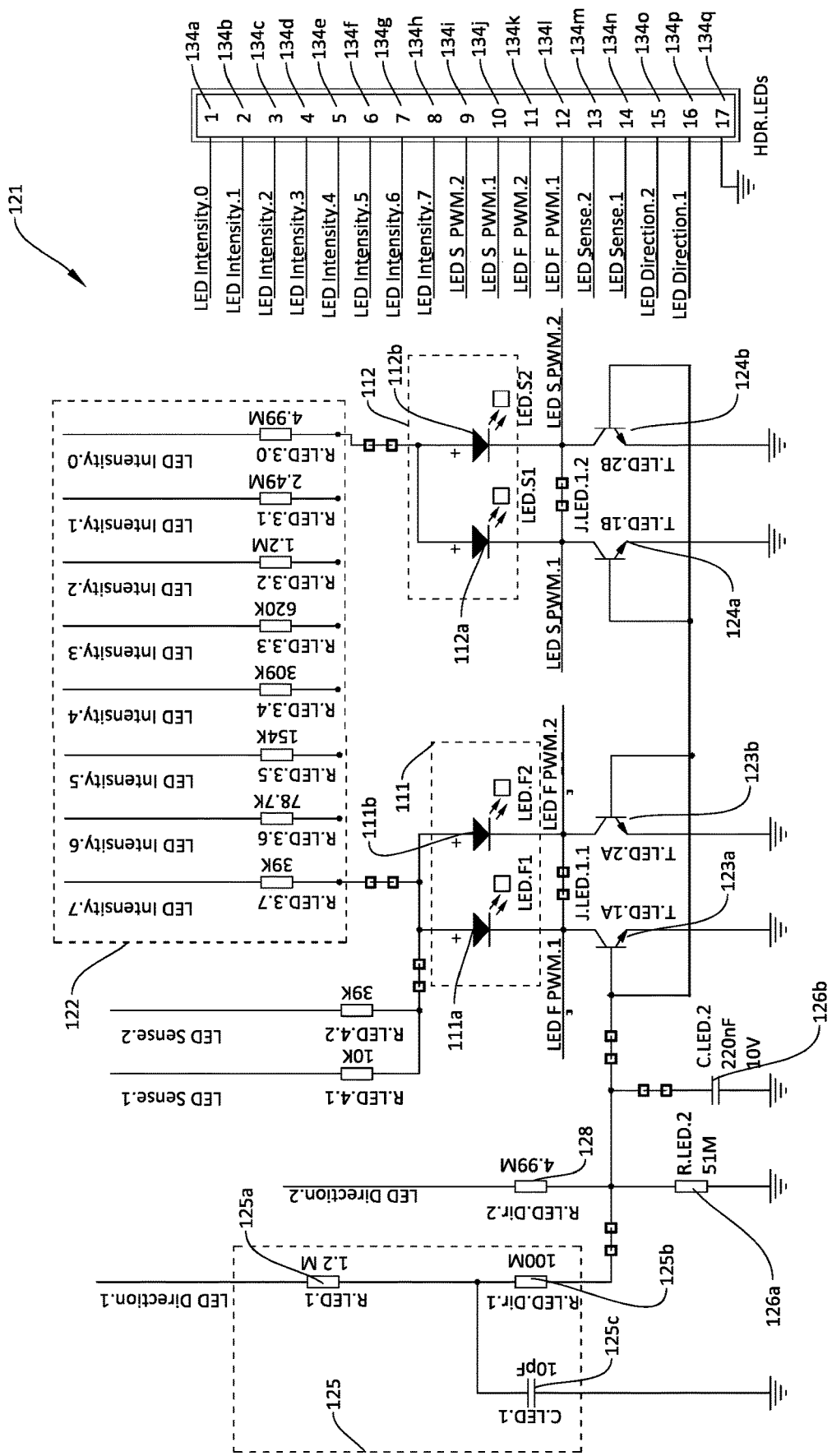
FIG. 5 is a circuit diagram of an illumination circuit of the connector of FIG. 1.

Referring to FIG. 5, an exemplary embodiment of an illumination circuit 121 responsible for operating the illumination sources 111,112 in conjunction with the controller 130, is shown. Illumination source 113 may also be included in the circuit and operated in the same manner, but this has been removed from the figure and this part of the description so not to obscure the details of the circuit 121. Alternatively, illumination source 113 may form part of a separate circuit, similar to 121 but at the other end of the connector 100. The controller 130 is also not shown in this figure so not to obscure the details of the circuit 121. The inputs/outputs 134a-q of the controller 130 show the connection of the controller 130 with the remainder of the circuit 121. The circuit 121 is responsible for generating the first and second illumination signal waveform types (in accordance with method 175), and for enabling adjustment of illumination source brightness based on ambient light conditions (in accordance with method 170).

This circuit 121 is operable in one of two modes of operation: a first, externally-powered, mode of operation in which the connector 100 is connected to an external power mode 300; and a second, internally-powered mode of operation in which the connector 100 is not connected to an external power source 300, but may be operated by a relatively limited capacity on-board power source 140 such as an on-board battery or supercapacitor.

In this example, first and second illumination sources 111 and 112 are connected to the circuit 121, for illuminating two different regions of the connector 100 and/or for generating light signals of varying wavelengths, for example. It will be appreciated that any number of one or more illumination sources may be utilised in other embodiments without departing from the scope of the invention. Furthermore, in this example, each illumination source 111 and 112 comprises a pair of illumination devices 111a,b and 112a,b respectively. Collectively, each pair of illumination devices 111a,b and 112a,b forms an illumination source 111 and 112 configured to illuminate a same or similar region surrounding the connector 100. It will be appreciated any number of one or more illumination devices may be utilised for each illumination source 111-113. Each illumination device 111a,b and 112a,b may be a light emitting diode (L.E.D), an organic L.E.D, or any other suitable light emitting device known in the art. One or more of the illumination devices 111a,b and 112a,b are preferably configured to illuminate the connection end 102 of the connector 100. In this embodiment, illumination devices 112a,b are configured to illuminate the connection element 104, whilst illumination devices 111a,b are configured to illumination a major face of housing 106.

In the externally-powered mode of operation, a pulse width modulator is used to generate an illumination signal having a first waveform type and used to drive one or more illumination sources 111 and/or 112 of the circuit 121 accordingly. In the internally-powered mode of operation, a fading sub-circuit is used to generate an illumination signal having a second waveform type and used to drive the one or more illumination sources 111 and/or 112 accordingly. Preferably, both illumination sources 111 and 112 are controlled in both modes of operation by the respective sub-circuits. However, in some embodiments only some of the illumination sources may be controlled in one mode of operation, while others are controlled in another mode of operation. Similarly, the illumination source 113 may be operated in only one, but preferably both modes of operation.

Figure 6A:
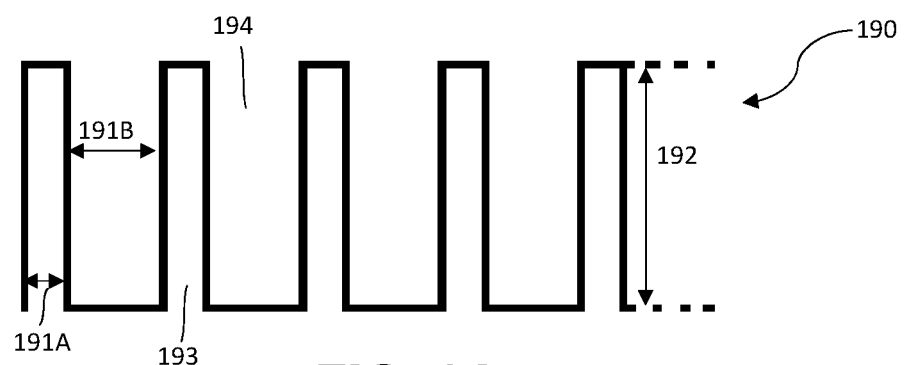
FIG. 6A is a diagram of an illumination signal of the illumination circuit of FIG. 5, in a first mode of operation.

In the externally-powered mode of operation, the illumination sources 111 and 112 of the circuit 121 are operated via illumination signals having a first waveform type and that may be adjusted in accordance with a first adjustment technique. Referring also to FIG. 6A, the illumination signal 190 in this mode of operation may comprise a pulse width modulated signal, and the brightness of the illumination source(s) 111 and 112 may be adjusted during operation by adjusting the duty cycle and/or maximum amplitude 192 of the signal. The duty cycle (ratio of on-time 191A versus off-time 191B) of the pulse width modulated signal is preferably adjusted digitally, for example via a PWM function/module of the processing system or via any other suitable PWM circuits known in the art. The PWM controller uses the PWM control lines 134i-l to turn on/off the LEDs. The maximum amplitude 192 of the pulse width modulated signal may be adjusted using any suitable method known in the art. In this embodiment a current divider 122 is used, comprising a series of parallel resistors with current paths connected to the illumination sources 111, 112. The current paths can be individually controlled to open or close the current path through the respective resistor by the processing system of controller 130 (by setting the states of respective output 134a-h to a predetermined voltage level or to high impedance respectively, for example). Controlling the state of individual current paths adjusts the collective resistance applied to the illumination signal current path, which in turn sets the maximum current and therefore amplitude 192 of the illumination signal 190. There may be any number of resistors and any resistor values used as is required by the particular application and the invention is not intended to be limited to the example shown. Other types of amplitude or gain adjustment circuits or functions may be utilised, as is well known in the art without departing from the scope of the invention.

There may be any number of PWM signal outputs operatively coupled to the illumination devices 111a,b and 112a,b. In this embodiment, a separate PWM signal output 134h-134k is operatively coupled to each illumination device 111a,b and 112a,b. In this manner, the illumination devices may be controlled individually in some circumstances.

In the externally-powered mode of operation, the processing system is configured to adjust the brightness of the illumination sources 111, 112 based on ambient light signals indicative of ambient light conditions, and in particular ambient light brightness. In particular, the processing system is configured to reduce light intensity of the illumination sources 111, 112 when the ambient light signals indicate an increased ambient light brightness, and to increase light intensity of the illumination sources 111, 112 when the ambient light signals indicate a decreased ambient light brightness. In the preferred form of this embodiment, the light intensity of the illumination sources 111, 112 is adjusted by adjusting the duty cycle of the respective illumination signal(s), while maintaining a uniform amplitude 192 of the signal. The frequency of the illumination signal is preferably substantially high such that on cycles 193 and off cycles 194 of the modulated signal are not visible to the user, and instead an average intensity set by the duty cycle is observed. Alternatively, or in addition the amplitude 192 of the illumination signal may be adjusted via controllable current source 122 to alter the brightness perceived by the user. It will be appreciated that due to the provision of more power, other signal types and/or waveform adjustment techniques may be utilised in this mode of operation. For example, a substantially non-time-varying signal may be used with gain adjustment to adjust brightness, or any other time-varying signal may be utilised that may be adjusted in waveform shape and/or maximum or average amplitude. Many other variations exist in this regard without departing from the scope of the invention.

Figure 6B:
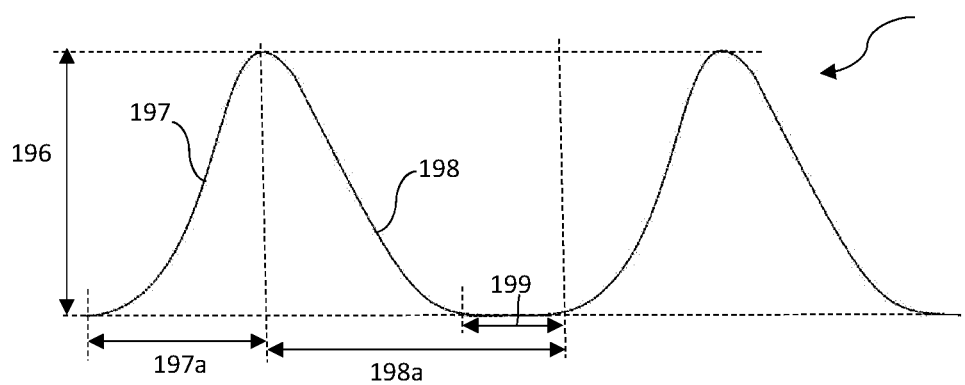
FIG. 6B is a diagram of an illumination signal of the illumination circuit of FIG. 5, in a second mode of operation.

In the internally-powered mode of operation, the illumination circuit 120 is disconnected from the external power source and may be powered by the rechargeable on-board energy storage device 140 (not shown), for example. The processing system preferably determines when the external power source is disconnected and changes the mode of operation to this mode accordingly. In the preferred embodiment, the circuit 121 is configured to generate a recursive, fading illumination signal 195 (shown in FIG. 6B) and drive the illuminations sources 111 and 112 accordingly in this mode of operation.

The illumination circuit utilises the current divider 122 to alter a maximum amplitude 196 or a gain applied to the illumination signal 195. The adjustment in maximum amplitude or gain translates into the maximum intensity and/or brightness perceived by the user from the associated illumination source(s) 111, 112 during this mode of operation. The controller 130 determines the desired maximum amplitude or gain to be applied based on the desired brightness and controls the current divider 122 inputs accordingly.

The illumination circuit 121 is configured to generate the illumination signal 195 having the fading waveform (shown in FIG. 6B) predominantly using analogue circuitry. This reduces the power usage requirements of the circuit 121 in this mode of operation. The circuit 121 thus comprises one or more amplifiers for recursively generating a fade-up component 197 followed by a fade-down component 198 of the illumination signal 195. The periods 197a, 198a of the fade-up and the fade down components respectively may be substantially the same or alternatively they may differ. It is preferred that the periods differ. In the preferred embodiment, the period 198a of the fade-down component 198 may comprise a significant period 199 of minimum or substantially zero amplitude to further minimise power usage in this mode. In the illumination circuit 121 shown in FIG. 5, an amplifier is operatively coupled to each of the illumination devices 111a,b of illumination source 111 and an amplifier is operatively coupled to each of the illumination devices 112a,b of illumination source 112. It will be appreciated that in alternative embodiments, any number of one or more amplifiers may be operatively coupled to each illumination source 111,112. In this example, each amplifier comprises a transistor 123a,b and 124a,b coupled, at the base, to a resistor-capacitor (RC) pair 126a,b. The transistors 123a,b and 124a,b may be of any suitable type known in the art such as, but not limited to, Field Effect Transistors (FETs), MOSFETS, Bipolar Junction Transistors (BJTs) or may consist of more than one transistor such as a Darlington pair. The transistors 123a,b and 124a,b control the fading of the illumination devices 111a,b and 112a,b respectively by varying the current through the illumination devices based on the charge across the respective capacitor 126b. During operation of the fading sub-circuit, the capacitor 126b is charged by applying a voltage at the output 134p via the controller 130. This causes a current to flow through the resistors 125a, 125b and into the capacitor 126b causing its voltage to rise. As the voltage of the capacitor 126b rises the current into the base of the transistors 123a,b and 124a,b increases and the transistors 123a,b and 124a,b begin to let current flow through the illumination devices 111a,b and 112a,b. The charge curve of the capacitor 126b follows a typical RC charge curve and eventually the capacitor reaches its maximum charge voltage, at which time the illumination devices 123a,b and 124a,b reach their maximum intensity/brightness as set by the current divider 122. The maximum charge voltage of the capacitor 126b is set by the resistors 126a, 125a, 125b as a potential divider. Conversely, when the processing system switches the output 134p to a high impedance (by making it an input or disabling it, for instance), current stops flowing into the capacitor 126b which stops it from charging. Instead the capacitor beings to discharge through resistor 126a and the base of the transistors 123a,b and 124a,b causing the transistors to begin to turn off. As the charge voltage on the capacitor 126a dissipates, the current through the transistors 123a,b and 124a,b and the illumination devices 111a,b and 112a,b gradually decreases. This causes the intensity of the illumination devices 111a,b and 112a,b to gradually decrease/dim until a predetermined amount of time or minimum current/intensity is reached. In this configuration, the predetermined minimum current is close to zero amperes, but in alternative embodiments it may be set to a different amount until the circuit switches to charge the circuit again. The fading circuit continues this cycle by using the controller 130 to switch the value/state of output 134p to create the recursive fade-up 197 and fade-down 198 components of the signal 195.

In an alternative embodiment resistor 126a may be omitted and the output 134p can be switched to ground to discharge the capacitor 126b to ground through resistors 125a, 125b during the fade off period 198a. In another alternative embodiment output 134o can be switched to high impedance during the fade on period 197a and ground during the fade off period 198a. The time taken to fade off is then controlled by the value of the resistor 128 in conjunction with the capacitor value 126b. By adding more outputs from the controller 130 connected via resistors to the capacitor 126b, the controller 130 can be used to cycle between more than one preconfigured fade on 197a or fade off time 198a.

The above-described circuit configuration and functionality relates to NPN transistors types. However, it will be appreciated that in alternative embodiments some or all parts of the circuit may be reconfigured to achieve a same or similar functionality for PNP transistor types, as would be readily apparent to those skilled in the art.

The controller 130 may be configured to switch the value/state of outputs 134o-p based on one or more predetermined switch triggers. These triggers include for example: a timing/period trigger and/or a value trigger. A timing/period trigger is one in which the controller 130 switches the input when a predetermined period is expended, such as the fade-up period 197a or the fade-down period 198a. In other words, the controller 130 may be configured to switch inputs based on predetermined threshold periods relating to the desired fade-up period and desired fade-down period. The controller 130 may utilise one or more digital or analogue timing circuits 135 to monitor and determine expenditure of such threshold periods. The controller may then enter a low power state to preserve energy until the next timing event occurs, at which time the controller would revert to a higher power state to continue operation.

A value trigger may relate to the illumination signal reaching a predetermined threshold value, such as the maximum amplitude value or the minimum amplitude value. A value trigger may alternatively or additionally relate to the illumination signal reaching a threshold value that is at or above a certain percentage of maximum or minimum amplitude values. For example, the threshold value may be at least 80% of the maximum or minimum amplitude values. A value trigger may also relate to a change in value or gradient of the signal being within a predetermined change/gradient threshold. For example, a gradient of the illumination signal may reduce toward maximum or minimum values, and the controller 130 is configured to determine when the gradient is within the threshold to trigger the switch in amplifier input(s). The controller 130 may utilise one or more samplers 136 and/or comparators 137 to sample the value of the illumination signal and compare the value or change in value/gradient to the predetermined threshold(s). Any combination of one or more value triggers and/or timing triggers may be utilised by the controller to trigger the switch in amplifier input(s). Sampling the illumination signal can be done by sampling the voltage at either side of the illumination devices 111a,b and 112a,b. In the preferred embodiment it is done between the illumination devices 111a,b and 112a,b and the transistors 123a,b and 124a,b.

The controller 130 may rely on internal or external memory components to determine the previous state of the output 134p, so that it may determine and set the next, alternate state accordingly. This could be useful, for example, when a timing trigger is used and the processor enters a shutdown state with no RAM retention. The memory component used for this purpose may be an internal memory of a processor such as FRAM, or alternatively it be an analogue memory component 125a and 125c. The memory component 125 may be operatively coupled to the output 134p or another output used to store a previous value/state of the output for a predetermined length of time. This analogue implementation is preferred for processors without reliable non-volatile memory, when it is necessary for the processing system to know the previous state of output 134p, as it typically utilises less power than operating and accessing the internal memory of most processors.

The above-described timers 135, samplers 136, comparators 137 and/or memory components 132 form part of the controller 130. They may be implemented digitally or use analogue components, or via any combination thereof as is well known in the art.

The above-described circuit configuration for generating fading illumination signal 195, may be replicated but with different component (resistor and/or capacitor) values, different trigger values, and/or different transistor configurations, to thereby alter the waveform of the fading illumination signal of the replicated circuit, as would be apparent to those skilled in the art. In this manner, the illumination circuit 121 may include two or more separate fading signal sub-circuits, configured to generate two or more fading illumination signal waveform types connected to illumination sources 111,112. The separate sub-circuits may be controllable and/or selectable via one or more controller outputs, similar to 134p, to thereby generate a fading, illumination waveform that is dependent on one or more inputs, such as inputs from 150-153, 110 and/or 138. The invention is not intended to exclude such a modification to illumination circuit 121.

In this internally-powered mode of operation, the controller 130 is also configured to adjust the brightness of the illumination sources 111, 112 based on ambient light signals indicative of ambient light conditions, and in particular ambient light brightness. In particular, the controller 130 is configured to reduce the maximum and/or average light intensity of the fading light output by illumination sources 111, 112, when the ambient light signals indicate an increased ambient light brightness, and to increase maximum and/or average light intensity of the fading light output by illumination sources 111, 112 when the ambient light signals indicate a decreased ambient light brightness. In the preferred form of this embodiment, the light intensity of the illumination sources 111, 112 is adjusted by adjusting the current flowing through the current divider 122, while maintaining a uniform fading waveform shape. As such, the maximum amplitude 196 of (or gain applied to) the illumination signal 195 is adjusted via current divider 122 to alter the maximum brightness perceived by a user observing the fading illumination signal 195. Brightness samples are done by the controller during the off period 199.

When the controller 130 determines that an external power source is connected and it switches back to the externally-powered mode of operation, outputs 134o and 134p are connected to ground which causes the capacitor 126b to discharge, turning off transistors 123a,b and 124a,b. In addition, the outputs 134a-134h operatively coupled to current divider 122 may be set to turn all current paths on, so that the maximum current may flow through the current divider for the PWM controlled illumination signal 190. Alternatively, the outputs 134a-134h may be set as per the desired maximum current flow depending on the application.

The ambient light signals received by the processing system during the externally-powered and internally-powered modes of operation are preferably acquired via one or more light sensing devices 150 of the illumination system 120. In some embodiments, one or more of the illumination devices 123a,b and 124a,b may be operable as a light sensing device in some states of operation. For example, a light emitting diode may be operable in reverse bias as a light sensing device. In such cases, one or more illumination devices 123a,b and 124a,b may be reverse biased by the processing system during periods of substantially zero illumination. This can be done by turning off transistors 123a,b and presenting a high impedance to LED intensity resistor array 134a-h, then controlling the signal polarity through the LEDs 111a,b by pulling output 134m or 134n low while pulling outputs 134k,l high to charge the capacitor present in the LED's diode. The ports 134k and 134l can then be configured as inputs and the time taken for the capacitor to discharge due to the photocurrent across the diode junction measured using a timer 135 and port change interrupt. The greater the light level, the larger the photo current is and the sooner the capacitor will discharge enough to trigger the port change interrupt. The lower the light level, the longer the time before the interrupt will occur. For simplicity, this has only been described for LEDs 111a,b but could similarly be done for LEDs 112a,b by controlling 134i,j instead of 134k,l.

Periods of substantially zero illumination may be the off-cycles of a PWM illumination signal 191B in the case of the first mode of operation, and the period 199 between the fade-down 198 and fade-up 197 components of the fading illumination signal in the case of second mode of operation. Alternatively, or in addition, the illumination system 120 may comprise one or more independent light sensing devices 150 for receiving light and outputting data or signals to the processing system indicative of ambient light conditions. Devices such as photodiodes, phototransistors, light dependent resistors and/or other known light sensors may be utilised in such cases.

One or more of the light sensing devices 150 may have adjustable light sensing sensitivity, so they can be operated depending on ambient light conditions to lower overall power usage and improve the range of light conditions that can be sensed. For example, in bright light conditions the sensitivity may be set to a minimum, whereas in low ambient light conditions, the device may require a relatively higher sensitivity setting to sense the difference in darkness levels, e.g. between dark and very dark. In some embodiments, one or more light sensing devices may comprise amplifier(s) with adjustable gain. The gain can be selected to control the sensitivity of the device. For example, a relatively high gain may be utilised in relatively low light conditions and a relatively low gain in relatively bright light conditions. The gain of each amplifier may be controlled by the processing system (or electronics inside the sensor itself) depending on the ambient light signals received from the one or more light sensing devices. For example, the gain of each amplifier may be increased when ambient light signal samples are taken that indicate relatively lower ambient light conditions and may be decreased when ambient light signal samples are taken that indicate relatively brighter ambient light conditions.

In the preferred embodiment, the illumination system 120 further comprises one or more optical noise cancellation modules or circuits 155 (shown in FIG. 2) configured to filter out noise components from the ambient light signals output by the one or more light sensing devices. This may be implemented digitally in the processing system 131 or as part of sensing device 150 as shown in the Figures or alternatively be implemented using analogue circuitry operatively coupled to the output of the light sensing device(s) 150.

In the preferred embodiment, the ambient light signals detected by the one or more light sensing devices 150 are indicative of at least an intensity of ambient light. In some embodiments, the ambient light signals may also be indicative of a frequency response of the ambient light and the illumination signal may be adjusted in accordance with the frequency response. For example, a brightness intensity of the illumination source(s) may be increased when certain light frequencies are dominant in the environment over others, such as blue light vs. yellow light. In some embodiments, the controller may be configured to adjust a frequency response of light emitted from an illumination source 111-113 based on the frequency of the ambient light. For example, the controller may be configured to adjust the frequency of light emitted from the illumination source 111-113 to complement the frequency of ambient light to improve visibility of emitted light in the ambient environment, such as emitting blue light in a red light environment.

The amplitude of the ambient light signals detected may vary in time at a particular frequency, such as the 100 Hz (2×50 Hz mains) signal present with some artificial lighting. The perceived brightness of some artificial light sources may differ from natural light. In the preferred embodiment, the processor 131 is configured to detect the type of ambient light source by performing a Fast Fourier Transform (FFT) (or other such method designed to convert signals in the time domain to the frequency domain) on the signals received by the light sensor 150. The result of the FFT would then be used to detect signals centred around mains or two times mains and adjust the gain used for the illumination source 111-113 to compensate for the perceived brightness of the artificial light source.

In the preferred embodiment the illumination system 120 comprises two or more light sensing devices to improve the accuracy of ambient light sensing. There may be one or more light sensing devices distributed on more than one side of the connector 100 to ensure an accurate reading regardless of the orientation/position of the connector. For example, one or more light sensing devices 150 may be located on one side of the connector 100 at housing 106 or 107 and one or more other light sensing devices 150 may located on an opposing side of the connector 100 at the same housing 106 or 107. In this manner, light may be sensed from all light sensing devices 150, and the ambient light signals that indicate a relatively higher brightness are utilised by the processing system to control the brightness of the illumination sources accordingly. Alternatively, an averaged ambient light brightness across two or more or all of the light sensing devices may be used to control the brightness of the illumination sources accordingly. In some embodiments, the light sensing device is configured to receive light from regions that are substantially non-overlapping with a region of light generated by the illumination sources 111, 112. Alternatively, or in addition the controller may be configured to control the illumination source based on ambient light signals indicative of ambient light brightness sensed during periods of deactivation (e.g. 199 in the case of signal 195 or 194 in the case of signal 190) of the illumination sources 111-113.

In some embodiments, the controller may be configured to independently control each illumination source 111-113 based on ambient light signals output from one or more associated light sensing device(s), such as a light sensing device that may be located on the same side and/or adjacent the illumination source 111-113. In this manner, for example, an illumination source on a side of the connector that is exposed may be operated to output a particular brightness based on the ambient light signals of the corresponding light sensing device, and an illumination source on an opposing side of the connector that may be concealed against a surface, for example, may be deactivated based on ambient light signals of the corresponding light sensing device indicative of a sufficiently dark or concealed surrounding environment.

The controller 130 and in particular the processor 131 of the controller 130 may be configured to operate in one of various modes of operation, with each mode having various functions available and associated power requirements. It is preferred that in the externally-powered mode of operation, the processor 131 is operating in a full functional or near full functional mode in which it has full access to electronic memory 132, for example. In the internally-powered mode of operation, the processor 131 may enter a low power to extend the operating lifetime of the on-board power source 140 without recharge. In the internally-powered mode, the processor 131 may have zero or very little access to internal memory 132. The processor 131 may be operatively coupled to one or more devices, such as timers and/or user activated input devices, which prompt the processor to enter a different mode for operating the illumination circuit 121 as described above. For example, timers or the output of a comparator may prompt the processor 131 to enter an operational mode in which sampling and comparing of illumination signal values, and switching of processor output states is possible, to continue generation of the fading signals.

Illumination System—Alternative Inputs

Figure 7:
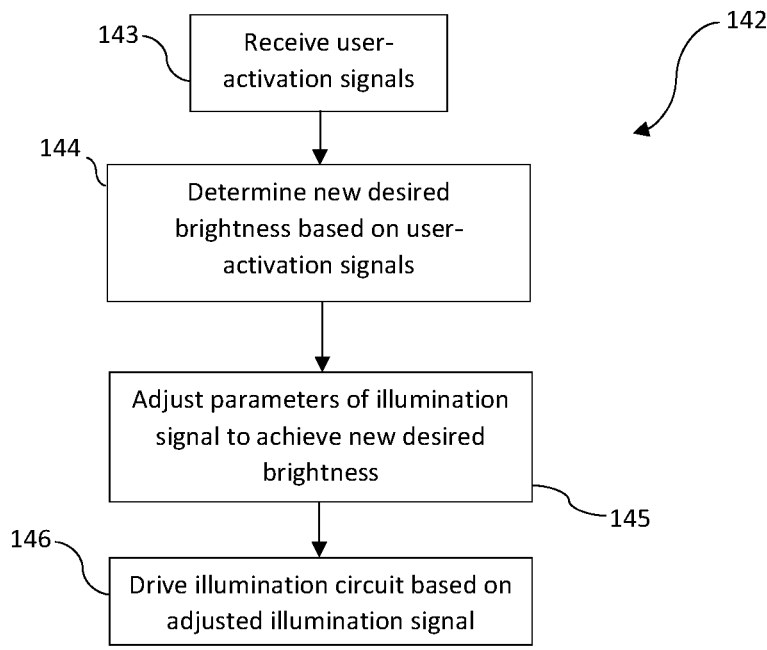
FIG. 7 is a flow diagram of a third method executable by the connector of FIG. 1.

Referring to FIGS. 2 and 7, in some embodiments, the illumination circuit 120 may further comprise one or more user input detectors 151 operatively coupled to the controller 130 for generating signals indicative of one or more user-activated inputs. The user-activated inputs may relate to the user's presence in the vicinity of the connector, for example. The user-activated inputs may include, for example: tactile inputs indicative of a user touching the connector, motion inputs indicative of a user moving the connector or moving in the vicinity of the connector, proximity inputs indicative of a user's proximity to the connector, audio inputs indicative of user-generated sound or sound generated by a user device in the vicinity of the connector, and/or visual inputs indicative of a user or a related device in the vicinity of the connector. In accordance with a further method 142 of the invention, the controller 130 is preferably configured to receive user-activated input signals (step 143), determine a new desired brightness (level or waveform) based on the user-activated input signals (step 144), adjust one or more parameters of the illumination signal to achieve the new desired brightness (step 145) and drive one or more of the illumination sources 113 accordingly (step 146).

In the preferred embodiment, the illumination system 120 comprises one or more touch sensors configured to generate signals indicative of a user touching the connector 100. The touch sensor may be a resistive sensor, capacitive sensor, piezoelectric sensor/element, infrared proximity sensor, a force or pressure sensor, or any other suitable sensor capable of identifying presence, duration and/or intensity of touch as is known in the art. The controller 130 is configured to operate the illumination sources 111-113 based on the output of the touch sensor. For example, the controller 130 may increase the brightness or intensity of one or more of the illumination sources 111-113 to a predetermined brightness or intensity when a signal is received from the touch sensor indicating that a user has touched the sensor and connector 100. The touch sensor output may be indicative of a duration of a user touching the sensor and the controller 130 may be configured to operate one or more of the illumination sources 111-113 in accordance with the duration. For example, the brightness of one or more illumination sources 111-113 may be adjusted substantially proportionally to the duration of touch. A relatively longer duration of touch may translate into a relatively higher brightness of the illumination sources 111-113 and a relatively shorter duration of touch may translate into a relatively lower brightness of the illumination sources 111-113. Alternatively, or in addition, the touch sensor output may be indicative of an intensity or pressure of touch and the controller 130 may be configured to operate one or more of the illumination sources 111-113 in accordance with the intensity or pressure. For example, the brightness of one or more illumination sources 111-113 may be adjusted substantially proportionally to the intensity or pressure of touch. A relatively higher intensity or pressure of touch may translate into a relatively higher brightness of the illumination sources 111-113 and a lower intensity or pressure of touch may translate into a relatively lower brightness of the illumination sources 111-113. The illumination signal generated and adjusted by the controller 130 in response to the touch sensor output may comprise the same waveform shape as previously described depending on the mode of operation (e.g. PWM signal for the first mode of operation and fading signal for the second mode of operation), or alternatively it may be a different signal of a predetermined waveform shape. In some embodiments, one or more illumination sources of the connector, other than illumination sources 111-113 may be operated by the controller 130 in response to the touch sensor output as described above.

In some embodiments, the illumination system 120 may further comprise one or more proximity sensors configured to generate signals indicative of a user's proximity to the connector 100. The proximity sensor may be an optical sensor, a motion sensor, or an audio sensor for example, or any other suitable sensor capable of identifying user's proximity within a predetermined distance as is known in the art. The controller 130 is configured to operate the illumination sources 111-113 based on the output of the proximity sensor. For example, the controller 130 may increase or otherwise adjust the brightness or intensity of one or more of the illumination sources 111-113 when a signal is received from the proximity sensor indicating that a user is within a predetermined distance of the sensor or connector 100. The proximity sensor output may be indicative of a relative distance between a user from the connector and the controller 130 may be configured to operate one or more of the illumination sources 111-113 in accordance with the relative distance. For example, the brightness of one or more illumination sources 111-113 may be adjusted substantially proportionally to the relative distance. A relatively shorter distance may translate into a relatively higher brightness of the illumination sources 111-113 and a relatively higher distance may translate into a relatively lower brightness of the illumination sources 111-113, or vice versa. The illumination signal generated and adjusted by the controller 130 in response to the proximity sensor output may comprise the same waveform shape as previously described depending on the mode of operation (e.g. PWM signal for the first mode of operation and fading signal for the second mode of operation), or alternatively it may be a different signal of a predetermined waveform shape. In some embodiments, one or more illumination sources of the connector, other than illumination sources 111-113 may be operated by the controller 130 in response to the proximity sensor output as described above.

Figure 9:
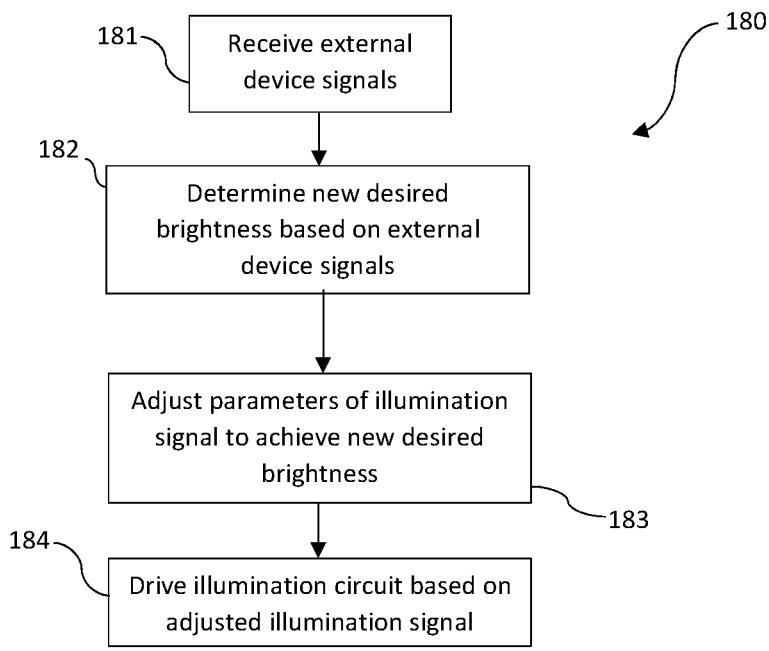
FIG. 9 is a flow diagram of a fifth method executable by the connector of FIG. 1.

In some embodiments, the illumination system 120 may comprise a communication module 133 for communicating with one or more external electronic devices 153 and receiving signals from the external electronic devices 153 indicative of one or more operational signals associated with the device 153. The controller 130 may be further configured to operate one or more illumination sources 111-113 in accordance with the received external device signals. Such devices may include the electronic device 200 to which the connector 100 is intended to connect and/or may include other related electronic devices. Examples of operational signals may include: audio signals from an audio device, game-play signals from a gaming console, battery charge level or other operating signals of the device, and the like. The communication module 133 may also receive updated parameters used by the controller 130 to define its behaviour. Such as the duration of the fading or increase in intensity when the user touches the connector housing 106. Referring to FIG. 9, in accordance with a further method 180 of the invention, the controller 130 is preferably configured to receive such external device signals (step 181), determine a new desired brightness (level or waveform) based on the external device signals (step 182), adjust one or more parameters of the illumination signal to achieve the new desired brightness (step 183) and drive one or more of the illumination sources 113 accordingly (step 184).

Figure 8:
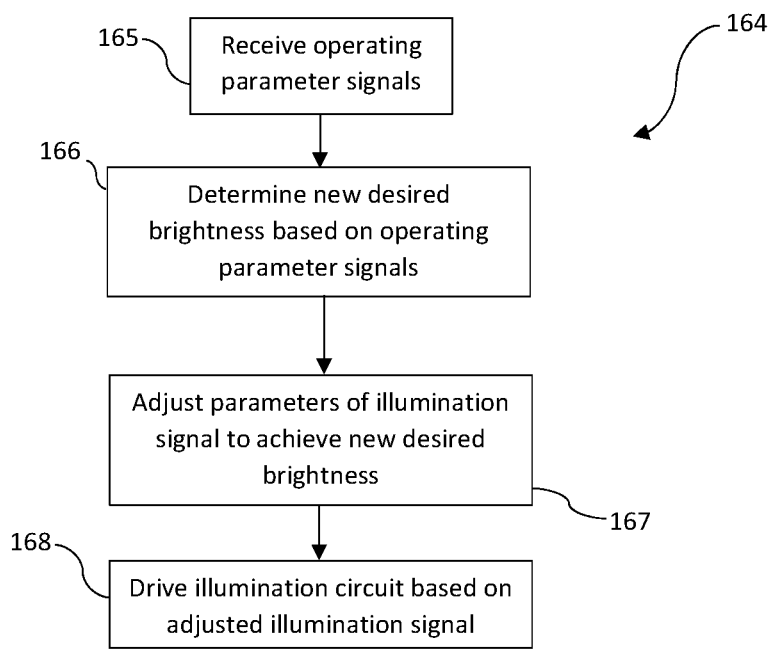
FIG. 8 is a flow diagram of a fourth method executable by the connector of FIG. 1.

In some embodiments, the illumination system 120 may comprise one or more sensors associated with the connector 100 configured to output signals indicative of one or more operating parameters of the connector 100, and the controller 130 may be configured to operate one or more illumination sources 111-113 in accordance with the operating parameter signals. Such sensors may include, for example, but without limitation: temperature sensors, current sensors, voltage sensors, audio sensors, motions sensors, optical sensors and the like. Referring to FIG. 8, in accordance with a further method 164 of the invention, the controller 130 is preferably configured to receive such operating parameter signals (step 165), determine a new desired brightness (level or waveform) based on the operating parameter signals (step 166), adjust one or more parameters of the illumination signal to achieve the new desired brightness (step 167) and drive one or more of the illumination sources 113 accordingly (step 168).

The communication module 133 may also be configured to send data from the connector to the electronic device 200 indicative of one or more parameters, such as operational states, or sensed measurements such as current flowing through the cable, and the like.

Figure 10:
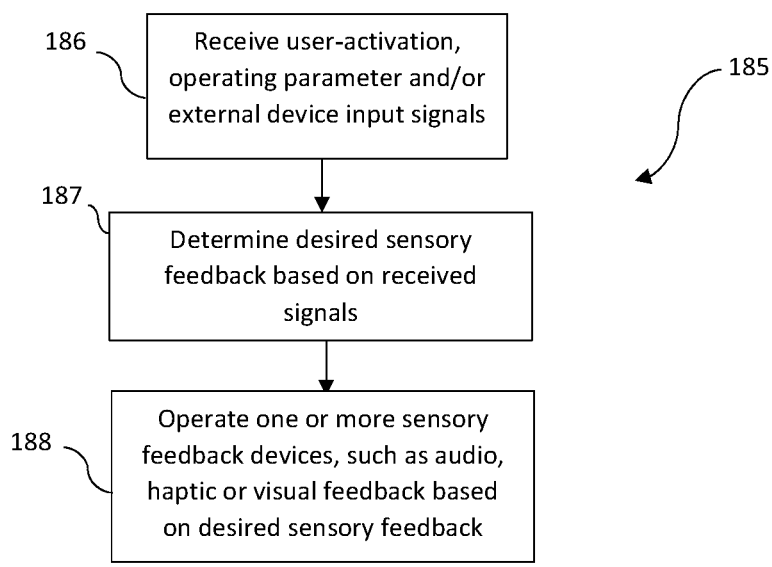
FIG. 10 is a flow diagram of a sixth method executable by the connector of FIG. 1.

In some embodiments, the connector 100 may further comprise one or more sensory outputs 160, such as a speaker 161, a tactile generator 162, a visual output 163 (such as other illumination source(s) or a display device) and/or other sensory output devices operatively coupled to the controller 130. The controller 130 may be configured to operate one or more of the sensory output devices 160 to provide feedback to a user in response to the one or more received user-activated inputs 151, external device inputs 153 and/or internal operating parameter inputs 152. Referring to FIG. 10, in accordance with a further method 185 of the invention, the controller 130 is preferably configured to receive such input signals from 151-153 (step 186), determine a desired sensory feedback based on the input signals (step 187), and operate the associated sensory outputs 161-163 accordingly (step 188).

In some embodiments the feedback generated may be dependent on a particular input parameter value. For example, a particular feedback type may be generated based on a predetermined sequence or pattern of touch events received via the touch sensor. A touch event may be classified in accordance with one or more touch-related parameters such as presence of touch, duration of touch, number of consecutive touches and/or intensity of touch. The controller 130 may be configured to determine a particular feedback to be generated via the one or more sensory output devices based on a particular input, using a predetermined look-up table stored in associated electronic memory. The sensory outputs 160 may be located at or proximal to the device connection end 101 or at the power source connection end 102, or any combination thereof.

In the above described embodiments, the controller 130 may be configured to determine the desired illumination signal for one or more illumination sources by acquiring from a look-up table stored in an associated electronic memory 132, data indicative of a desired illumination signal based on received input data, including for example, data indicative of: ambient light brightness, connection of the connector with the device connection element, connection of the connector with an external power source, ambient light brightness above a predetermined threshold, ambient light brightness below a predetermined threshold, user-activated input, external device activated inputs, internal operating parameter inputs and the like, as herein described. The electronic memory component 132 may comprise at least one computer readable medium. The electronic memory component is preferably on-board the connector but may alternatively be remote and accessible via a communication system 133 of the connector 100. The look up table is preferably predetermined and pre-stored in the electronic memory. Alternatively, or in addition, the controller 130 may be configured to determine the desired illumination signal by applying a predetermined algorithm or algorithms on the received input data.

Figure 11:
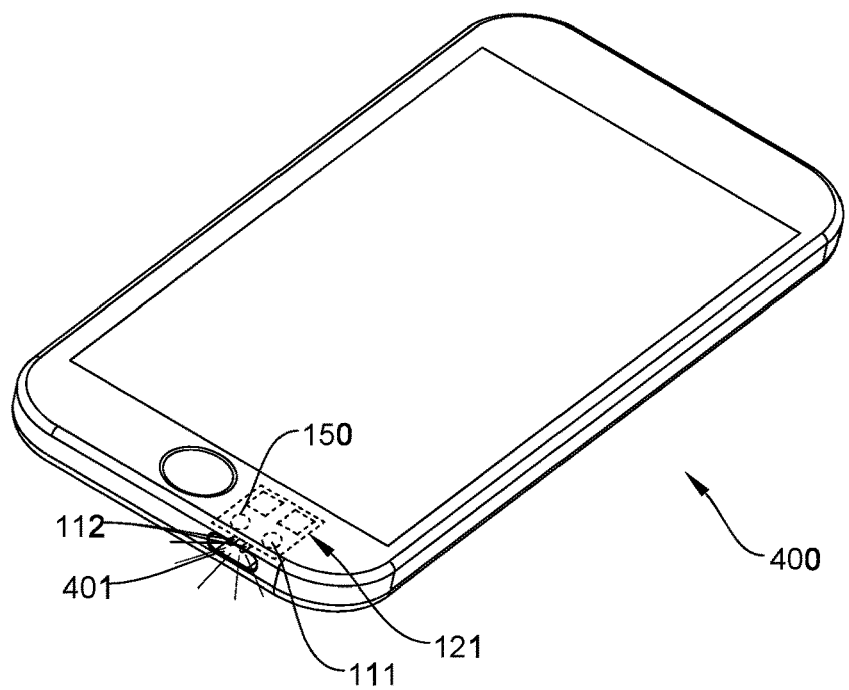
FIG. 11 shows an alternative embodiment of an electronic device incorporating an illumination system of the invention.

In some embodiments of the invention, the illumination system 120 may be implemented in an electronic device to help with the location of the device and/or with the connection of the device with one or more other devices or connectors. An example of this is shown in FIG. 11 in relation to a mobile phone device 400, whereby the illumination sources 111, 112 of the system are located at or adjacent the connection port 401 to illuminate the port 401 accordingly. It will be appreciated that the device 400 may be any other electronic device as herein described and the invention is not intended to be limited to this particular example. Features of the illumination system 120, such as component types and values, circuit configurations, functional modules and the like, may be altered to maintain the operation of the system 120 as herein described, but improve its suitability for the particular device as would be readily apparent to those skilled in the art.

Operating Modes of Connector Based on Supply Chain Phases

In some embodiments, the illumination system 120 may be operative in one or more predefined modes of operation, each corresponding with a phase of a supply chain within which the connector 100 is moving. For example, a typical supply chain associated with the connector 100 may consist of the following phases:

A manufacturing phase in which the connector 100 is manufactured, assembled and then tested for operation before dispatch;

A pre-shipping phase in which the connector 100 has been tested and is ready to be packaged for shipping;

A shipping phase in which the connector 100 is packaged and shipped to a distributer, retailer or consumer; and A retail or consumer phase in which the connector arrives at a retailer or consumer facility and is ready for use.

At the retail or consumer end of the supply chain the illumination system 120 may be operable according to a standard mode of operation, which may comprise the full functionality of any of the embodiments described in the foregoing description. In the standard mode of operation, the illumination system 120 may operate in the externally-powered mode of operation when the connector 100 is connected to an external power source, or in the internally-powered mode of operation when the connector is not connected to an external power source (e.g. in accordance with method 175 of FIG. 4). These may be considered sub-modes of the standard mode of operation. In the standard mode of operation, the illumination sources 111-113 are all capable of being activated based on the various inputs described, including the light sensor inputs 150 (e.g. in accordance with method 170 of FIG. 3), user activation detectors 155 (e.g. in accordance with method 142 of FIG. 4), operating parameter sensors 152 (e.g. in accordance with method 164 of FIG. 8) and/or external device inputs 138 (e.g. in accordance with method 180 of FIG. 9).

Figure 12:
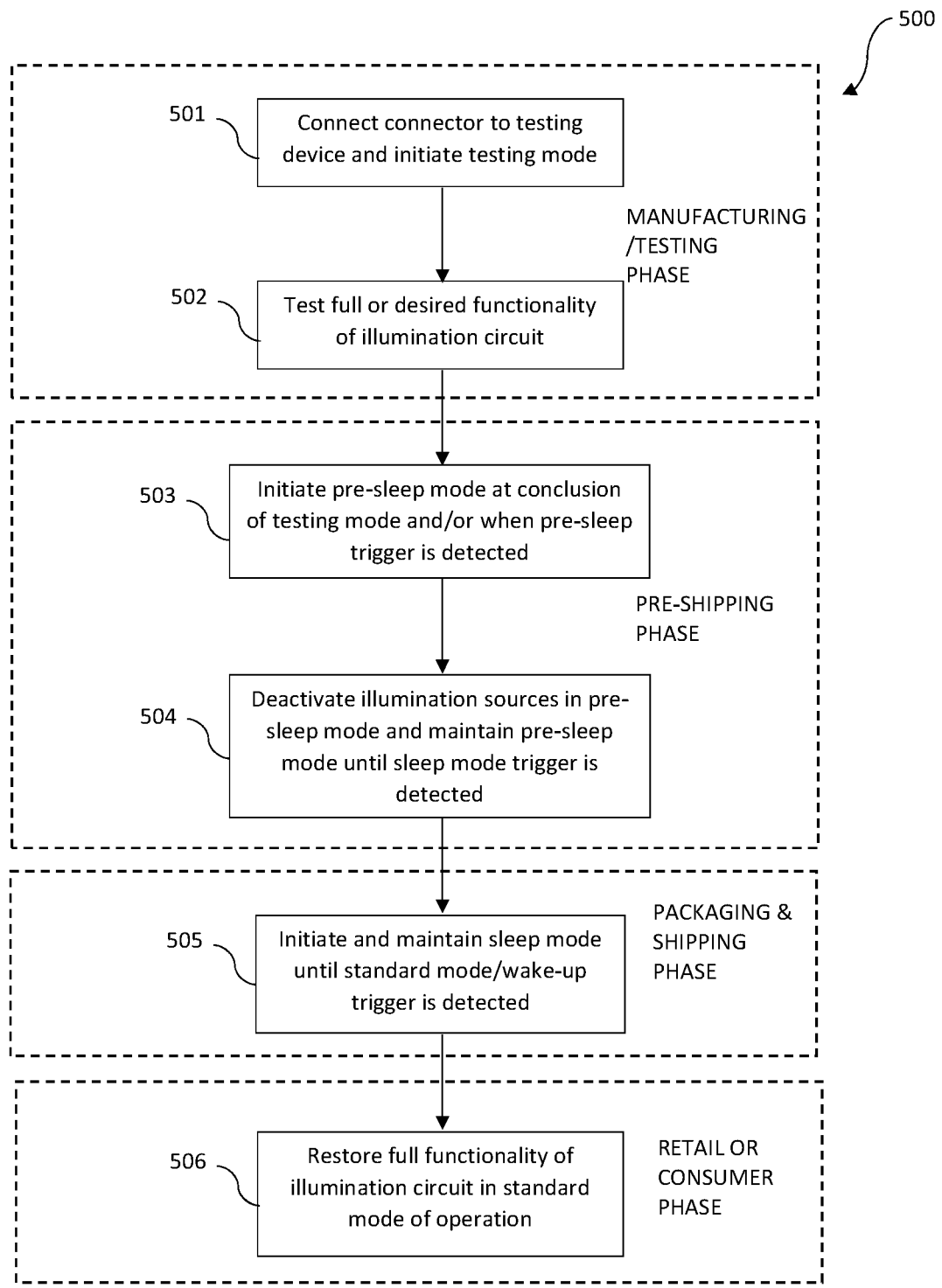
FIG. 12 is a flow diagram of a seventh method executable by the connector of FIG. 1.

Referring to FIG. 12, in a preferred embodiment of the invention the illumination system 120 is further configured to operate in accordance with a method 500 to transition between the following modes of operation based on a current supply chain phase relating to the connector 100: a testing mode which may occur during or after a manufacturing phase; a pre-sleep mode which may occur after manufacturing and before a shipping phase; and a sleep mode which may occur during a shipping phase of the connector 100. The controller 130 is configured to monitor and maintain a record of the current mode of operation (e.g. testing mode, pre-sleep mode, sleep mode and/or standard mode) by writing and reading data indicative of the current mode to and from on-board, non-volatile electronic memory, such as flash memory, electrically erasable programmable read-only-memory (EEPROM) or a similar non-volatile or extremely low-power memory. This is done so the controller is aware of the most recent mode when reset or otherwise woken up from a state where it has no RAM retention such as a shutdown mode.

The various modes of operation and their relationship to the corresponding supply chain phase are described in further detail below with reference to FIG. 12.

Testing Mode—Manufacturing/Testing Phase

The illumination system 120 may be configured to operate in a testing mode, during or after a manufacturing phase to test the functionality of the connector 100 in the standard mode of operation (step 502) and ensure all functions are operating as expected (e.g. in accordance with methods 170, 175, 142, 164, 180 and/or 190). One or more testing methods may be performed during this state by connecting the connector 100 to a testing device, such as a computing device capable of accessing and executing a testing application (step 501). Connection may be via the device connection element 101, for example. During at least some testing methods, the connector 100 may require a connection to an external power source via the power source connection element 102.

Pre-Sleep Mode—Pre-Shipping Phase

In the preferred embodiment, the controller 130 may be further configured to trigger the illumination system 120 into a pre-sleep mode when one or more trigger conditions indicative of a pre-shipping phase are met (step 503). Such conditions may include the completion of one or more testing methods in the testing mode, for instance. Alternatively, or in addition it may include disconnection of the connector 100 from an external power source. The trigger conditions may include the controller 130 receiving one or more trigger signals indicative of the connector 100 reaching the pre-shipping phase.

In some embodiments, at step 503 the controller 130 may be operable to detect a pre-sleep trigger signal using one or more inputs available on-board the connector 100, such as via light sensing device inputs 150, data signal inputs 133 or touch sensing inputs 151. The pre-sleep trigger signal may be preconfigured and recognisable by the controller 130. Upon detection, the controller 130 may trigger the illumination system 120 into the pre-sleep mode.

In the preferred embodiment, at step 503 the controller 130 is programmed to recognise a preconfigured optical, pre-sleep trigger signal receivable by the light sensing device(s) 150 of the connector 100. The predetermined optical signal may comprise a combination of one or more of a predetermined brightness threshold, frequency threshold, frequency response, and/or flicker pattern, for example. In one example, the illumination system 120 may be triggered to transition into the pre-sleep mode (e.g. prior to packaging for a shipping phase) when an optical signal comprising a predetermined flicker sequence is detected via one or more light sensing devices 150. Such a signal may be received from one or more external optical devices operated by an operator or automated system handling the connector within the supply chain.

In alternative embodiments, the controller 130 may be preconfigured to recognise a predetermined pre-sleep, data trigger signal receivable from an external device via the communications interface 133 of the connector 100. In yet another alternative, a predetermined pre-sleep, touch-based trigger signal may be generated via the touch sensor input 151 of the connector 100. Other trigger conditions and methods are possible and envisaged as would be readily apparent to the skilled person. One or more pre-conditions may be required for the controller 130 to transition into the pre-sleep mode, such as the connector 100 being disconnected from an external power source or another device and/or the completion of a particular testing method.

In the pre-sleep mode, the illumination system 120 may operate using the on-board power source 140. During the sleep-mode one or more peripheral devices of the illumination system 120 may be continuously deactivated or otherwise operated in a low-power mode for approximately an entire period of the pre-sleep mode to conserve power usage (step 504). Such devices may include all devices other than the controller 130 and the devices associated with the sleep-mode trigger, described in further detail below. For example, in the pre-sleep mode, the illumination circuit 121 may be deactivated, or configured to fade on/off less frequently. The controller 130 and one or more sensing devices associated with the sleep-mode trigger (e.g. light sensing devices 150) may be activated intermittently for one or more sufficient periods during the pre-sleep mode, to monitor the sleep-mode trigger parameters and to determine if the sleep-mode trigger condition is being observed (step 504). Activation of the controller 130 and sensing devices during the pre-sleep mode may be periodic. Between periods of activation, the controller 130 and sensing devices are preferably substantially continuously deactivated and/or activated in a very low power mode to conserve energy.

The controller 130 may be configured to trigger the illumination system into the sleep-state upon recognising that the connector 100 has transitioned into the shipping phase (e.g. by recognising that the connector 100 has been packaged in enclosed packaging and is ready for shipping). The controller 130 may detect the start of this phase by monitoring for one or more sleep-mode triggers (step 504). This may consist of monitoring and comparing one or more trigger parameters or inputs relative to predetermined criteria stored in memory. This may include any combination of one or more device inputs such as packaging detector, light sensing, touch, or data inputs. Alternatively, or in addition it may include one or more internal parameter triggers, such as timer-related parameters. For example, the controller 100 may be configured to detect the start of a shipping phase when one or more of the following conditions are met:

A. An ambient light brightness level (detected via the one or more light sensing devices 150) is at or below a predetermined darkness threshold that is indicative of a dark surrounding environment (e.g. when the connector is packaged);

B. A predetermined time period has elapsed after the illumination system 120 is triggered in the pre-sleep mode; (e.g. it has been some predetermined length of time since the testing mode has ended); and/or C. An ambient light brightness level at or below a predetermined darkness threshold is detected for a predetermined period of time (e.g. when the connector has been in packaging for some predetermined length of time).

In one exemplary embodiment, the controller 130 may be configured to transition into the sleep mode when condition A is met. In another exemplary embodiment, the controller 130 may be configured to transition into the sleep mode when condition B is met. In yet another exemplary embodiment, the controller 130 may be configured to transition into the sleep mode when condition B is first met, and then condition A, or condition C is subsequently met. Other variations for operating the controller 130 to detect a shipping phase are possible, as would be readily apparent to the skilled person.

The light sensing device 150 is preferably capable of identifying when at least a part of the shipping packaging associated with connector 100 is located in close proximity to the device 150 or connector 100, to indicate that the connector 100 has been fully concealed or enclosed by the packaging. In such an embodiment, the connector 100 and associated packaging are designed such that at least part of the packaging (preferably the part that completes the packaging process) covers the light sensing device in the packaged state.

Figure 17A:
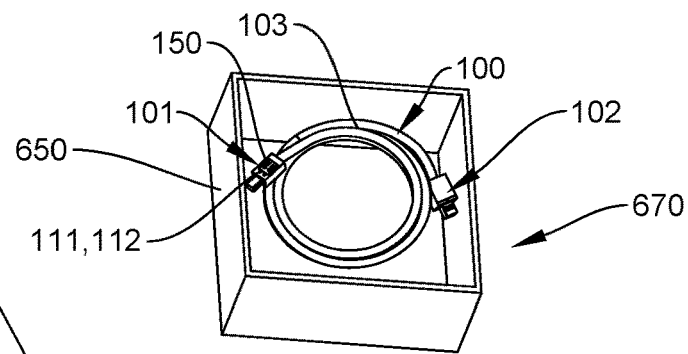
FIG. 17A shows the connector of FIG. 1 in a packaged state.
Figure 17B:
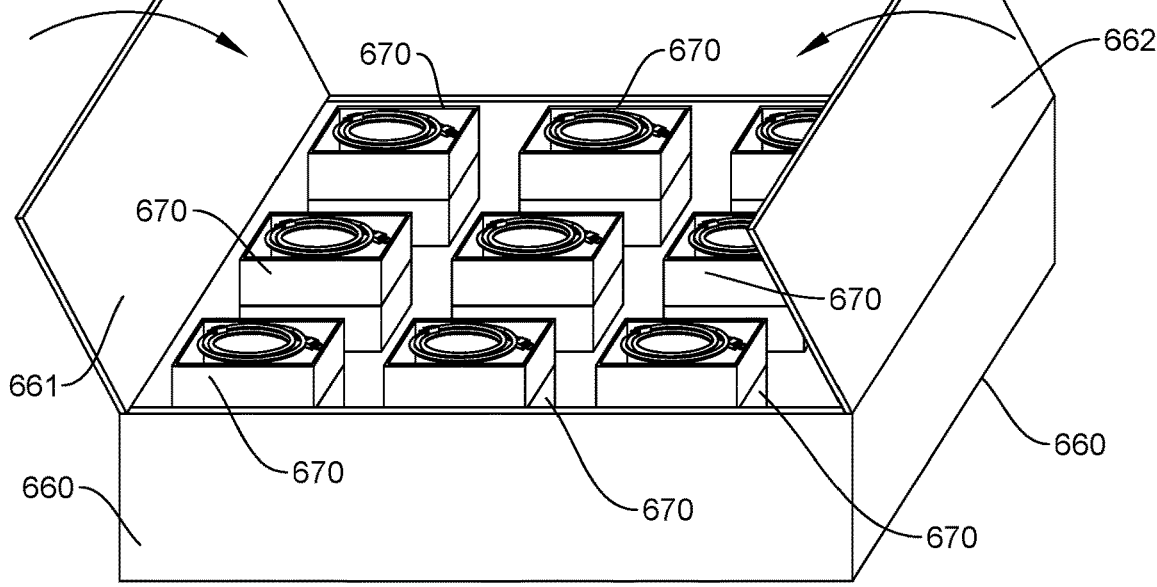
FIG. 17B shows multiple connectors packaged for shipping.
Figure 17C:
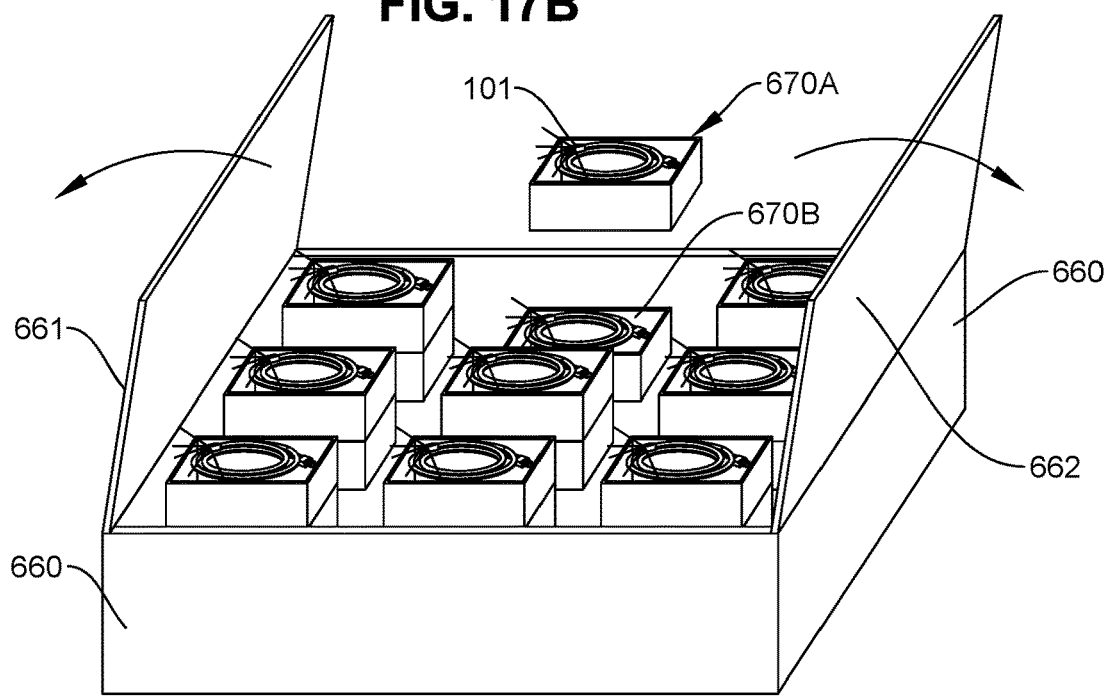
FIG. 17C shows the multiple connectors of FIG. 17B unpackaged after shipping.

Referring to FIGS. 17A-17C, an example of a packaging system for connector 100 is shown. In this example, each connector 100 may be individually packaging in packaging box 650. The box 650 may comprise an open side or a transparent cover adjacent to the illumination source of device connection end 101, such that the illumination source is normally exposed. As shown in FIG. 17B, multiple packaged connectors 670 may be placed in a packaging box 660 for shipping. The packaged connector 670 may be stacked within the box 660. Before shipping, the flaps or covers 661 and 662 are closed and the box is sealed shut. Sometime before or after packaging the connectors 100 enter the sleep mode by recognising one or more of the sleep mode trigger conditions as described above. The trigger conditions may be associated with a user closing the packaging box 660, for example. Alternatively, or addition, they may be related to a connector being concealed by another connector and/or its individual packaging 650 during the packaging process. As shown in FIG. 17C, at the end of the shipping phase, when the box 660 is opened by lifting the flaps 661, 662, the top connectors (e.g. 670A) become exposed to light, causing them to transition into the awake mode and automatically activate the illumination source(s) at device connection end 101. In some embodiments a single connector may be placed in box 660 and/or the package 650 may be similar to box 660 with flaps/covers.

Other packaging detectors may alternatively be used in this embodiment as described in relation to electronic device 610 of FIGS. 13 to 16.

To allow the controller to spend the majority of the time completely shut down with no RAM retention, in the pre-sleep mode, the controller 130 may monitor timer-related parameters by writing and reading to an on-board non-volatile memory, such as flash memory or EEPROM. For instance, a counter may be updated and monitored using the non-volatile memory every time a signal is sampled from the light sensing device input, indicating a brightness level that is at or below a predetermined darkness threshold. The counter may be reset when the sampled signal indicates a brightness level that is above the predetermined darkness threshold, or when it reaches a predetermined count number. An elapsed period can be estimated using the counter value and the sampling rate of the light sensing device input.

Sleep Mode—Shipping Phase

To maximise first time usage, it is preferable that the on-board power source 140 is as close as possible to its initial state of charge when the connector 100 reaches the retail or consumer supply phase. This means the illumination system 120 will be immediately operative in at least the internally-powered mode of operation without requiring a connection with an external power source. To allow for this, in a preferred embodiment of the invention, the illumination system 120 is programmable to operate in a sleep/power-conserving mode during a phase of the supply chain preceding the retail or consumer phase, such as during a shipping phase of the chain. This phase may consist of shipping the connector 100 from one location (e.g. manufacturer, distributer or retailer) to another (e.g. retailer or consumer). During this period, the connector 100 is practically unusable for a prolonged period and therefore may be placed in sleep mode to conserve energy.

In sleep mode, the majority of the system's functionality, including illumination sources 111-113, may be continuously deactivated until a trigger condition is detected by the illumination system 120 indicating that the connector 100 has entered the post-shipping phase (e.g. retail or consumer phase)—step 505. In this mode, the controller 130 and devices relating to the wake-up trigger condition (i.e. the standard mode/post-shipping trigger condition) are activated intermittently. The controller 130 and relevant sensing devices may be activated for one or more periods that are each sufficient to monitor the wake-up trigger parameters and to determine if the associated trigger condition is being observed (step 505). Activation of the controller 130 and relevant sensing devices during the sleep mode may be periodic. Between periods of activation, the controller 130 and sensing devices are preferably continuously deactivated and/or activated to conserve energy.

The wake-up trigger condition may be detected by the controller 130 using one or more inputs available on-board the connector 100, such as via light sensing device inputs 150, data signal inputs 133 or touch sensing inputs 151. The wake-up trigger condition is preferably preconfigured and recognisable by the controller 130. Upon detection, the controller 130 may trigger the illumination system 120 out of the sleep mode and into the standard mode of operation (step 506).

In the preferred embodiment, the controller 130 is programmed to recognise a preconfigured optical trigger signal receivable by the light sensing device(s) 150 of the connector 100. The predetermined optical signal may comprise a combination of one or more of a predetermined brightness threshold, frequency threshold, frequency response, and/or flicker pattern, for example. In one example, the illumination system 120 may be triggered to transition from the sleep mode into the standard mode of operation (e.g. after a shipping phase) when an optical signal is detected via one or more light sensing devices 150 that indicates an ambient light brightness level that is above a predetermined threshold. Detection of this signal, for example, may occur when the connector 100 is removed from an enclosed shipping box or container and into a light environment, indicating the end of a shipping phase. One or more of the light sensing devices 150 may be operated in a high gain/low power mode during the sleep-mode to recognise the trigger for the standard-mode of operation. Alternatively, or in addition the standard mode trigger may include one or more internal parameter triggers, such as timer-related parameters. For example, the controller 100 may be configured to detect the end of a shipping phase when one or more of the following conditions are met:

A. An ambient light brightness level (detected via the one or more light sensing devices 150) is at or above a predetermined brightness threshold that is indicative of a light surrounding environment (e.g. when certain packaging surrounding at least a part of the connector is removed);

B. A predetermined time period has elapsed after the illumination system 120 is triggered in the sleep mode; (e.g. it has been some predetermined length of time since shipping in which the connector is expected to be with the distributer, consumer or retailer); and/or C. An ambient light brightness level at or above a predetermined brightness threshold is detected for a predetermined period of time (e.g. when the packaging has been removed for some predetermined length of time).

Referring to FIG. 17C, the light sensing device 150 is preferably capable of identifying when at least a part of the shipping packaging (e.g. 661 or 662) associated with connector 100 (or some other concealing element, such as another connector stacked on top within the packaging, e.g. packaged connector 670A on top of packaged connector 670B) is removed to expose the illumination source(s) of the connector 100 to a user. In such an embodiment, the connector 100 and associated packaging are designed such that at least part of the packaging (preferably the part that completes the packaging process) uncovers the light sensing device when the part is removed from the packaging.

In alternative embodiments, the controller 130 may be preconfigured to recognise a predetermined data trigger signal, receivable from an external device via the communications interface 133 of the connector 100. In yet another alternative, a predetermined touch-based trigger signal may be generated via the touch sensor input 151 of the connector 100. Other trigger conditions and methods are possible and envisaged as would be readily apparent to the skilled person.

Other un-packaging detection techniques may alternatively be used in this embodiment as described in relation to electronic device 610 of FIGS. 13 to 16.

As mentioned, in the standard mode of operation full functionality of the illumination system 120 is restored as the connector 100 arrives at a retailer or consumer facility.

Electronic Device and System Operable Based on Supply Chain Phases

Referring to FIGS. 13-16, further embodiments of the invention comprise an electronic device 610 and system 600 that are configured to operate in accordance with a method 630 depending on a phase of a supply chain within which the device 610 or system 600 is moving. In this context, phases of a supply chain may include:

A manufacturing phase in which the device is manufactured, assembled and then tested for operation before dispatch;

A pre-shipping phase in which the device has been tested and is ready to be packaged for shipping;

A shipping phase in which the device is packaged and shipped to a distributer, retailer or consumer; and A retail or consumer phase in which the device arrives at a retailer or consumer facility and is ready for use.

In such embodiments, the device 610 is configured to detect a current phase of the supply chain and accordingly alter an operational mode of the device 610.

Figure 13:
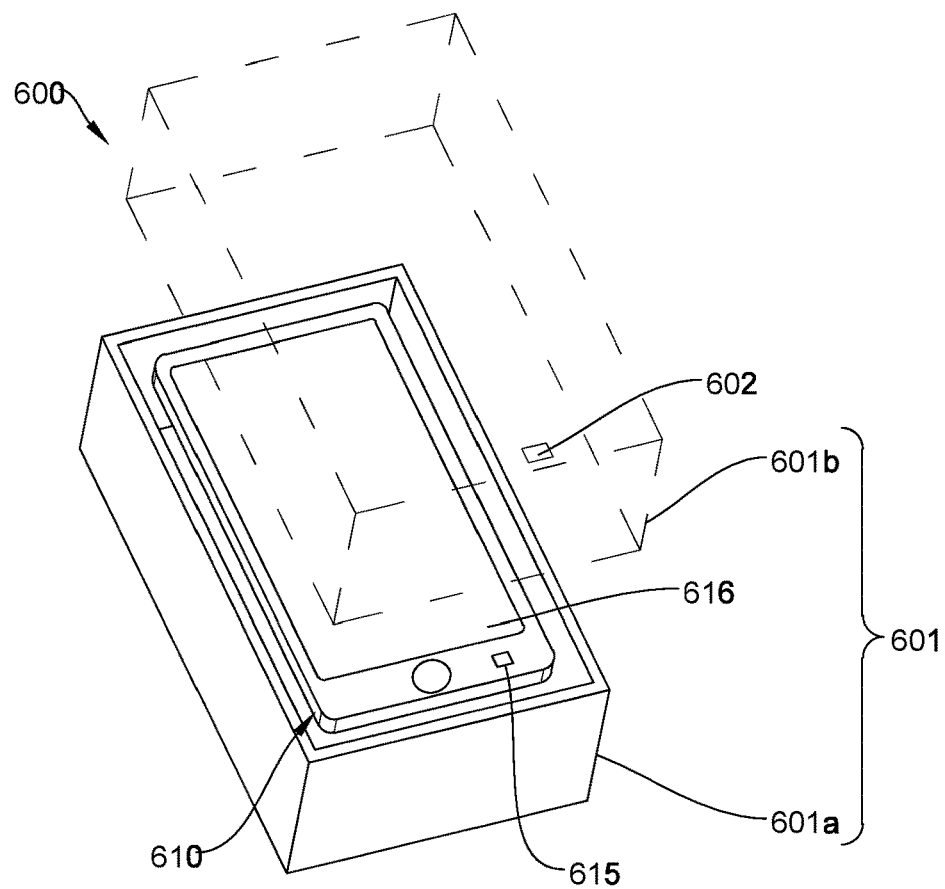
FIG. 13 shows an electronic device and packaging system of the invention.

Referring to FIG. 13, the system 600 comprises the electronic device 610 and packaging 601 configured to house the device 610. As will be explained in further detail, the device 610 is configured to operate depending on a shipping or packaging status of the device 610, which may also indicate a current phase in a supply chain. For example, when the device is fully packaged (i.e. fully housed within packaging 601), this may indicate a shipping phase of the supply chain, and subsequently when the device is unpackaged (i.e. one or more package parts 601a, 601b are removed to reveal the device 610), this may indicate a retail or consumer phase of the supply chain.

Figure 15:
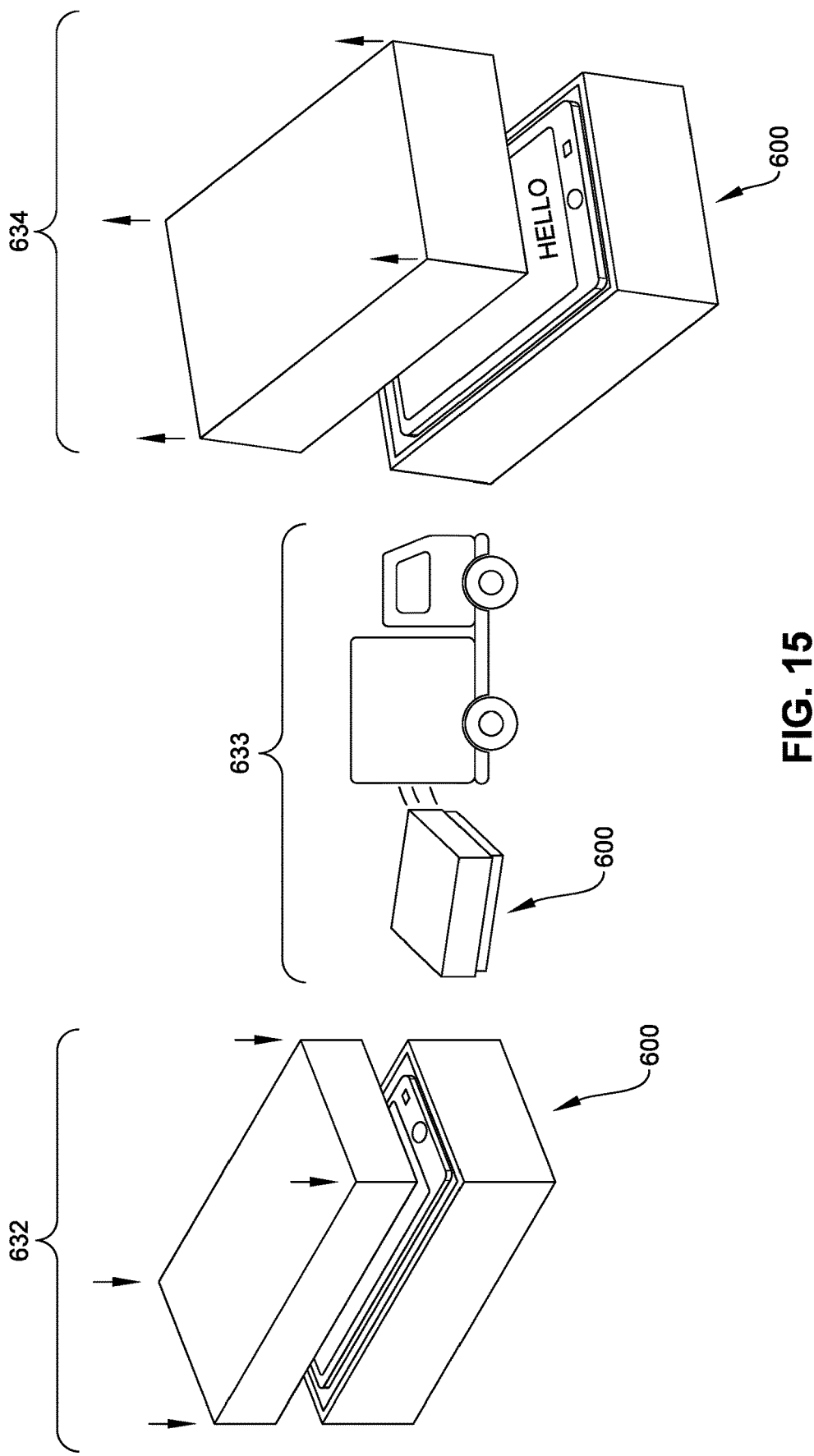
FIG. 15 shows the electronic device and packaging system of FIG. 13 within various phases of a supply chain.

In the embodiments shown in FIGS. 13 and 15, the electronic device 610 of system 600 is a mobile phone. The mobile phone comprises a display 616 and an on-board power source (not shown) configured to operate the display 616. In alternative variations of this embodiment, the electronic device 610 may be any device that comprises an on-board power source, such as a rechargeable energy storage device, and one or more electronic visual interfaces operable via the on-board power source. The visual interface may be a display, such as a CRT, LED, ELD, E Ink, Plasma, LCD, OLED, DLP, or any other visible electronic indicia, such as one or more illumination means (e.g. illumination sources 111-113 of connector 100). Examples of such electronic devices include entertainment devices (video game consoles, e-readers, etc.), communication devices (mobile phones, tablet computers, etc.) and/or electronic accessories (e.g. connector 100).

Figure 14:
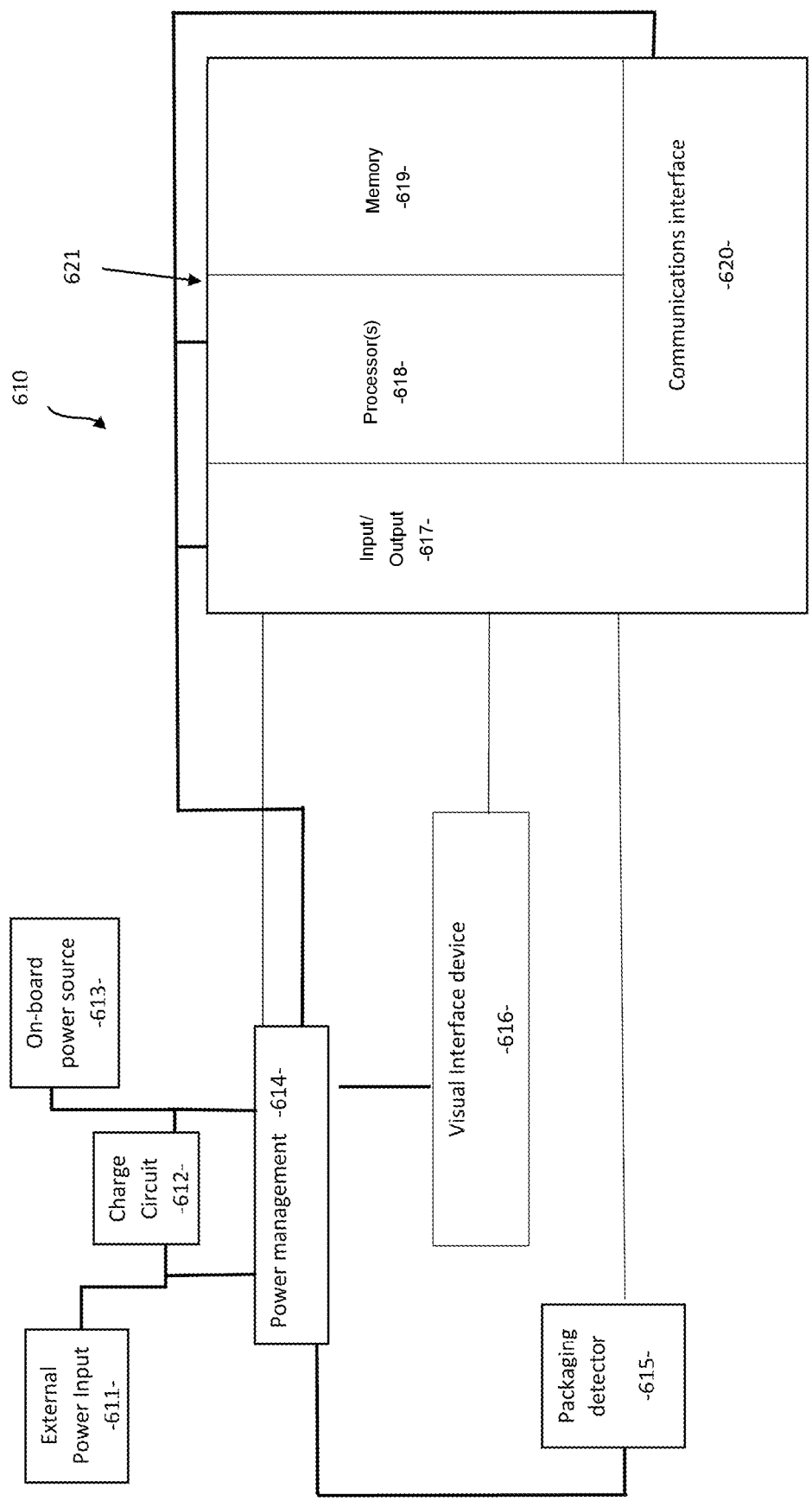
FIG. 14 shows a block diagram of the electronic device of FIG. 13.

Referring to FIG. 14 the electronic device 610 preferably comprises a controller 621 having one or more processors 618 and associated electronic memory 619 for activating the visual interface 616 based on a packaging status and/or mode operation of the electronic device 610. The visual interface 616 and the controller 621 are operative using an on-board power source 613. The power source may be rechargeable via an external power input 611 and a charge circuit 612 of the device.

The electronic device 610 may also comprise any one or more other electronic devices or circuits such as: communication interfaces 620, detectors or sensors 615, sensory output devices (e.g. 616), power management circuits 614, processing units (e.g. 618) and the like. One or more of these additional electronic devices or circuits may also be operable using the on-board power source 613 in one or more modes of operation.

The packaging 601 of system 600 may comprise one or more parts configured to collectively house and enclose the device 610. In the embodiment shown in FIGS. 13 and 15, the packaging comprises a base part 601a within which the device 610 is seated, and a cover part 601b configured to locate over the base and enclose the device 610. It will be appreciated, that alternative variations of packaging 601 configured to enclose device 610 may also be used as is readily apparent in the art of consumer electronics and the invention is not intended to exclude such variations. There may be multiple electronic devices (all the same or different) within single packaging 601. There may be individual packaging parts for each electronic device within the single packaging 601.

The device 610 comprises at least one packaging detector 615 configurable to detect when the device 610 has been suitably packaged within packaging 601. For example, it may detect when packaging part 601b is placed over base part 601a, and/or it may detect when an electronic device has been sufficiently concealed within packaging 601 (e.g. by the placement of a packaging part or of another device over the electronic device). Preferably the detector 615 detects when the device has been fully packaged within packaging 601. As will be explained in further detail, the packaging detector 615 may be a light sensing device, or alternatively a position based sensor such as a hall-effect sensor cooperative with a magnetic element on packaging part 601*b* (or vice versa). The packaging detector 615 may be used by the device for additional functionality such as adjusting the brightness of the display in the case of a light sensor. For example, in the embodiment of connector 100, the packaging detector 615 may be any one or more of the light sensing devices 150.

As mentioned, the electronic device 610 is operable based on a phase of the device within a supply chain, and in a preferred implementation based on a packaging status of the device 610. In particular, the electronic device 610 is configured to automatically operate the visual interface 616 when it detects it has been unpackaged and the display 616 is exposed to the end user. The electronic device 610 is further configured to automatically trigger into a sleep mode to conserve power of the on-board power source when it has detected it has been suitably packaged for shipping. The electronic device 610 may be further configured to operate in a pre-sleep mode immediately prior to the sleep mode as will be described in further detail below. Other modes of operation, such as a testing mode as described for connector 100, are also envisaged and not intended to be excluded from this embodiment.

The controller 621 may be configured to monitor and maintain a record of the current mode of operation (e.g. pre-sleep mode, sleep mode and/or standard mode) by writing and reading data indicative of the current mode to and from on-board, non-volatile electronic memory, such as flash memory, electrically erasable programmable read-only-memory (EEPROM) or a similar non-volatile or extremely low-power memory. This is done so the controller 621 is aware of the most recent mode when reset or otherwise woken up from a state where it has no RAM retention such as a shutdown mode.

Some modes of operation and their relationship to the corresponding supply chain phase/packaging status are described in further detail below with additional reference to FIGS. 15 and 16.

Pre-Sleep Mode—Pre-Shipping Phase

Figure 16:
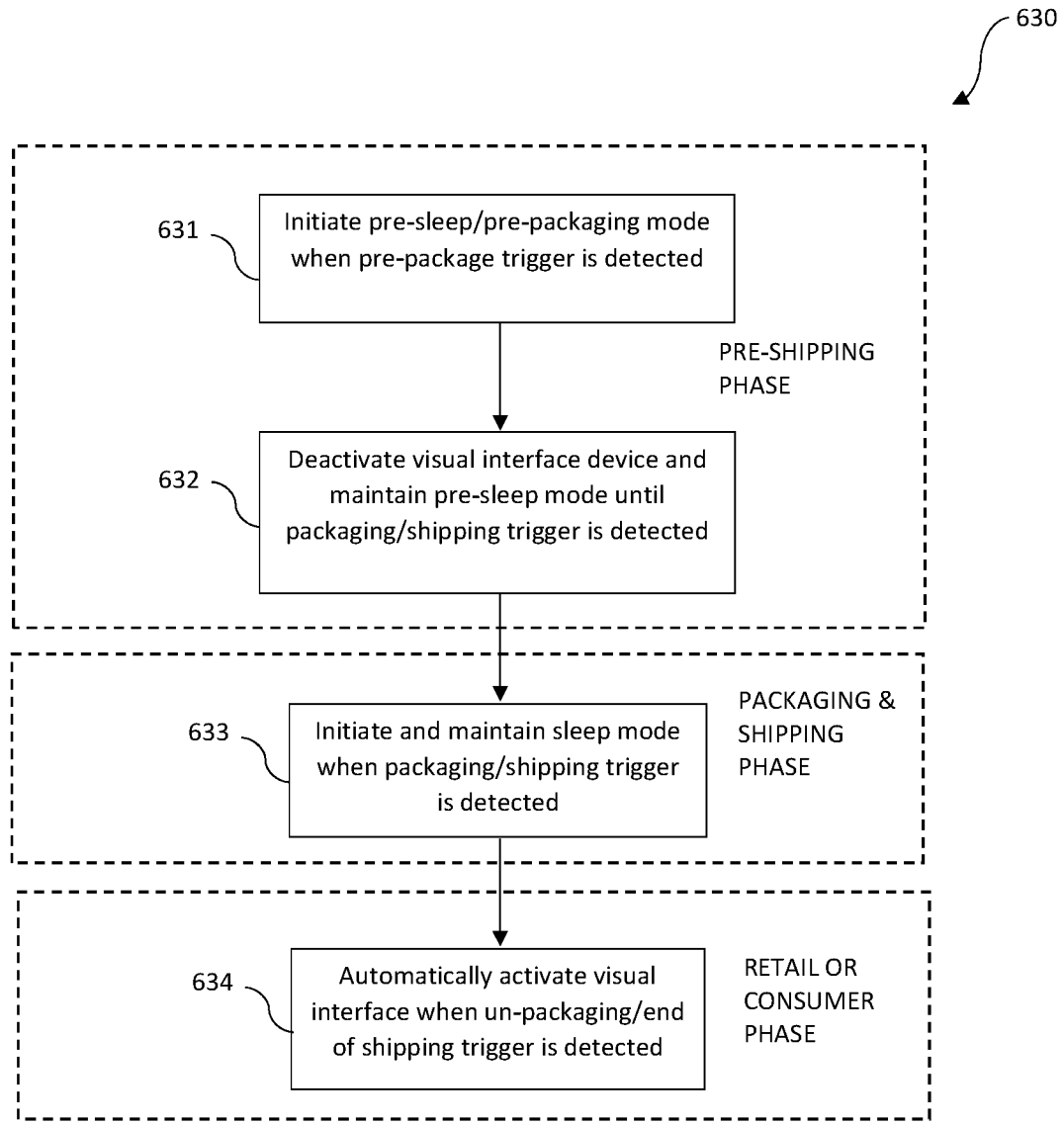
FIG. 16 shows a flow diagram of a method executable by the electronic device of FIG. 13.

Referring to FIGS. 15 and 16, in a preferred embodiment, the electronic device 610 is configured to operate in a pre-sleep mode when one or more pre-sleep trigger conditions indicative of a pre-shipping/pre-packaging phase are met. Such conditions may include the completion of one or more testing methods in a testing mode, for instance. Alternatively, or in addition it may include disconnection of the device from an external power source. The trigger conditions may include the controller 621 of the device 610 receiving one or more trigger signals indicative of the device reaching the pre-shipping phase.

As described for connector 100, the controller 621 of device 610 may be operable to detect a pre-sleep trigger condition using one or more inputs available on-board the device 610, such as via light sensing device inputs, data signal inputs or touch sensing inputs. Methods of operating the connector 100 during the pre-sleep mode are also applicable to the device 610 of this embodiment. For example, in the pre-sleep mode, the electronic device 610 may operate using the on-board power source and one or more peripheral devices of the illumination system, such as the visual interface 616 may be continuously deactivated or otherwise operated in a low-power mode for substantially an entire period of the pre-sleep mode to conserve power usage (step 632). The controller 621 and one or more sensing devices associated with the sleep-mode trigger (e.g. light sensing devices) may be activated intermittently for one or more sufficient periods during the pre-sleep mode, to monitor the sleep-mode trigger parameters and to determine if the sleep-mode trigger condition is being observed.

In the pre-sleep mode, the controller 621 is configured to monitor for a trigger condition indicative of the device 610 being packaged and/or being ready for shipment (step 632). This, in turn will cause the controller to trigger the device 610 into a sleep mode.

The sleep trigger condition may be associated with an input parameter indicative of a presence of packaging 601 surrounding the electronic device 610. For example, the input parameter may be the output of packaging detector 615.

Packaging detector 615 may be a device capable of identifying when at least a part of the packaging 601 (such as part 601*b*) is located in close proximity to the detector 615/device 610, to indicate that the device 610 has been fully packaged. Alternatively, or in addition packaging detector 615 may be capable of identifying when at least a side of device 610 has been sufficiently concealed (e.g. either by packaging part 601*b* or some other part or device within the packaging 601). The side of the device 610 may be the side that is configured to be initially exposed when the device is unpackaged by the consumer or retailer and is preferably the side including the visual interface 616. Packaging detector 615 may be a light sensing device, for example, configured to determine when the device 610 is no longer exposed to light. In this example, the controller 621 may be configured to detect a packaged state when the output of detector 615 indicates an ambient light brightness that is at or below a predetermined darkness threshold. In such an embodiment, the device 610 and packaging 601 are designed such that at least part of the packaging (preferably the part 601*b* that completes the packaging process) covers the light sensing device 615 in the packaged state.

Alternatively or in addition, the packaging detector 615 may be any other device or combination of devices configured to detect a location of the packaging 601 (or part 601*b* of the packaging) relative to the electronic device 610. For example, the detector 615 may be a magnetic sensor, such as a hall-effect sensor, that is cooperative with a corresponding magnetic element 602 mounted on the relevant part 601*b* of the packaging 601. The magnetic sensor 615 may output a signal indicative of the proximity of the corresponding magnetic element 602, and the controller 621 may be configured to detect a packaged state of the device 610 using the output signal. For example, a magnetic-field-strength output signal that is above a predetermined threshold may indicate placement of packaging part 601*b* over the electronic device 610. In such an embodiment, the device 610 and packaging 601*b* are designed such that the magnetic element of at least part of the packaging (preferably the part 601*b* that completes the packaging process) comes into close proximity with the magnetic sensor in the packaged state. The magnetic sensor may be alternatively located on the packaging, and the corresponding magnetic element may be placed on the electronic device.

In some embodiments, and as described for connector 100, the device may detect it has been packaged inside packaging 601 by also monitoring one or more internal parameter triggers, such as timer-related parameters. For example, the controller 621 may be configured to detect the device has been packaged and is ready to be shipped when one or more of the following conditions are met:

A. A packaged state is detected by the detector 615;

B. A predetermined time period has elapsed after the device is triggered in the pre-sleep mode; (e.g. it has been some predetermined length of time since the testing mode has ended); and/or C. A packaged state is detected for a predetermined period of time (e.g. when the device 610 has been in packaging 601 for some predetermined length of time).

In one exemplary embodiment, the controller 621 may be configured to transition into the sleep mode when condition A is met. In another exemplary embodiment, the controller 621 may be configured to transition into the sleep mode when condition B is met. In yet another exemplary embodiment, the controller 621 may be configured to transition into the sleep mode when condition B is first met, and then condition A, or condition C is subsequently met. Other variations for operating the controller to detect a packaged/shipping phase are possible, as would be readily apparent to the skilled person.

To allow the controller to spend the majority of the time completely shut down with no RAM retention, in the pre-sleep mode, the controller 621 may monitor timer-related parameters by writing and reading to an on-board non-volatile memory, such as flash memory or EEPROM. For instance, a counter may be updated and monitored using the non-volatile memory every time a signal is sampled from the detector 615, indicating a packaged state of device 610. The counter may be reset when the sampled signal indicates an unpackaged state, or when it reaches a predetermined count number. An elapsed period can be estimated using the counter value and the sampling rate associated with the detector.

Sleep Mode—Shipping Phase

To maximize first time usage, it is preferable that the on-board power source 613 is as close as possible to its initial state of charge when the device 610 reaches the retail or consumer supply phase. This means the device, and in particular the visual interface 616, can be automatically operated without requiring a connection with an external power source. To allow for this, the device 610 is programmable to operate in a sleep/power-conserving mode during a phase of the supply chain preceding the retail or consumer phase, such as during a shipping phase of the chain. This phase may consist of shipping the device from one location (e.g. manufacturer, distributer or retailer) to another (e.g. retailer or consumer). During this period, the device 610 is practically unusable for a prolonged period and therefore may be placed in sleep mode to conserve energy.

In sleep mode, the majority of the system's functionality, including visual interface 616, may be continuously deactivated until a trigger condition is detected by the controller 621 indicating that the device has been unpackaged and/or entered a post-shipping phase (e.g. retail or consumer phase)—step 633. In this mode, the controller 621 and devices relating to a wake-up trigger condition (i.e. post-shipping trigger condition) are activated intermittently. The controller 621 and relevant sensing devices (e.g. detector 615) may be activated during the sleep mode as described for connector 100.

The wake-up trigger condition may be detected by the controller 621 using one or more inputs available on-board the device, such as via packaging detector 615. The wake-up trigger condition is preferably preconfigured and recognisable by the controller. The wake-up trigger condition may be indicative of removal of a part 601*b* of the packaging 601 that exposes the visual interface 616 to the user. Alternatively, or in addition packaging detector 615 may be capable of identifying when at least a side of device 610 has been sufficiently exposed (e.g. either by removal of packaging part 601*b* or removal of some other part or device within the packaging 601). The side of the device 610 may be the side that is configured to be initially exposed when the device is unpackaged by the consumer or retailer and is preferably the side including the visual interface 616.

In some embodiments, packaging detector 615 is a light sensing device and the controller 621 is configured to detect a wake-up trigger condition when the output of detector 615 indicates an ambient light brightness that is at or above a predetermined brightness threshold (i.e. indicating that the device has been unpackaged and detector 615 exposed). The light sensing device may be operated in a high gain/low power mode during the sleep-mode to recognise the wake-up trigger.

Alternatively or in addition, the packaging detector 615 may be any other device or combination of devices configured to detect a location of the packaging 601 (or part 601*b* of the packaging) relative to the electronic device 610. For example, the detector 615 may be a magnetic sensor, such as a hall-effect sensor, that is cooperative with a corresponding magnetic element mounted on the relevant part 601*b* of the packaging 601. The magnetic sensor may output a signal indicative of the proximity of the corresponding magnetic element, and the controller 621 may be configured to detect an unpackaged state of the device 610 when the magnetic-field-strength output signal that is at or below a predetermined threshold.

In some embodiments, and as described for connector 100, the device may detect it has been unpackaged by also monitoring one or more internal parameter triggers, such as timer-related parameters. For example, the controller 621 may be configured to detect un-packaging and the end of a shipping phase when an unpackaged state is substantially continuously detected using detector 615 for a predetermined period of time (e.g. when the packaging has been removed for some predetermined length of time).

In alternative embodiments, the controller 621 may be preconfigured to recognise a predetermined data trigger signal, receivable from an external device via the communications interface 620 of the device 610. Other trigger conditions and methods are possible and envisaged as would be readily apparent to the skilled person.

Wake-Up Mode—Post-Shipping Phase

Upon detecting un-packaging and transitioning into the wake-up mode, the device 610 may be configured to automatically activate the visual interface 616 to output visual indicia observable by the user (step 634). This may include a welcome screen in the case of a display, or a welcome light pattern in the case of an illumination system, for example. This is preferably achieved without any manual activation of the device by the user other than opening the package.

After waking up, full functionality of device 610 may be restored.

Embodiments herein described may be implemented by hardware (fixed or programmable), software, firmware, middleware, microcode, or any combination thereof. When implemented in software, firmware, middleware or microcode, the program code or code segments to perform the necessary tasks may be stored in electronic memory such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, electronic memory may represent one or more devices for storing data, including read-only memory (ROM), random access memory (RAM), EPROM memory, EEPROM memory, Flash memory, FRAM memory, and/or other machine-readable mediums for storing information.

The methods or algorithms described in connection with the controller 130 and illumination circuit 121 examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, FRAM memory, ROM memory, EPROM memory, EEPROM memory.

The various illustrative logical blocks, modules, circuits, elements, and/or components described in connection with the controller 130 and illumination circuit 121 examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

One or more of the components and functions illustrated in the figures may be rearranged and/or combined into a single component or embodied in several components without departing from the invention. Additional elements or components may also be added without departing from the invention.

The foregoing description of the invention includes preferred forms thereof. Modifications may be made thereto without departing from the scope of the invention as defined by the accompanying claims.

What is claimed is:

1. An electronic device comprising:
   an electronic visual interface;
   an on-board power source configured to supply power to the electronic visual interface; and
   a controller comprising one or more analogue circuits configured to automatically activate the electronic visual interface upon detection of a predetermined trigger condition indicative of removal of packaging associated with the electronic device, using a fading illumination signal generated by the one or more analogue circuits when the electronic visual interface is receiving power from the on-board power source, the fading illumination signal having a recursive current profile that oscillates between a maximum current value and a minimum current value.

2. The electronic device of claim 1, wherein the electronic visual interface comprises one or more illumination sources.

3. The electronic device of claim 1, further comprising:
   a first and a second connection elements for electronically and physically connecting to a corresponding port of an electronic device or power source; and
   a cable extending between the first and second connection elements.

4. The electronic device of claim 3, wherein the electronic visual interface is operable to illuminate one of the first and second connection elements when activated.

5. The electronic device of claim 1, wherein the controller is further configured to control a brightness of at least one of the illumination sources based on an ambient light brightness surrounding the connector, such that the brightness is reduced when the ambient light brightness reduces.

6. The electronic device of claim 1, wherein the electronic visual interface and the on-board power source are accommodated within a common housing.

7. The electronic device of claim 1, further comprising a light sensing device, and the predetermined trigger condition is based on at least one ambient light parameter observable by the light sensing device.

8. The electronic device of claim 7, wherein the predetermined trigger condition is based on the ambient light parameter indicating an ambient light brightness that is above a predetermined threshold.

9. The electronic device of claim 1, wherein the controller is configured to operate the electronic device in one of a plurality of predefined modes of operation, comprising a sleep mode in which the electronic visual interface is deactivated until the predetermined trigger condition is detected by the controller.

10. The electronic device of claim 9, wherein in the sleep mode the controller is substantially intermittently operated during one or more time intervals to enable detection of the predetermined trigger condition, and is otherwise deactivated for a remaining period of the sleep mode to conserve energy of the on-board power source.

11. The electronic device of claim 9, wherein the controller is configured to operate the electronic device in the sleep mode when at least one predetermined sleep-mode trigger condition is detected, the predetermined sleep mode trigger conditions being based on at least one input or operational parameter observable by the controller.

12. The electronic device of claim 11, wherein the at least one input or operational parameter observable by the controller comprises any combination of one or more of: at least one timer related parameter; or at least one light sensing parameter, or both.

13. The electronic device of claim 11, wherein the controller is configured to trigger the electronic device into the sleep mode when the following predetermined sleep mode trigger conditions are detected by the controller:
   a light sensing parameter value indicative of an ambient light brightness at or below a predetermined threshold; and
   a first timer value relating to first timer parameter at or above a predetermined first timer threshold period.

14. The electronic device of claim 9, wherein the controller is further configured to operate the device in a pre-sleep mode of operation, and wherein in the pre-sleep mode of operation, the electronic visual interface is operated by the controller using an illumination signal that consumes lower power relative to power consumed when the electronic visual interface is operated using the fading illumination signal.

15. The electronic device of claim 1, wherein the controller is configured to control a brightness of the illumination source by adjusting the maximum current value and/or the minimum current value of the fading illumination signal.

16. The electronic device the claim 1, wherein the fading illumination signal is configured to maintain an average current usage of the electronic visual display of approximately less than 10 uA.

17. The electronic device of claim 1, wherein the one or more analogue circuits comprises one or more analogue amplifier circuits, and the controller is configured to recursively switch inputs of the one or more analogue amplifier circuits between an on-state, in which current is drawn through the output of the amplifier circuit to increase toward the maximum current value, and an off-state wherein the one or more analogue amplifier circuit's output current decreases toward the minimum current value.

18. The electronic connector of claim 17 wherein the minimum current value is approximately zero amperes.

19. A computer readable medium having stored therein instructions executable by a processor of an electronic device for performing the steps of:

detecting a predetermined trigger condition indicative of removal of packaging associated with the electronic device; and activating the electronic visual interface using a fading illumination signal generated by one or more analogue circuits, when the predetermined trigger condition is detected, the fading illumination signal having a recursive current profile that oscillates between a maximum current value and a minimum current value.

20. A method of operating electronic device having an electronic visual interface, the method comprising the steps of:

detecting a predetermined trigger condition indicative of removal of packaging associated with the electronic device; and activating the electronic visual interface using a fading illumination signal generated by one or more analogue circuits, when the predetermined trigger condition is detected, the fading illumination signal having a recursive current profile that oscillates between a maximum current value and a minimum current value.

* * * * *